US009423140B2

(12) United States Patent
Betts et al.

(10) Patent No.: US 9,423,140 B2
(45) Date of Patent: Aug. 23, 2016

(54) LIQUID DESICCANT REGENERATION SYSTEM, SYSTEMS INCLUDING THE SAME, AND METHODS OF OPERATING THE SAME

(71) Applicant: BE POWER TECH LLC, Parkland, FL (US)

(72) Inventors: Daniel A. Betts, Parkland, FL (US); Matthew D. Graham, West Palm Beach, FL (US); John L. Kaufman, Parkland, FL (US)

(73) Assignee: BE POWER TECH, INC., Deerfield Beach, FL (US)

( * ) Notice: Subject to any disclaimer, the term of this patent is extended or adjusted under 35 U.S.C. 154(b) by 0 days.

(21) Appl. No.: 14/623,881

(22) Filed: Feb. 17, 2015

(65) Prior Publication Data

US 2015/0233589 A1  Aug. 20, 2015

Related U.S. Application Data

(60) Provisional application No. 61/940,455, filed on Feb. 16, 2014, provisional application No. 61/949,893, filed on Mar. 7, 2014, provisional application No. 61/991,198, filed on May 9, 2014, provisional application No. 62/058,476, filed on Oct. 1, 2014, provisional application No. 62/058,479, filed on Oct. 1, 2014.

(51) Int. Cl.
*F24F 3/14* (2006.01)
*B01D 61/36* (2006.01)
(Continued)

(52) U.S. Cl.
CPC ............ *F24F 3/147* (2013.01); *B01D 53/1425* (2013.01); *B01D 53/263* (2013.01);
(Continued)

(58) Field of Classification Search
CPC .... B01D 61/36; B01D 61/362; B01D 61/366; B01D 61/368; B01D 53/1425; B01D 53/263; F24F 3/1411; F24F 3/1417; F24F 3/1425; F24F 2003/1458
See application file for complete search history.

(56) References Cited

U.S. PATENT DOCUMENTS 3,253,390 A   5/1966   Connors
4,189,848 A   2/1980   Ko et al.
(Continued)

FOREIGN PATENT DOCUMENTS

EP   1734317       12/2008
JP   2000274734    10/2000
(Continued)

OTHER PUBLICATIONS

Dean, J., et al., "Dew Point Evaporative Comfort Cooling Summary Report" ESTCP, Energy and Water Projects Demonstration Plan SI-0821, Report No. TP-7A40-56256-2, Nov. 2012.
(Continued)

*Primary Examiner* — In Suk Bullock
*Assistant Examiner* — Jonathan Pilcher
(74) *Attorney, Agent, or Firm* — Duane Morris LLP; Gregory M. Lefkowitz

(57) ABSTRACT

A liquid desiccant regeneration system and method of liquid desiccant regeneration are described. The liquid desiccant regeneration system includes a liquid desiccant regenerator having an engine producing a heated exit stream, and at least one dehydrating tube comprising a first water vapor permeable wall. A low concentration liquid desiccant stream feeds into the liquid desiccant regenerator, while a high concentration liquid desiccant stream exiting the liquid desiccant regenerator. A carrier stream and the low concentration liquid desiccant are in contact with opposite sides of the first water vapor permeable wall, and the low concentration liquid desiccant stream is heated by heat from the heated exit stream to drive water from the low concentration liquid desiccant stream through the first water vapor permeable wall to the carrier stream to form a humidified carrier stream. As a result, the desiccant concentration in the high concentration liquid desiccant stream is higher than a desiccant concentration in the low concentration liquid desiccant stream.

22 Claims, 38 Drawing Sheets

(51) Int. Cl.
*B01D 53/14* (2006.01)
*F24F 3/147* (2006.01)
*F24F 5/00* (2006.01)
*F28D 7/10* (2006.01)
*B01D 53/26* (2006.01)

(52) U.S. Cl.
CPC ............ *F24F3/1417* (2013.01); *F24F 5/0035* (2013.01); *F28D 7/10* (2013.01); *B01D 61/36* (2013.01); *B01D 61/364* (2013.01); *F24F 3/1411* (2013.01); *F24F 2003/1458* (2013.01)

(56) References Cited

U.S. PATENT DOCUMENTS

| | | | |
|---|---|---|---|
| 4,635,446 A * | 1/1987 | Meckler | B01D 53/263 62/235.1 |
| 5,097,668 A | 3/1992 | Albers et al. | |
| 5,129,925 A | 7/1992 | Marsala et al. | |
| 5,131,238 A * | 7/1992 | Meckler | F02G 1/043 62/271 |
| 5,181,387 A | 1/1993 | Meckler et al. | |
| 5,213,154 A | 5/1993 | Marsala et al. | |
| 5,641,337 A * | 6/1997 | Arrowsmith | B01D 53/226 95/39 |
| 6,156,102 A | 12/2000 | Conrad et al. | |
| 6,751,964 B2 | 6/2004 | Fischer | |
| 6,757,591 B2 | 6/2004 | Kramer | |
| 7,305,840 B2 * | 12/2007 | Kang | F24F 3/1423 62/238.7 |
| 7,306,650 B2 | 12/2007 | Slayzak et al. | |
| 7,360,375 B2 | 4/2008 | Mola et al. | |
| 7,942,011 B2 * | 5/2011 | Forkosh | B01D 53/261 62/271 |
| 8,052,847 B2 | 11/2011 | Koban et al. | |
| 8,769,971 B2 | 7/2014 | Kozubal et al. | |
| 2003/0014983 A1 | 1/2003 | Maisotsenko et al. | |
| 2003/0033821 A1 | 2/2003 | Maisotsenko et al. | |
| 2004/0267408 A1 | 12/2004 | Kramer | |
| 2005/0109052 A1 * | 5/2005 | Albers | F24F 3/1417 62/271 |
| 2007/0209512 A1 | 9/2007 | Seibert | |
| 2010/0077783 A1 | 4/2010 | Bhatti et al. | |
| 2010/0319370 A1 | 12/2010 | Kozubal et al. | |
| 2012/0132513 A1 | 5/2012 | Vandermeulen et al. | |
| 2013/0007458 A1 | 1/2013 | Wakita et al. | |
| 2013/0055736 A1 | 3/2013 | Everett | |
| 2013/0340449 A1 | 12/2013 | Kozubal et al. | |
| 2014/0150657 A1 | 6/2014 | Vandermeulen et al. | |
| 2014/0238057 A1 * | 8/2014 | Kandil | B01D 53/263 62/94 |
| 2014/0260372 A1 | 9/2014 | Woods et al. | |
| 2014/0260398 A1 | 9/2014 | Kozubal et al. | |
| 2014/0283690 A1 * | 9/2014 | Smith | F24F 3/14 96/7 |
| 2014/0326433 A1 | 11/2014 | Kozubal et al. | |

FOREIGN PATENT DOCUMENTS

| | | |
|---|---|---|
| JP | 2002126441 | 5/2002 |
| JP | 2003279070 | 10/2003 |
| JP | 2004183962 | 7/2004 |
| JP | 2005265293 | 9/2005 |
| JP | 2006010264 | 1/2006 |
| JP | 2007278594 | 10/2007 |
| JP | 2012215334 | 11/2012 |
| JP | 2014020651 | 2/2014 |

OTHER PUBLICATIONS

Dean, J., et al., "Solar-Powered, Liquid-Desiccant Air Conditioner for Low-Electricity Humidity Control—Summary Report," ESTCP, Energy and Water Projects Demonstration Plan SI-0822, Report No. TP-7A40-56437-2, Nov. 2012.

Dufour, A.U., "Fuel cells—a new contributor to stationary power," Journal of Power Sources, 1998, vol. 71, pp. 19-25.

Kempton, W., et al., "Vehicle-to-grid power implementation: From stabilizing the grid to support large-scale renewable energy," Journal of Power Sources, 2005.

Kozubal, E., et al., "Coolerado 5 Ton RTU Performance: Western Cooling Challenge Results," National Renewal Energy Laboratory, Nov. 2010, Technical Report NREL/TP-5500-46524.

Kozubal, E., et al., "Desiccant Enhanced Evaporative Air-Conditioning (DEVap): Evaluation of a New Concept in Ultra Efficient Air Conditioning," National Renewal Energy Laboratory, Jan. 2011, Technical Report NREL/TP-5500-49722.

Kozubal, E., et al., "Development and Analysis of Desiccant Enhance Evaporative Air Conditioner Prototype," National Renewal Energy Laboratory, Apr. 2012, Technical Report NREL/TP-5500-54755.

Lipman, T.E., et al., "Fuel cell system economics: comparing the costs of generating power with stationary and motor vehicle PEM fuel cell systems," Energy Policy, 2004, vol. 32, pp. 101-125.

Woods, J., et al., "A desiccant-enhanced evaporative air conditioner: Numerical model and experiments," Energy Conversion and Management, 2013, vol. 65, pp. 208-220.

Woods, J., et al., "Heat transfer and pressure drop in spacer-filled channels for membrane energy recovery ventilators," Applied Thermal Engineering, 2013, vol. 50, pp. 868-876.

\* cited by examiner

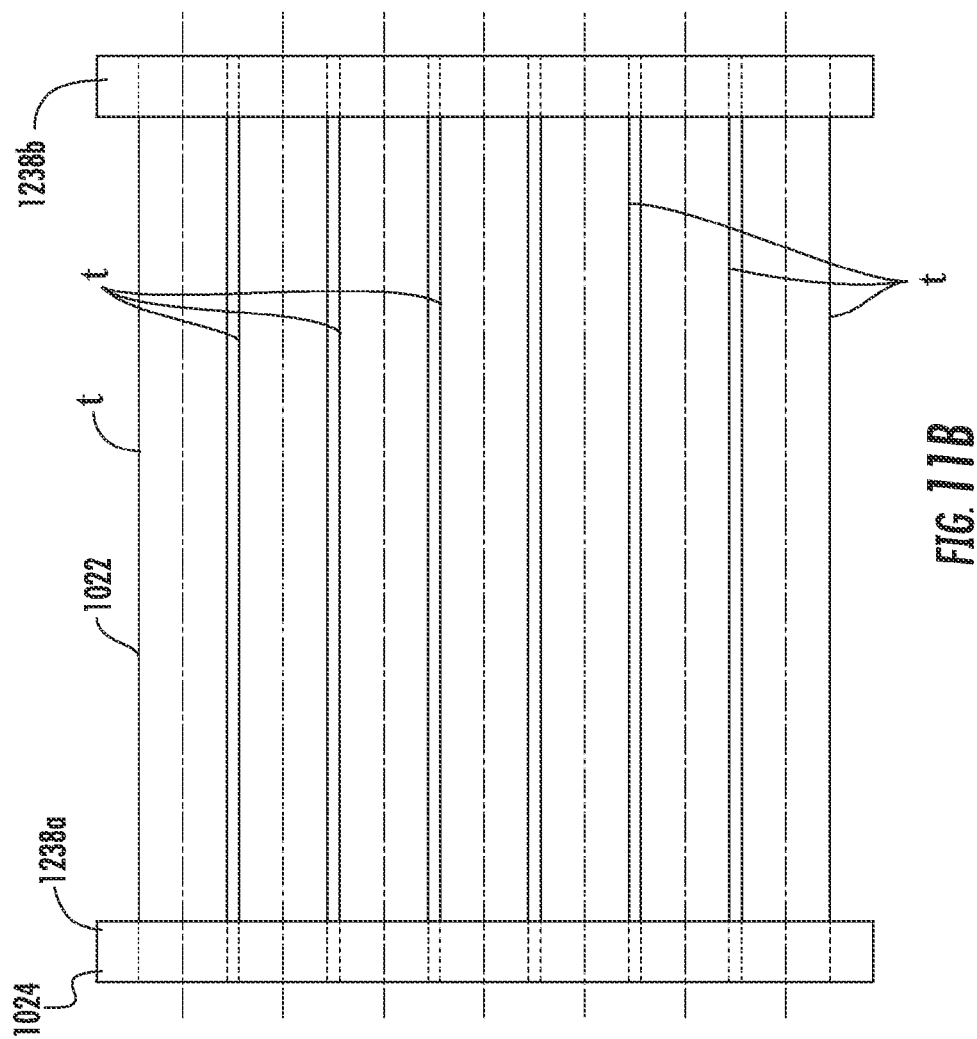
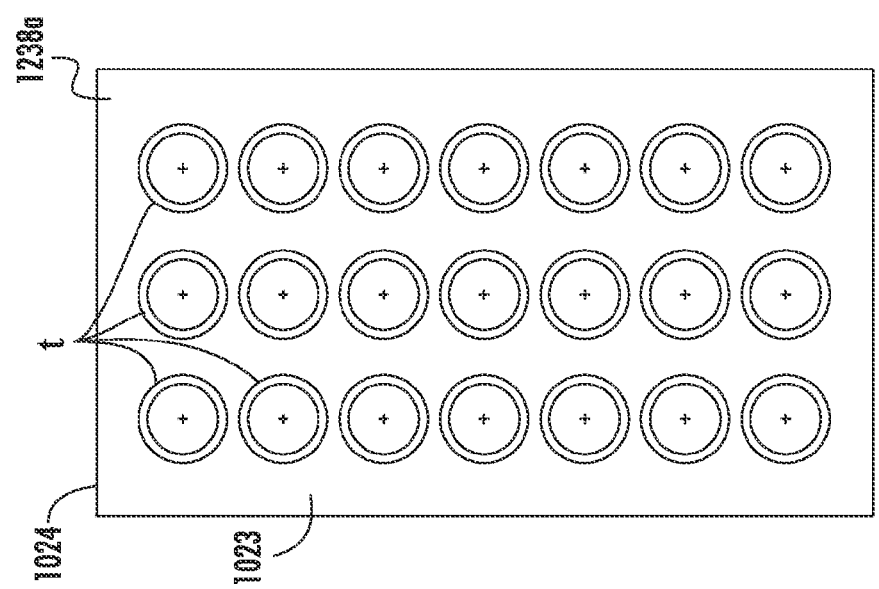

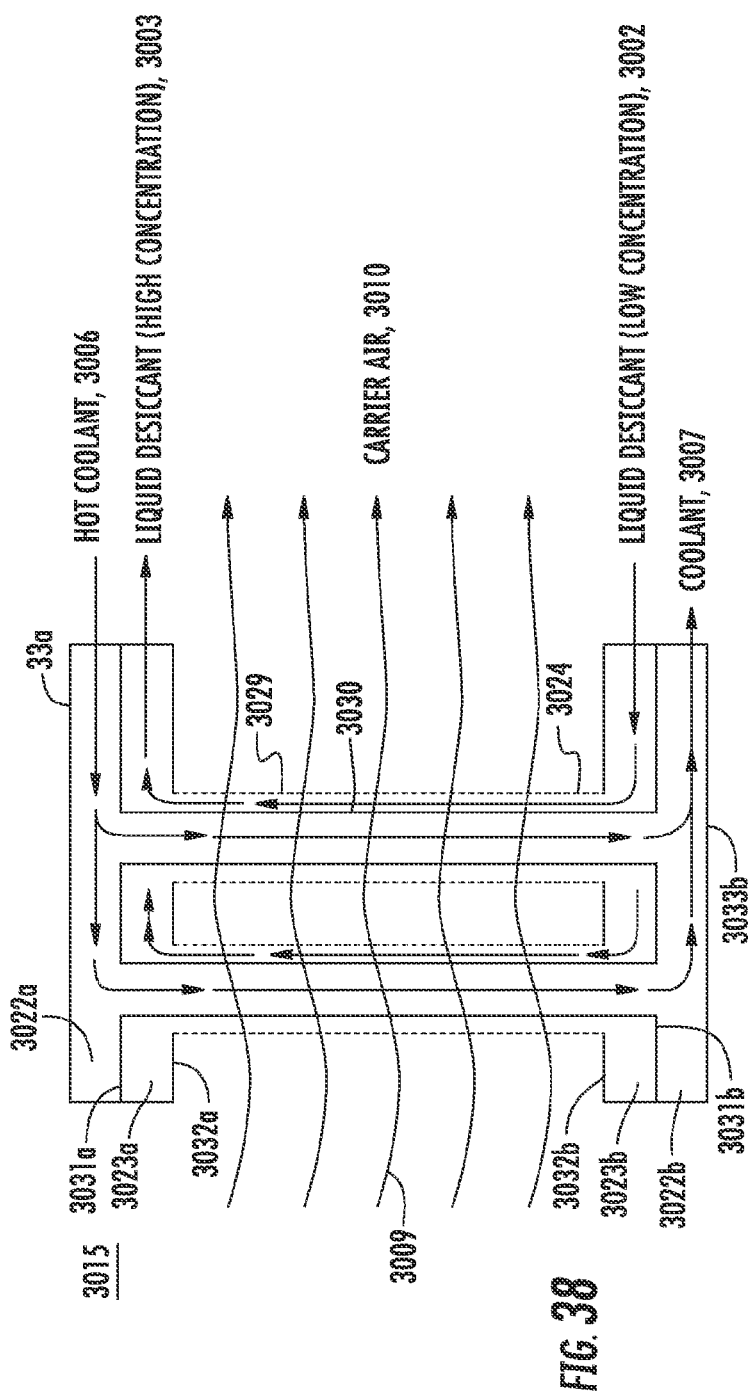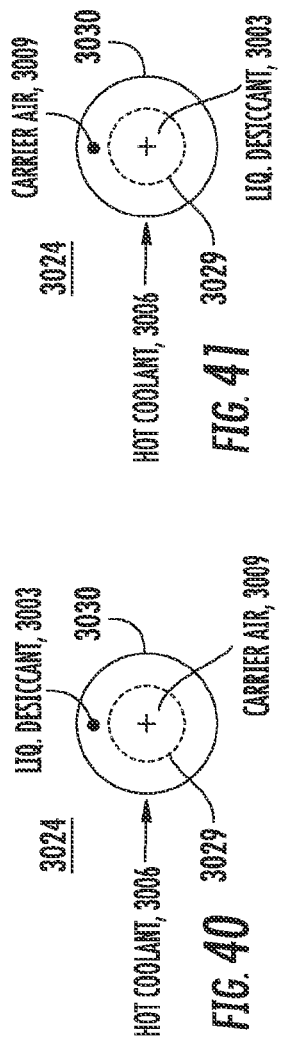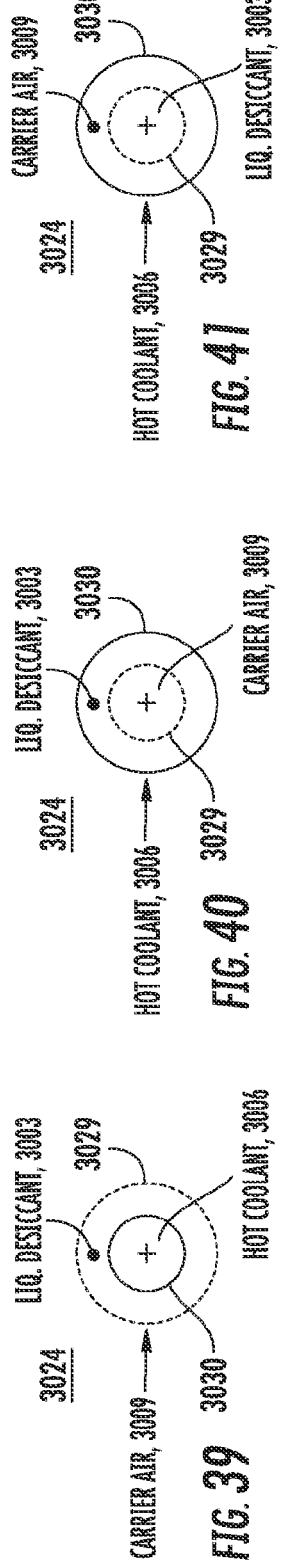

LIQUID DESICCANT REGENERATION SYSTEM, SYSTEMS INCLUDING THE SAME, AND METHODS OF OPERATING THE SAME

CROSS-REFERENCE TO RELATED APPLICATIONS

This application claims priority to U.S. Provisional Patent Application No. 61/940,455, filed Feb. 16, 2014; U.S. Provisional Patent Application No. 61/949,893, filed Mar. 7, 2014; U.S. Provisional Patent Application No. 61/991,198, filed May 9, 2014; U.S. Provisional Patent Application No. 62/058,476, filed Oct. 1, 2014; and U.S. Provisional Patent Application No. 62/058,479, filed Oct. 1, 2014, the entireties of which are incorporated herein by reference.

FIELD OF THE INVENTION

The present invention relates generally to the field of liquid desiccant regeneration systems, such as liquid desiccant air conditioning systems.

BACKGROUND

Air conditioning refers to the heating, cooling, cleaning, humidification and dehumidification of air. The most prevalent air conditioning systems employ vapor compression cycles, in which heat is pumped from one environment to another via a refrigerant that operates under two different pressure regimes so that the temperature can be increased when heat needs to be rejected to the environment or decreased when heat is to be absorbed by the refrigerant. The pressure difference in these systems is maintained by means of a mechanical compressor. This compressor is powered using electricity. The vast majority of air conditioning systems in commercial use employ the vapor compression cycle.

The principal limitation to the vapor compression cycle is that it is for all intents and purposes a sensible heat rejection device with minor capabilities to address the latent heat needs of a building. This is because the vapor compression cycle is only able to change the temperature of the air. Given this, the prevalent manner in which vapor compression air conditioning systems address the latent heat of a building is by reducing the temperature of the air to a point below its dew point and by removing water through condensation. In most cases, the air must be reheated in order to arrive at the desired building supply air temperature. This process is energy intensive.

Methods for dehumidification of the air conditioning incoming air have been invented and proposed. Among these is the use of a liquid desiccant loop coupled with an evaporative cooling system to generate cooling and dehumidification without requiring cooling the air to the dew point. These systems are designed using a plate heat and mass transfer arrangement in which liquid desiccant flows within selectively water permeable membranes that are attached to flat plates. The liquid desiccant flow absorbs moisture from air being dehumidified and then transfers it to a separate air stream that absorbs this moisture from the liquid desiccant. The air being dehumidified drops in temperature, cooling the air being dehumidified. Multiple plates stacked together form the heat and mass transfer device.

The plate arrangement has advantages in that it allows for a single device that does both air cooling and dehumidification using liquid desiccant streams. An example of this is described in US Patent Application, US 20100319370A1, titled "Indirect evaporative cooler using membrane-contained liquid desiccant for dehumidification."

SUMMARY

In one embodiment, a liquid desiccant regeneration system is described. The desiccant regeneration system can include a liquid desiccant regenerator, a low concentration liquid desiccant stream feeding into the liquid desiccant regenerator, and a high concentration liquid desiccant stream exiting the liquid desiccant regenerator. The liquid desiccant regenerator can include an engine producing a heated exit stream, and at least one dehydrating tube comprising a first water vapor permeable wall. A carrier stream and the low concentration liquid desiccant are in contact with opposite sides of the first water vapor permeable wall and the low concentration liquid desiccant stream is heated by heat from the heated exit stream to drive water from the low concentration liquid desiccant stream through the first water vapor permeable wall to the carrier stream to form a humidified carrier stream. The desiccant concentration in the high concentration liquid desiccant stream is higher than a desiccant concentration in the low concentration liquid desiccant stream.

A method of operating liquid desiccant regenerating systems such as those described herein is also provided. In some embodiments, the method can include providing a low concentration liquid desiccant stream; providing a liquid desiccant regenerator; and operating the liquid desiccant regenerating system to produce the high concentration liquid desiccant stream, which has a higher desiccant concentration than the low concentration liquid desiccant stream. The liquid desiccant regenerator 12 can include an engine, wherein heat from the engine is used to convert the low concentration liquid desiccant stream to the high concentration liquid desiccant stream.

These and other features, objects and advantages of the present invention will become more apparent to one skilled in the art from the following description and claims when read in light of the accompanying drawings.

BRIEF DESCRIPTION OF THE DRAWINGS

FIG. 3A is a diagram of a heat and mass exchange system that can be used for dehumidification, while FIG. 3B shows a heat and mass exchange system that can be used for cooling and dehumidification.

FIG. 11A is a side view of an arrangement of conduits that can be used in mass or heat transfer processed described herein, while FIG. 11B is a front view of the arrangement of FIG. 11A.

FIG. 19A is a perspective view of a heat and mass transfer device as described herein, while

FIG. 38 is a cross-sectional view showing the flow pattern of fluid through a heat and mass exchange stage as described herein.

FIG. 39 is a cross-sectional view of a tube-in-tube assembly as described herein.

FIG. 40 is a cross-sectional view of a tube-in-tube assembly as described herein.

FIG. 41 is a cross-sectional view of a tube-in-tube assembly as described herein.

FIG. 42A is aside or top view of a heat and mass exchange assembly, including flow disruptors, as described herein, while

DETAILED DESCRIPTION

As shown in FIGS. 1-43, a liquid desiccant regeneration system is disclosed. The system utilizes a heated exit stream (e.g., exhaust, heated heat exchange fluid, etc.) from an engine to regenerate low concentration liquid desiccant. In one example, the low concentration liquid desiccant can he the exit stream of a liquid desiccant air conditioning system that uses high concentration liquid desiccant to dehumidify air. Water from the liquid desiccant regeneration system can also be recovered and used, for example, to provide evaporative cooling to the air conditioning system. Power generated by the engine is used to power the air conditioner, the building being cooled and, where excess power is produced, the power can be sold back to the power grid or stored for future use (e.g., in batteries, capacitors, etc.).

Figure 1:
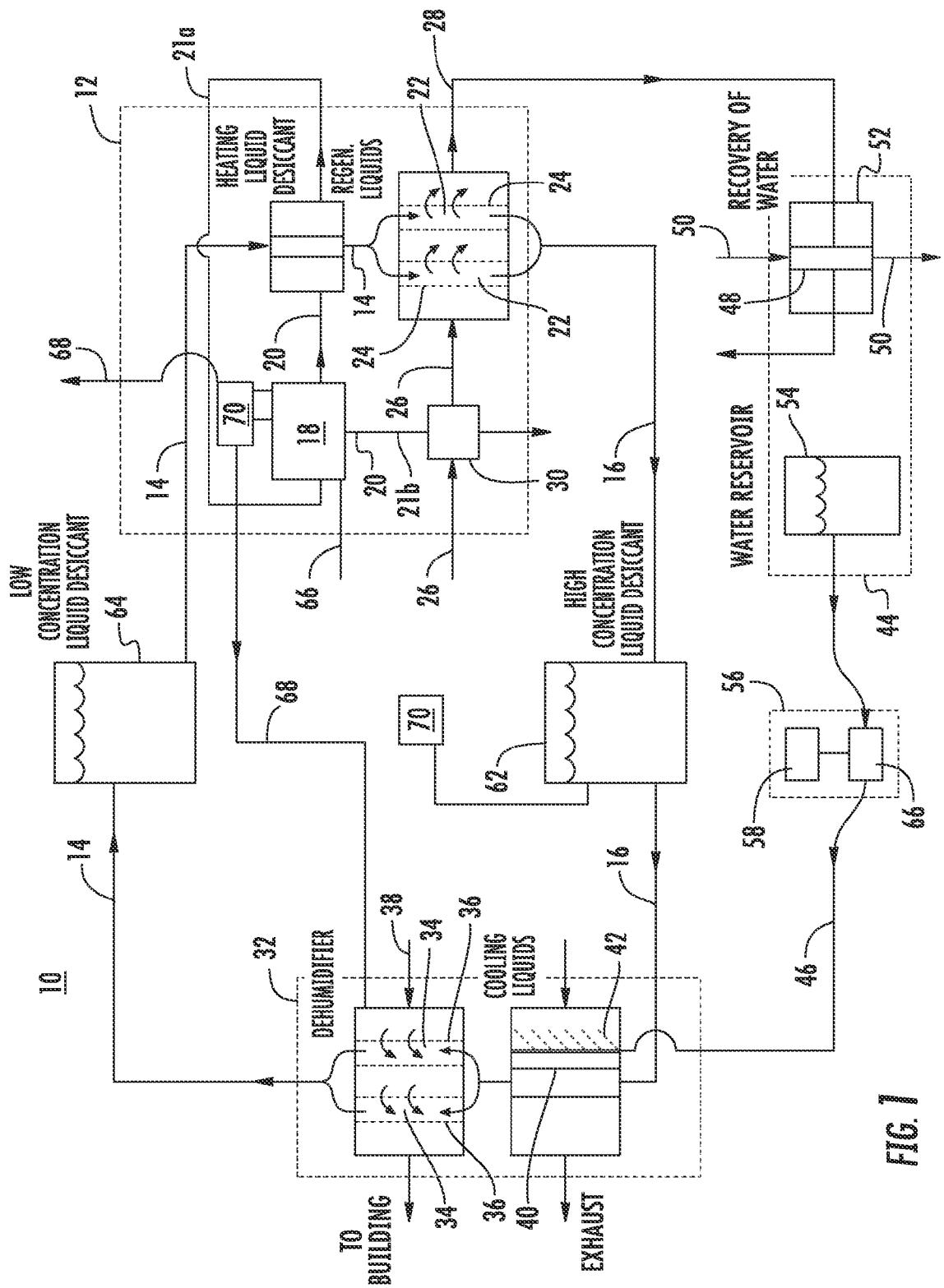
FIG. 1 is a diagram of a liquid desiccant regeneration system as described herein.

As shown in FIG. 1, a liquid desiccant regeneration system 10 is described. The desiccant regeneration system 10 can include a liquid desiccant regenerator 12, a low concentration liquid desiccant stream 14 feeding into the liquid desiccant regenerator 12, and a high concentration liquid desiccant stream 16 exiting the liquid desiccant regenerator 12. The liquid desiccant regenerator 12 can include an engine 18 producing a heated exit stream 20, and at least one dehydrating conduit 22 comprising a first water vapor permeable wall 24. As shown in FIG. 1, a carrier stream 26 and the low concentration liquid desiccant 14 are in contact with opposite sides of the first water vapor permeable wall 24 and the low concentration liquid desiccant stream 14 is heated by heat from the heated exit stream 20 to drive water from the low concentration liquid desiccant stream 14 through the first water vapor permeable wall 24 to the carrier stream 26 to form a humidified carrier stream 28. The desiccant concentration in the high concentration liquid desiccant stream 16 is higher than a desiccant concentration in the low concentration liquid desiccant stream 14.

As will become apparent, while FIG. 1 shows a generalized embodiment of the liquid desiccant regeneration system 10, FIGS. 2, 6, 12, 13, 21, 22, 23, 24, 32, 34, and 35 show a variety of other embodiments having the same or similar features. For example, FIGS. 2, 6, 12, and 13 schematically show liquid desiccant regeneration systems 10 that use separate heat exchangers and mass exchangers, while FIGS. 21, 22, 23, 24, 32, 34, and 35 schematically show similar systems 10 employing combined heat and mass exchangers. As will be understood, depending of the application and objectives, a desiccant regeneration system 10 can employ individual heat exchangers and mass exchangers, combined heat and mass exchangers, or a combination of both. Additional details on heat and mass exchangers useful in the desiccant regeneration systems 10 described herein can be found in U.S. patent application Ser. No. 14/623,797, entitled "Heat and Mass Transfer Device and Systems Including the Same," by Daniel A. Betts and Matthew Daniel Graham, filed Feb. 17, 2015, the entirety of which is incorporated herein by reference.

In some embodiments, the heated exit stream 20 is selected from the group consisting of heated heat exchange fluid, an exhaust stream, or both. For example, the heated heat exchange fluid can be coolant used to keep the engine 18 from overheating. In some such embodiments, such as those shown in FIGS. 1, 2, 6, 12, 13, 21, 22, 23, 24, 32, 34, and 35, the heated heat exchange fluid 21a can pass through the liquid desiccant regenerator 12 as part of a closed loop circuit with the engine 18.

In some embodiments, the heated exit stream 20 can be an exhaust stream, such as the gaseous exhaust stream 21b from an internal combustion engine or the gaseous exhaust stream 21b from the anode or cathode chamber of a fuel cell.

In some embodiments, the heated exit stream 20 is an exhaust stream 21b and the carrier stream 26 comprises the exhaust stream 21b. In other embodiments, such as those shown in FIGS. 1, 34, and 35, the liquid desiccant regenerator 12 further comprises a heat exchanger 30, wherein the heated exit stream 20 contacts and heats the carrier stream 26 in the heat exchanger 30. In some such embodiments, the carrier stream 26 includes ambient air, recirculated air from a space being air conditioned, or a combination of both. Such a configuration can be beneficial in that these sources of the carrier stream 26 generally have a lower humidity than the heated exhaust stream 20, 21b, so that the driving force to regenerate the low concentration liquid desiccant 14 is increased.

In some embodiments, the heated exit stream 20 is heated heat exchange liquid 21a exiting the engine 18, and the heated heat exchange liquid 21a contacts and heats the low concentration liquid desiccant stream 14, the carrier stream 26, or both.

In some embodiments, such as FIG. 1, the heated exit stream 20 includes both a heated heat exchange liquid 21a exiting the engine and a heated exhaust stream 21b, in such embodiments, the heated heat exchange liquid 21a contacts and heats the low concentration liquid desiccant 14, and (a) the heated exhaust stream 21b contacts and heats the carrier stream 26, or (b) the carrier stream 26 comprises the heated exhaust stream 21b.

In some embodiments, the high concentration liquid desiccant stream 16 is directed through an air conditioning system 32. In some embodiments, the air conditioning system 32 includes at least one dehumidification conduit 34 that has a second water vapor permeable wall 36. In some embodiments, a process air stream 38 and the high concentration liquid desiccant stream 16 are in contact with opposite sides of the second water vapor permeable wall 36, and moisture from the process air stream 38 passes through the second water vapor permeable wall 36 to the high concentration liquid desiccant stream 16, thereby dehumidifying the process air stream 38 and diluting the high concentration liquid desiccant stream 16.

Figure 21:
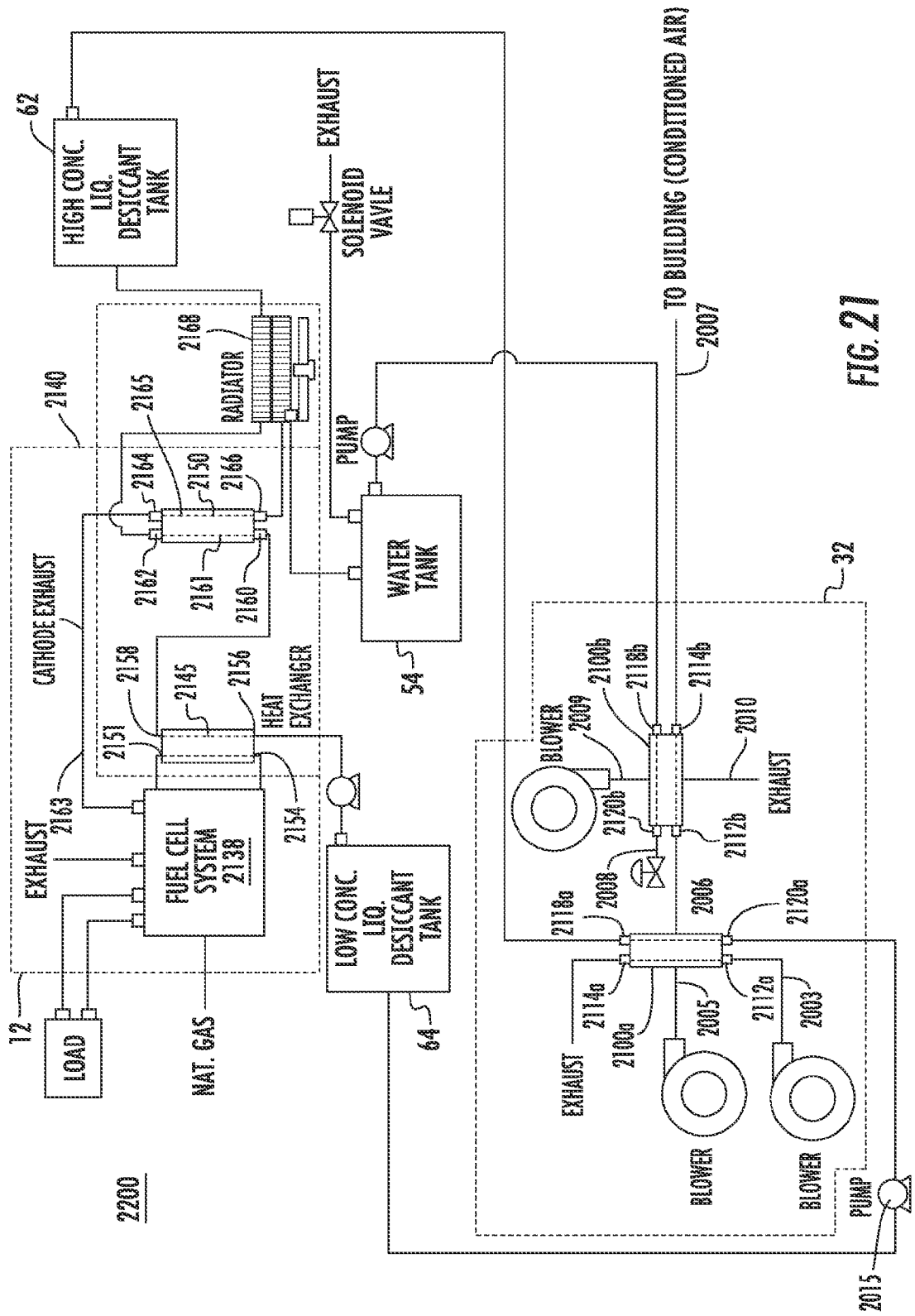
FIG. 21 is a diagram of a liquid desiccant regeneration and dehumidification system as described herein.

In some embodiments, the air conditioning system 32 also includes at least one air conditioning heat exchange conduit 40, where (a) the high concentration liquid desiccant stream 16 and a heat exchange fluid 42 are in contact with opposite sides of the air conditioning heat exchange conduits 40, for cooling the high concentration liquid desiccant stream 16, as shown in FIGS. 1, 6, 12, 13, 21, 22, 23, and 32; (b) the process air stream 38 and a heat exchange fluid 42 are in contact with opposite sides of the air conditioning heat exchange conduits 40, for cooling the process air stream 38, as shown in FIGS. 21 (process air 2006, heat exchange fluid 2009), 22, 23, and 32; or (c) the high concentration liquid desiccant stream 16 and a first heat exchange fluid 42a are in contact with opposite sides of a first group of the air conditioning heat exchange conduits 40a, for cooling the high concentration liquid desiccant stream 16, and the process air stream 38 and a second heat exchange fluid 42b are in contact with opposite sides of a second group of the air conditioning heat exchange conduits 40b, for cooling said process air, as shown in FIGS. 21, 22, 23, and 32.

As one example, in the system of FIG. 21, the liquid desiccant stream entering the HMX at 2118A can contact the first heat exchange fluid 42a/2003, i.e., air, where the air 2003 is on the inside of a tube-in-tube component and the liquid desiccant stream is on the outside of that tube-in-tube component. The process air stream 38/2006 can then contact the second heat exchange fluid 42b (either water 2008 or air 2009) as the process air stream 38/2006 passes through the next HMX. Additional details about these configurations can be found in the discussion of the systems of FIGS. 21, 22, 23, and 32.

The heat exchange fluids 42a, 42b used herein include, but are not limited to, chilled water or other coolants, including a combination of air and water, which may be used in a heat exchanger or which may be sprayed in a space or coated on a surface to provide psychrometric cooling. For example, FIG. 1 shows an embodiment where a water recovery system 44 supplies a water stream 46 that is sprayed in order to cool the high concentration liquid desiccant stream 16 as it flows within the dehumidification conduit(s) 34.

In some embodiments, the liquid desiccant regeneration system 10 also includes a water recovery system 44. The water recovery system 44 can include a water recovery heat exchange conduit 48, where the humidified carrier air 28 and a water recovery heat transfer fluid 50 are in contact with opposite sides of the water recovery heat exchange conduits 48. An outlet of the water recovery heat exchanger 52 can be in fluid communication with a water reservoir 54 for storing water precipitating from the humidified carrier air 28. In some embodiments, the water recovery system 44 includes a flow control system 56 for controlling transport of water from the water reservoir 54 to one side of the air conditioning heat exchange conduits 40. The flow control system 56 can include a controller 58 and a flow control device 60. Examples of flow control devices 60 include, but are not limited to, pumps and valves.

In some embodiments, the desiccant regeneration system 10 includes a high concentration liquid desiccant reservoir 62, having an inlet in fluid communication with an outlet of the liquid desiccant regenerator 12 and an outlet in fluid communication with an inlet of the air conditioning system 32. In some embodiments, the desiccant regeneration system 10 includes a low concentration liquid desiccant reservoir 64, having an inlet in fluid communication with an outlet of the air conditioning system 32 and an outlet in fluid communication with an inlet of the liquid desiccant regenerator 12.

In some embodiments, the capacity of the high concentration liquid desiccant reservoir 62 is sufficient to operate the air conditioning system 32 solely from the high concentration liquid desiccant reservoir 62 continuously for at least one hour, or at least two hours, or at least four hours, or at least eight hours. In some embodiments, the capacity of the low concentration liquid desiccant reservoir 64 is sufficient to operate the liquid desiccant regenerator continuously from the low concentration liquid desiccant reservoir 64 for at least one hour, or at least two hours, or at least four hours, or at least eight hours.

The liquid desiccant regeneration systems 10 described herein include engines 18 that are adapted for generating energy from a fuel source 66. Thus, in some embodiments, it will be desirable to operate the liquid desiccant regenerator 12, which also produces an electricity stream 68, even when the air conditioning system 32 is not operating.

In some embodiments, the fuel source 66 is a fuel tank or a fuel line providing fuel from a municipal source or other source. Examples of fuel sources 66 include, but are not limited to, natural gas, propane, butane, liquefied petroleum gas (LPG), hydrogen, city gas (i.e., gas piped to the building from a municipality or other source), and combinations thereof. In some embodiments, the fuel source 66 will be pre-processed before being introduced into the engine 18. For example, a fuel processor can convert natural gas into a hydrogen rich gas before it is fed into a fuel cell engine 18.

In some embodiments, the air conditioning system 32, consumes high concentration liquid desiccant at the same rate that the liquid desiccant regenerator 12 regenerates the low concentration liquid desiccant 14 into a high concentration liquid desiccant 16. Because of the desire to operate these two systems 12, 32 independently from one another, in some embodiments, the air conditioning system 32 can consume high concentration liquid desiccant 16 at a faster or slower rate than the liquid desiccant regenerator 12 regenerates the low concentration liquid desiccant 14 into high concentration liquid desiccant 16. In some embodiments, the consumption of high concentration liquid desiccant 16 by the air conditioning system 32 is at least 10% faster or at least 10% slower than regeneration of the low concentration liquid desiccant 14 by the liquid desiccant regenerator 12. In some embodiments, the consumption of high concentration liquid desiccant 16 by the air conditioning system 32 is at least 20% faster or at least 20% slower than regeneration of the low concentration liquid desiccant 14 into high concentration liquid desiccant 16 by the liquid desiccant regenerator 12. In some embodiments, the consumption of high concentration liquid desiccant 16 by the air conditioning system 32 is variable. In some embodiments, the regeneration of the low concentration liquid desiccant 14 into high concentration liquid desiccant 16 by the liquid desiccant regenerator 12 is variable.

In some embodiments, the engine 18 generates electricity 68 through electrochemical oxidation of a fuel 66. Examples of engines 18 capable of generating electricity 68 through electrochemical oxidation of a fuel include, but are not limited to, low and high temperature proton exchange membrane fuel cells, solid oxide fuel cells, and flow batteries.

The electricity 68 produced by the engine 18 can be provided to an external power grid, such as the building being air conditioned, the local power grid (e.g., municipal power grid), or both. In some embodiments, electricity 68 produced by the engine 18 is supplied to the air conditioning system 32, or any other electrical components (e.g., pumps, processors, valves, etc.) of the desiccant regeneration system 10.

In some embodiments, the liquid desiccant concentration in the high concentration liquid desiccant stream 16 can be at least 0.5 wt-% higher than the liquid desiccant concentration in the low concentration liquid desiccant stream 14. In some embodiments, the difference in concentration can be at least at least 1 wt-% higher, at least 1.5 wt-% in higher, at least 2 wt/% higher, at least 2.5 wt-% higher, at least 3 wt-% higher, at least 3.5 wt-% higher, or at least 4 wt-% higher in the high concentration liquid desiccant stream 16 than in the low concentration liquid desiccant stream 14.

The liquid desiccant can be composed of any hygroscopic liquid such as aqueous salt solutions LiCl, NaCl, CaCl$_2$), alcohol solutions (e.g. Glycerol, methanol, ethanol), or aqueous chemical agents (e.g. CaSO$_4$). All materials wetted with the liquid desiccant are constricted of materials that are chemically compatible with the liquid desiccant.

In some embodiments, the liquid desiccant concentration in the low concentration liquid desiccant stream (14) is at least 10 wt-%, at least 20 wt-%, at least 25 wt-%, at least 30 wt-%, at least 33 wt-%, at least 34 wt-%, at least 35 wt-%, at least 36 wt-%, at least 37 wt-%, at least 38 wt-%, or at least 39 wt-%. In some embodiments, the liquid desiccant concentration in the low concentration liquid desiccant stream (14) is 50 wt-% or less, 45 wt-% or less, 40 wt-% or less, 39 wt-% or less, 38 wt-% or less, 37 wt-% or less, 36 wt-% or less, or 37 wt-% or less.

In some embodiments, the liquid desiccant concentration in the high concentration liquid desiccant stream (16) is at least 20 wt-%, at least 25 wt-%, at least 30 wt-%, at least 34 wt-%, at least 35 wt-%, at least 36 wt-%, at least 37 wt-%, at least 38 wt-%, at least 39 wt-%, or at least 40 wt-%. In some embodiments, the liquid desiccant concentration in the high concentration liquid desiccant stream (16) is 50 wt-% or less, 45 wt-% or less, 44 wt-% or less, 43 wt-% or less, 42 wt-% or less, 41 wt-% or less, 40 wt-% or less, 39 wt-% or less, 38 wt.% or less, or 37 wt-% or less.

Because liquid desiccants can be corrosive, the duct-work or piping coming into contact with the liquid desiccant streams 14, 16 can be corrosion resistant. For example, the duct-work or piping can be formed from corrosion resistant materials or the inside or outside of the duct-work or piping can be coated with corrosion resistant materials. Examples of materials that are corrosion resistant to liquid desiccants include, but are not limited to ethylene propylene diene rubber (EPDM), fluorine rubber (FKM), nitrile rubber (NBR), perfluorinated elastomers (FFKM), polytetrafluoethylene (PTFE), rigid polyvinyl chloride (PVC), polyolefin materials, such as polypropylene (PP), polyethylene (PE), high density polyethelene (HDPE), and others, polyvinylidene fluoride (PVDF), polyphenylene sulfide (PPS), poly ether ether ketone (PEEK), and chroroprene rubber (CR), sulfonated tetrafluoroethylene based fluoropolymer-copolymer (such as Nafion, which is sold by DuPont), water conducting fluropolymers, and non-fluorinated proton conducting polymers.

As used herein, the phrases water vapor permeable and micro-porous are used interchangeably. Where a conduit wall, membrane, or material is water vapor permeable of micro-porous, the structure can be made of a material that is hydrophobic, and impermeable to liquids but permeable to water vapor. Such water vapor permeable materials are also referred to as mass transfer conduits, tubes or materials. Examples of solid or monolithic, water vapor permeable materials include sulfonated tetrafluoroethylene based fluoropolymer-copolymer (e.g., Nafion™, sold by DuPont), water conducting fluoropolymers, and non-fluorinated proton conducting polymers (e.g., NanoClear™, sold by Dais Analytic), and high density polyethelene (HDPE).

In some embodiments, the water vapor permeable materials are formed from fibers of hydrophobic materials. Examples include spunbond or meltblown polymer materials. Such water vapor permeable materials are generally formed from hydrophobic materials. As used herein "hydrophobic" refers to materials with a contact angle of greater than 90° (e.g., at least 100°, at least 115°, at least 120°, or at least 135°).

A method of operating liquid desiccant regenerating systems 10 such as those described herein is also provided. In some embodiments, the method can include providing a low concentration liquid desiccant stream 14; providing a liquid desiccant regenerator 12, and operating the liquid desiccant regenerating system 10 to produce the high concentration liquid desiccant stream 16, which has a higher desiccant concentration than the low concentration liquid desiccant stream 14. The liquid desiccant regenerator 12 can include an engine 18, wherein heat from the engine 18 is used to convert the low concentration liquid desiccant stream 14 to the high concentration liquid desiccant stream 16.

In some embodiments, the liquid desiccant regeneration system 10 also includes an air conditioning system 32 that converts the high concentration liquid desiccant stream 16 to a low concentration liquid desiccant stream 14 while dehumidifying process air 38 supplied to an air conditioned space. In some embodiments, the operating step includes transporting the high concentration liquid desiccant stream 16 to the air conditioning system 32, then transporting the low concentration liquid desiccant stream 14 from the air conditioning system 32 to the liquid desiccant regenerating system 12. In some embodiments, the liquid desiccant flows in a closed loop.

In some embodiments, the operating step comprises operating the liquid desiccant regenerator 12 continuously, and operating the air conditioning system 32 intermittently. In some embodiments, the air conditioning system 32 operates when a temperature, a humidity, or both of the space being air conditioned passes a target temperature or humidity, and the air conditioning system 32 does not operate when a temperature, a humidity, or both of the space being air conditioned are on the other side of the target temperature or humidity.

In some embodiments, the operating step includes operating the liquid desiccant regenerator 12 when the air conditioning system 32 is not operating. For example, the liquid desiccant regenerator 12 can operate during particular times of the day, such as when there is a peak demand for electricity, regardless of whether the air conditioning system 32 is operating.

In some embodiments, the operating step includes operating the air conditioning system 32 when the liquid desiccant regenerator 12 is not operating. For example, if there is an excess of high concentration liquid desiccant in the high concentration liquid desiccant reservoir 62, the air conditioning system 32 can be operated without the liquid desiccant regenerator 12 in order to correct this imbalance. Alternatively, if the high concentration liquid desiccant reservoir 62 has excess high concentration liquid desiccant 16 and the air conditioned space does not require air conditioning, then this excess high concentration liquid desiccant 16 could be used to capture water from a process air stream 38, such as outside air, where the dehumidified process air 38 is exhausted and not introduced into the building. The water captured from the process air 38 can then be recovered using a water recovery system 44 and stored in the water tank 54.

Many applications for the system 10 described herein have a mismatch between electricity need and air conditioning needs. For example, in most buildings, air conditioners do not operate continuously, however, the electricity load is continuous. This mismatch can be exploited to increase the overall efficiency of the system and to potentially decrease its cost. Continuous operation of the engine (e.g., fuel cell) to address building load enables continuous regeneration of liquid desiccant and continuous recovery of water even when the air conditioning system is not being utilized. Additionally, this enables continuous storage of water from the atmosphere and from the engine (e.g., fuel cell). The water and desiccant can be stored in the high concentration liquid desiccant reservoir 62 and the water reservoir 54 for use when air conditioning is required. The water stored can be used to further increase the overall efficiency of the system by reducing the electrical energy required to achieve air-cooling and air conditioning.

The stored regenerated high concentration liquid desiccant can also be used to boost the air conditioning effect by flowing greater amounts of high concentration liquid desiccant than can be regenerated with the fuel cell system under steady state operation. Since air-conditioning load varies in intensity throughout the day (mid-day is hotter than in afternoons, mornings and nights), the capacity to temporarily boost air conditioning capacity is an important element in providing comfort without oversizing the engine 18 (e.g., fuel cell) and the air conditioning system 32.

The system 10 can also include an energy management subsystem 70 composed of an engine (e.g., fuel cell) load controller, a DC to DC converter, and a DC to AC converter. The engine load controller is able to determine the electrical power generated by the engine (e.g., fuel cell stack). This can be done by controlling current draw from the engine and supplied to the DC to DC converter and to the DC to AC converter. For most applications, the energy management subsystem will be connected to the electrical grid and will be able to manage and adjust the ratio of grid power and engine 18 (e.g., fuel cell) power used to cover the electrical load of the air conditioning system, the building, and/or external source.

The energy management subsystem 70 has a role to play in taking advantage of the mismatch between air conditioning load and electricity load throughout the day. As current draw from the engine 18 (e.g., fuel cell) is decreased, the efficiency of the engine increases, resulting in decrease in fuel consumed. However, as efficiency increases, heat and water production also decreases. Decreased heat results in decreased rate of liquid desiccant regeneration by the liquid desiccant regenerator 12. The opposite is also true, as current increases the engine 18 (e.g. fuel cell) heat production and water production increases. Because the energy management subsystem 70 controls the current from the engine 18 (e.g., fuel cell) it also regulates the rate of desiccant regeneration, the concentration of the regenerated desiccant (i.e., high concentration liquid desiccant), and the capacity to take advantage of evaporative cooling in the air conditioning system 32 using water from the water recovery system 44. Therefore, the energy management subsystem 70 controls the operations of the system through its control software.

One distinct advantage of the described system over conventional state of the art air conditioning systems is that the system does not consume external electricity to create cooling and can be designed to produce excess electricity, which enables the powering of additional electrically driven devices. Moreover, the system and method conceives partial decoupling of the electricity production from the air-conditioning effect. This decoupling is particularly beneficial because air conditioning is not generally required continuously, while the electrical load is. These advantages enable the installation of these liquid desiccant regeneration air conditioning system 10 in areas where electricity cost is high, or where electricity service is unreliable or insufficient.

In some embodiments, excess electricity 68 produced by the engine 18 is supplied to an external power grid, such as the building being air conditioned, the local power grid (e.g., municipal power grid), or both. In some embodiments, the engine 18 generates electricity through electrochemical oxidation of a fuel. In some embodiments, the engine is a fuel cell. In some embodiments, electricity produced by the engine 18 is supplied to the air conditioning system 32.

Figure 2:
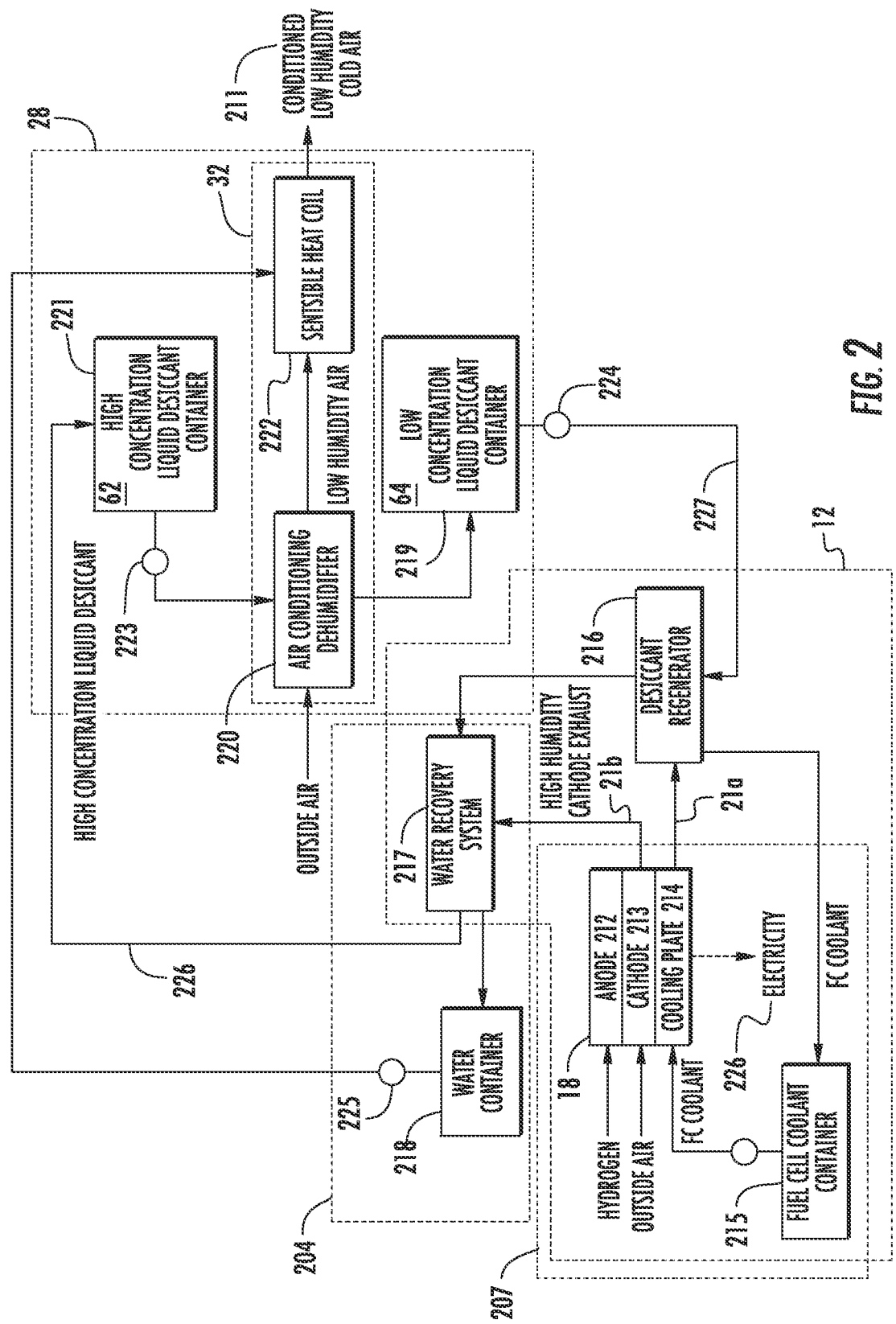
FIG. 2 is a diagram of another liquid desiccant regeneration system as described herein.
Figure 34:
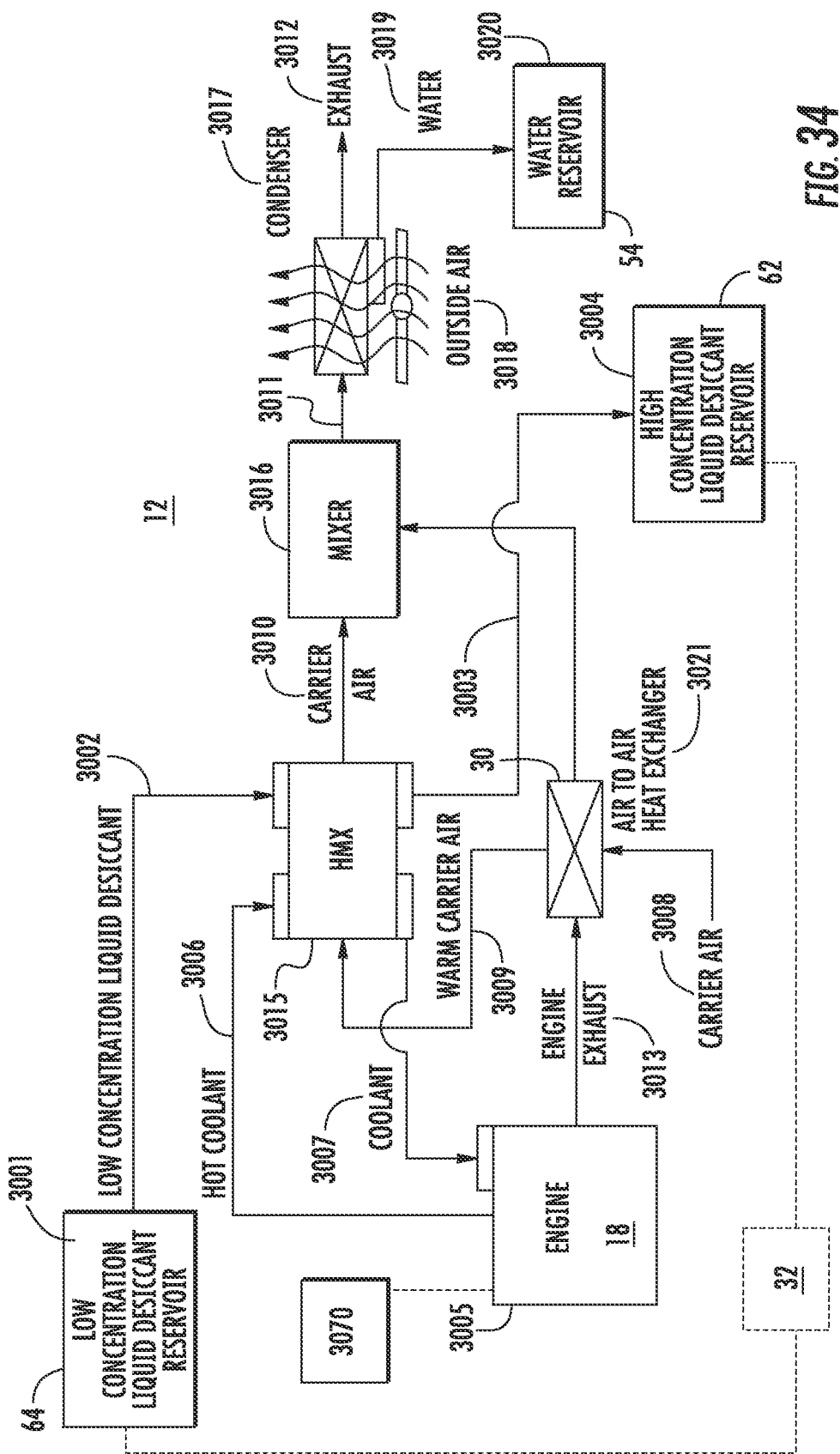
FIG. 34 is a diagram of a liquid desiccant regeneration system as described herein.

While the following discussion is equally applicable to all of the embodiments described herein, the systems of FIGS. 2 & 34 are discussed as examples. As shown in FIG. 2, high concentration liquid desiccant accumulation occurs when electrochemical oxidation occurs between the anode (212) and cathode (213) of the fuel cell, thus generating heat. In the embodiment of FIG. 2, the heat produced by the fuel cell (18) is captured by coolant passing through the fuel cell cooling plate (214). Low concentration liquid desiccant (227) is introduced in the desiccant regenerator (216) by operating the liquid desiccant pump (224). The rate of liquid desiccant regeneration can be varied by varying the flow of coolant into the desiccant regenerator (216) and the flow of low concentration liquid desiccant. Water produced in the fuel cell cathode (213) and the water removed by the liquid desiccant is recovered in the water recovery system (217). Water is accumulated in the water container (218) and high concentration liquid desiccant is accumulated in the high concentration liquid desiccant container (221). When accumulating high concentration liquid desiccant, the high concentration liquid desiccant pump (223) does not operate Of operates at a rate that it conveys high concentration liquid desiccant at a rate lower than the rate at which it flows into the high concentration liquid desiccant container (221). in this way, the thermal energy produced by the fuel cell (18) is stored, enabling a decoupling of the fuel cell electrical power output from the cooling capacity of the air conditioning subsystem (32).

Alternatively, the air conditioner (32) can operate at a higher cooling capacity than normal when the heat of the fuel cell (18) is dissipated. This is done by using the high concentration liquid desiccant pump (223) to feed the liquid desiccant in the high concentration liquid desiccant container (221) to the air conditioning dehumidifier (220) at a higher flow rate than the flow rate of high concentration liquid desiccant (226) leaving the water recovery system (217). In this case, low concentration liquid desiccant is accumulated in the low concentration liquid desiccant container (219).

This type of approach is also applicable to the system shown in FIG. 34. As will be understood, while FIG. 34 focuses on liquid desiccant regeneration, high concentration liquid desiccant from the high concentration liquid desiccant reservoir (3004, 62) could be directed to a liquid desiccant air conditioning system with the used resulting low concentration liquid desiccant being fed into the low concentration liquid desiccant reservoir (3001/64). As shown in FIG. 34, the system enables partial decoupling of engine power generation (68) with liquid desiccant enhanced evaporative cooling (air conditioning 32). In this embodiment, electricity generation (68) from the engine (3005) can continue whether the air conditioning process is operating or suspended. The heat generated (3006, 3013) by the engine (3005) is stored in the form of high concentration liquid desiccant, which is stored in the high concentration liquid desiccant reservoir (3004, 64). The process of operating the engine (3005, 18) and of liquid desiccant regeneration produces water, which is stored in a water reservoir (3020, 54). Because water is used to cool air through evaporative cooling, the storage of water is another form of storing the heat energy produced by the engine (3005).

The liquid desiccant regeneration rate can be controlled by changing the engine's (3005, 18) rate of electricity generation (68), and/or rate of heat generation (3006, 3013). The rate of liquid desiccant regeneration can also be varied by changing the flow rate of low concentration liquid desiccant (3002, 14) into the HMX (3015). The concentration of high concentration liquid desiccant can also be varied by either changing the temperature of the hot coolant (3006) flowing into the HMX (3015). The hot coolant (3006) temperature can be increased by reducing its flow rate while maintaining the engine (3005) operating at a constant heat output. Higher hot coolant (3006) temperature results in higher liquid desiccant concentrations.

Alternatively or concurrently, the concentration of the high concentration liquid desiccant (3003, 16) can be changed by changing the flow rate or temperature of the warm carrier air (3009).

Water recovery rate can also be changed by varying carrier air (3010) humidity, temperature and flow rate, as well as, engine exhaust (3013) temperature and flow rate. Water recovery rates can also be varied by changing outside air (3018) flow rate through the condenser (3017). The optimization of these variables is executed by an energy management system (3070/70). The energy management system (3070/70) can be in communication with the various pumps, controls, engines, etc., that comprise the overall liquid desiccant regeneration and liquid desiccant consumption (e.g., liquid desiccant air conditioner) system.

The stored water and high concentration liquid desiccant can be used to drive desiccant enhanced evaporative cooling air conditioning system (32). The energy management system can therefore optimize engine electricity production, concentration of high concentration liquid desiccant, rate of high concentration liquid desiccant storage, and rate of water recovery, based on optimization of the economic benefit of the system to the user on a daily or hourly basis. Thus, an energy management subsystem (70) can be present in any or all of the systems described herein.

The decoupling of the desiccant regenerator 12 and the air conditioning system 32 can be particularly beneficial because air humidity generally rises at night as temperature drops. This makes the conditions ideal for recovery of water while using the high concentration liquid desiccant principally to dehumidify air. During the middle of the day, temperature tends to rise but humidity drops. This means that the system could be optimized to provide greater cooling during the day using water stored during the evening when higher relative humidity conditions exist. The optimization by the energy management system (3070/70) can be based on actual or anticipated sensible and latent head load in the building combined with actual and anticipated outside air humidity and temperature.

The following provides a variety of embodiments of a liquid desiccant regeneration system as described herein. Although discussed in different groups, it should be understood that each is consistent with the spirit of the disclosure and various unit operations from one embodiment can be exchanged with, added to, or taken from another embodiment.

As used herein, "conduit" and "duct" each have their standard meanings and include hollow solids, including pipes, tubes, conduits, rectangular solids, and other structures that a fluid can flow through.

As used herein, "contact" has its standard meaning and includes where materials within different ducts are in thermal or fluid communication through a common wall or membrane. For example, two ducts would be in contact where they contain fluids on opposite sides of a micro-porous membrane or where they contain fluids on opposite sides of a thermally-conductive, impermeable wall (e.g., a metal wall).

As used herein, "fluid communication" includes connected as part of the fluid flow of the system. When used generally, fluid communication relates to either a direct fluid connection where two points are directly connected by ducts, pipes, conduits, or tubes, and indirect fluid communication where two points are separated by one or more unit operation, including, but not limited to, a heat exchanger, a fuel cell, a dehumidifier, a radiator, a holding tank, etc. As used herein, "in fluid communication" refers to in fluid communication in the direction of flow of fluid through the system. Thus, unless there is a loop the outlet of a tube cannot be in fluid communication with the inlet of the same tube.

First Discussion

FIGS. 2-5 show an embodiment in which the fuel cell (207) is composed of its principal elements, an anode section (212), a cathode section (213) and a cooling plate (214). The fuel cell cathode (213) is fed with outside air or another oxygen source. The cathode exhaust (21b) is oxygen depleted air with high humidity. The fuel cell (207) also contains a cooling plate (214) in which coolant from a coolant container (215) is flowed. The fuel cell coolant enters the fuel cell cooling plate (214) at a relatively low temperature and exits at a high temperature, almost equivalent to the operating temperature of the fuel cell (207). This temperature can range between 40° C. to 120° C. The hot fuel cell coolant is used to heat up low concentration liquid desiccant (227) originating from a low concentration liquid desiccant container (219). This heating process occurs in the desiccant regenerator (216). As the liquid desiccant is heated, its solubility in water is reduced, therefore water is released and the liquid desiccant concentration increases. The water released from the liquid desiccant is captured using high humidity cathode exhaust air in the water recovery system (217). The high humidity cathode exhaust is at a temperature similar to the operating temperature of the fuel cell, therefore it aids in maintaining the liquid desiccant warm at a temperature ranging between 40° C. to 160° C. and at a low solubility point. Water is diffused from the liquid desiccant to the high humidity cathode exhaust. Since the high humidity cathode exhaust air is at or close to 100% relative humidity, the water released by the liquid desiccant condenses along with the water in the air. Water condensation is captured and transferred to a water container (218). The water recovery system may also include a radiator further cools the air in the water recovery system (217), resulting in further release of water. The liquid desiccant exiting the water recovery system (217) is at high concentration and is stored in the high concentration liquid desiccant container (221). Note that water release from the desiccant and water vapor condensation are both endothermic processes, which result in cooling down of the liquid desiccant in the water recovery system (217).

High concentration liquid desiccant flows from the high concentration liquid desiccant container (221) through a pump (223) to an air conditioning dehumidifier (20) that forms part of the desiccant air conditioning system (32). Outside air, that is warm and humid, enters the air conditioning dehumidifier. The air conditioner dehumidifier enables fluid contact between the water in the air and the high concentration liquid desiccant. The high concentration liquid desiccant absorbs the water in the air, substantially reducing air humidity. Although this process is exothermic, the exothermicity occurs at the surface of the desiccant, where humidity absorption occurs. Since the liquid desiccant has a specific heat, the rise in temperature is low, which reduces the elevation of air temperature. The air exiting the air conditioning dehumidifier (220) has low humidity and a temperature similar to the outside air temperature. This air is then cooled using a sensible heat coil (222) to an appropriate temperature for introduction into the air conditioned space, thus resulting in conditioned low humidity cold air (211). The liquid desiccant leaving the air conditioning dehumidifier is of low concentration (i.e., is diluted), since it has absorbed a substantial amount of water vapor. This low concentration liquid desiccant flows to a low concentration liquid desiccant container (219). Note that in this embodiment cooling that occurs in the sensible heat coil is aided through the introduction of water transported by pump (225) from the water container (218). This water is used to create evaporative cooling of a portion or all of the low humidity air.

Note that although FIG. 2 represents each of these components separately, this is done for illustration purposes only, as FIG. 2 is describing functions not independent and distinct components. Case in point, the air conditioning dehumidifier (220) can be coupled with the sensible heat coil (222). In doing this, the liquid desiccant and the air can be cooled as dehumidification occurs, increasing the effectiveness of the process (low temperature liquid desiccant has higher water solubility). Examples of combined functions include the heat and muss exchange (HMX) devices described herein, including the embodiments shown in FIGS. 6 (element 1166), 12 (element 1166), and others.

Figure 3:
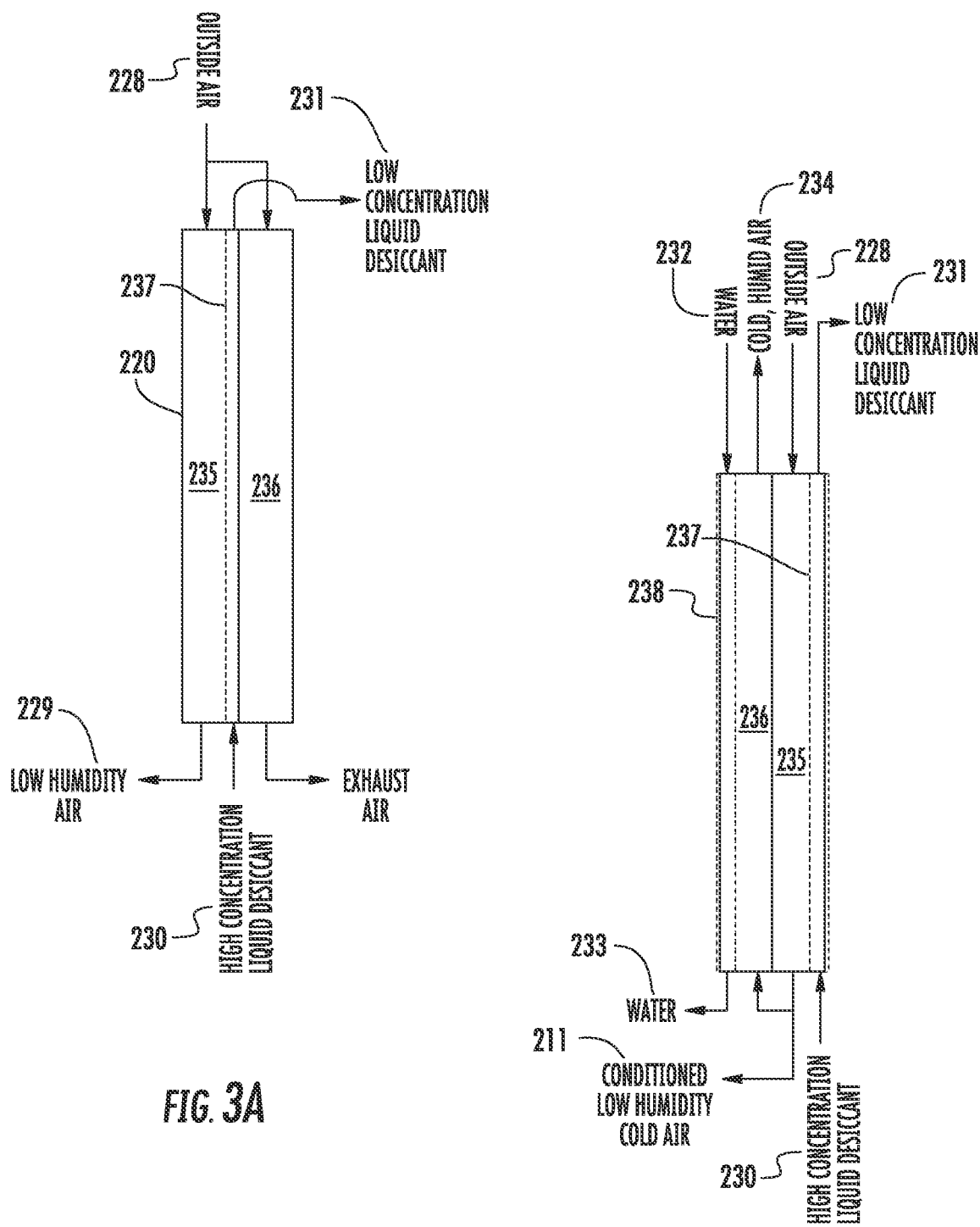

Embodiments of the air conditioning dehumidifier (220) and of a coupled air conditioning dehumidifier (220) and sensible heat coil (222) are shown in FIG. 3, A and B, respectively. In FIG. 3A, outside air (228) enters the air conditioning dehumidifier (220) in a chamber that is in fluid connection with water from a liquid desiccant through a water vapor permeable barrier (237). The water vapor permeable barrier only allows transfer of water and water vapor between the liquid desiccant and the air. The high concentration liquid desiccant (230) flow behind this water vapor permeable barrier (237) absorbs water from the air and exits with a reduced concentration (231). The chamber in which the liquid desiccant flows is backed with a barrier with high thermal conductivity that allows conductive heat transfer between the liquid desiccant flow and outside air (228) flowing in a chamber (236). In this manner, outside air (228) cools the liquid desiccant preventing temperature increase and increasing the effectiveness of air dehumidification. The general architecture described in FIG. 3A can be achieved through repeating plates in a stacked arrangement or through a shell and tube design.

FIG. 3B shows an embodiment in which the air conditioning dehumidifier (220) is coupled with the sensible heat coil (222) to increase the effectiveness of the air dehumidification process. In this case, outside air (228) flows into the dehumidification chamber (235). The water from the air and the liquid desiccant is in fluid connection through a water vapor permeable barrier (237) that only allows water to flow. High concentration liquid desiccant (203) flows on the other side of the micro-porous barrier (237) and absorbs water from the air thereby reducing the liquid desiccant concentration (231). The dehumidification chamber is in thermal connection with an evaporative cooling chamber (236). In the evaporative cooling chamber a portion or all of the low humidity air leaving the dehumidification chamber (235) is flowed through the evaporative cooling chamber. Water (232) is also flowed in the evaporative cooling chamber within a water vapor permeable barrier that only allows transfer of water or water vapor to the air flowing in the evaporative cooling chamber (236). As water is absorbed by the low humidity air, its temperature decreases and the air reaches close to 100% relative humidity. As air is being cooled, it also absorbs heat from the air being dehumidified in the air dehumidifier (235). The process of cooling air as it is being dehumidified increases the effectiveness of the dehumidification process. The process of heating air as it is being humidified increases the effectiveness of the process. Therefore, the architecture shown in FIG. 3B exhibits a higher effectiveness than if evaporative cooling and air dehumidification were being conducted separately.

The embodiment of FIG. 3B can be constructed in a stack arrangement or in a tube and shell arrangement. More detailed configurations of these heat and mass exchange (HMX) components can be found throughout this disclosure.

Figure 4:
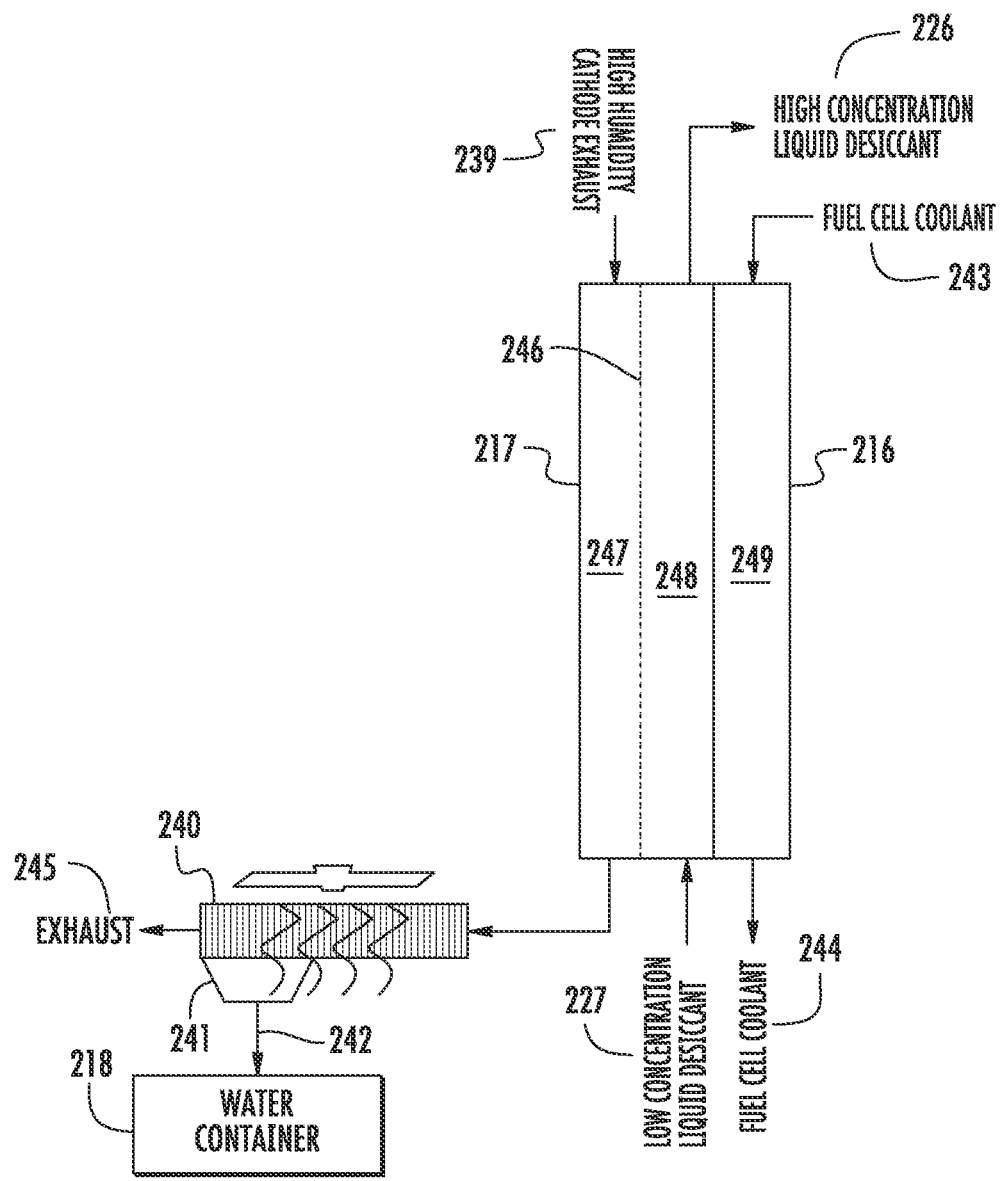
FIG. 4 shows a diagram of a combined liquid desiccant regenerator and water recovery system.

Similarly, the desiccant regenerator (216) and the water recovery system (217) can be made part of a single component that enhances the effectiveness of heat transfer and water transfer processes. An embodiment of this type of integration is shown in FIG. 4, where low concentration liquid desiccant (227) flows into a regeneration chamber (248). The regeneration chamber (248) is thermally connected to a chamber (249) in which the coolant leaving the fuel cell (243) is flowing. The fuel cell coolant (243) heats the liquid desiccant (227) reducing its water solubility, and thus increasing its concentration. The regeneration chamber is in thermal and fluid connection with a water recovery chamber (247). Additionally, these two chambers are separated by a water vapor permeable barrier (243) that only allows passage of water between fluids in the water recovery chamber (247) and the regeneration chamber (248). High humidity cathode exhaust (239) flows through the water recovery chamber, heating the liquid desiccant and collecting water. As humidity in the water recovery chamber (247) reaches saturation, water condensation results. Air and water leaving the water recovery chamber is passed through a radiator that cools the air below its dew point and releasing additional liquid water. The liquid water is collected in a receptacle (241) and then flowed into the system's water container (218). This general structure maintains the liquid desiccant warm throughout the regeneration process and throughout the process of humidification and condensation of water using cathode air. Both of these processes are endothermic. The design of this integrated desiccant regenerator (216) and water recovery system (217) can be executed using repeating cells in a stack or through the use of shell and tube design.

Figure 5:
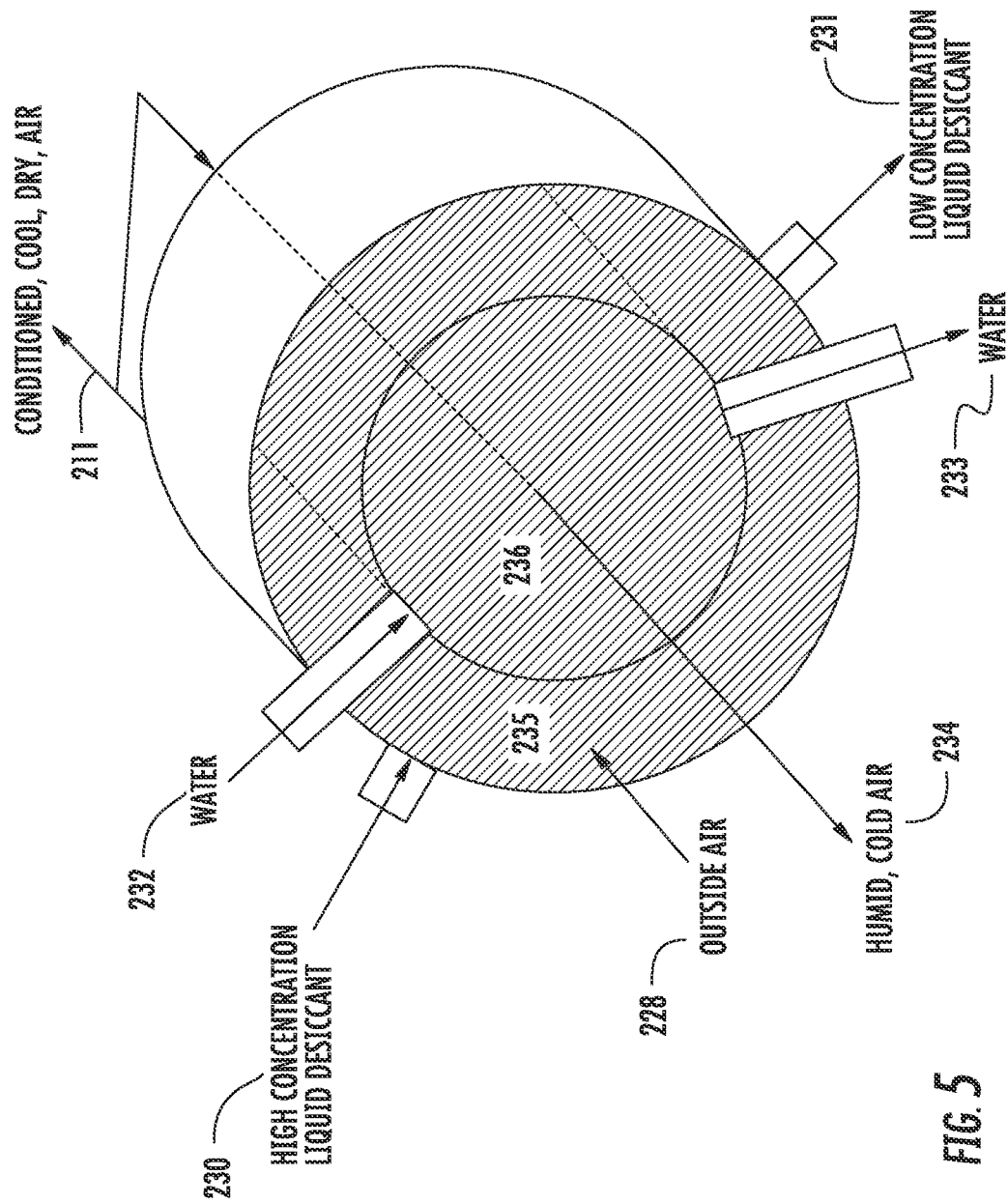
FIG. 5 shows one shell and tube heat and mass exchange system that can be used for cooling and dehumidification.

An example of a shell and tube design for the air conditioning dehumidifier and the sensible heat coil is shown in FIG. 5, where outside air flows within a multitude of water vapor permeable conduits that run the length of an enclosed cylindrical annulus. The water vapor permeable conduits are only permeable to water and water vapor and do not allow leakage of liquid desiccant into the air. In the same cylindrical annulus, high concentration liquid desiccant (230) is flowed. The liquid desiccant absorbs water from the air as it flows on the outside of the water vapor permeable conduits and leaves the cylindrical annulus with a low concentration liquid desiccant (232). Air leaving (211) the air dehumidification cylindrical annulus (235) is dry. A portion of this air (211) is redirected to flow within a multitude of water vapor permeable conduits within a cylindrical enclosure (236) in thermal connection and embedded (or forming part of) the cylindrical annulus where air being dehumidified (235). Water (232) is flowed through the external portion of the multiple water vapor permeable conduits within which dry air flows. In this way, the air is cooled as it is humidified. The cool air and water in the internal cylindrical chamber absorb heat from the outer cylinder dropping the temperature of the air leaving it (211). Note that the structure of flow could be reversed in order to enhance heat transfer and reduce pressure drops depending on the application. For example, water in the inner cylindrical chamber (236) could flow within the, water vapor permeable conduits and air could flow externally.

Second Discussion

A combined air conditioning power generation system is disclosed. The system includes a closed loop liquid desiccant system that utilizes exhaust from the fuel cell to regenerate liquid desiccant used to dehumidify air being supplied to a space to be air conditioned. Water from the fuel cell exhaust and the liquid desiccant regeneration is also used to provide evaporative cooling to the air conditioning system. Power generated by the fuel cell is used to power the air conditioner, the building being cooled and, where excess power is produced, the power can be sold back to the power grid or stored for future use (e.g., in batteries, capacitors, etc.).

Figure 6:
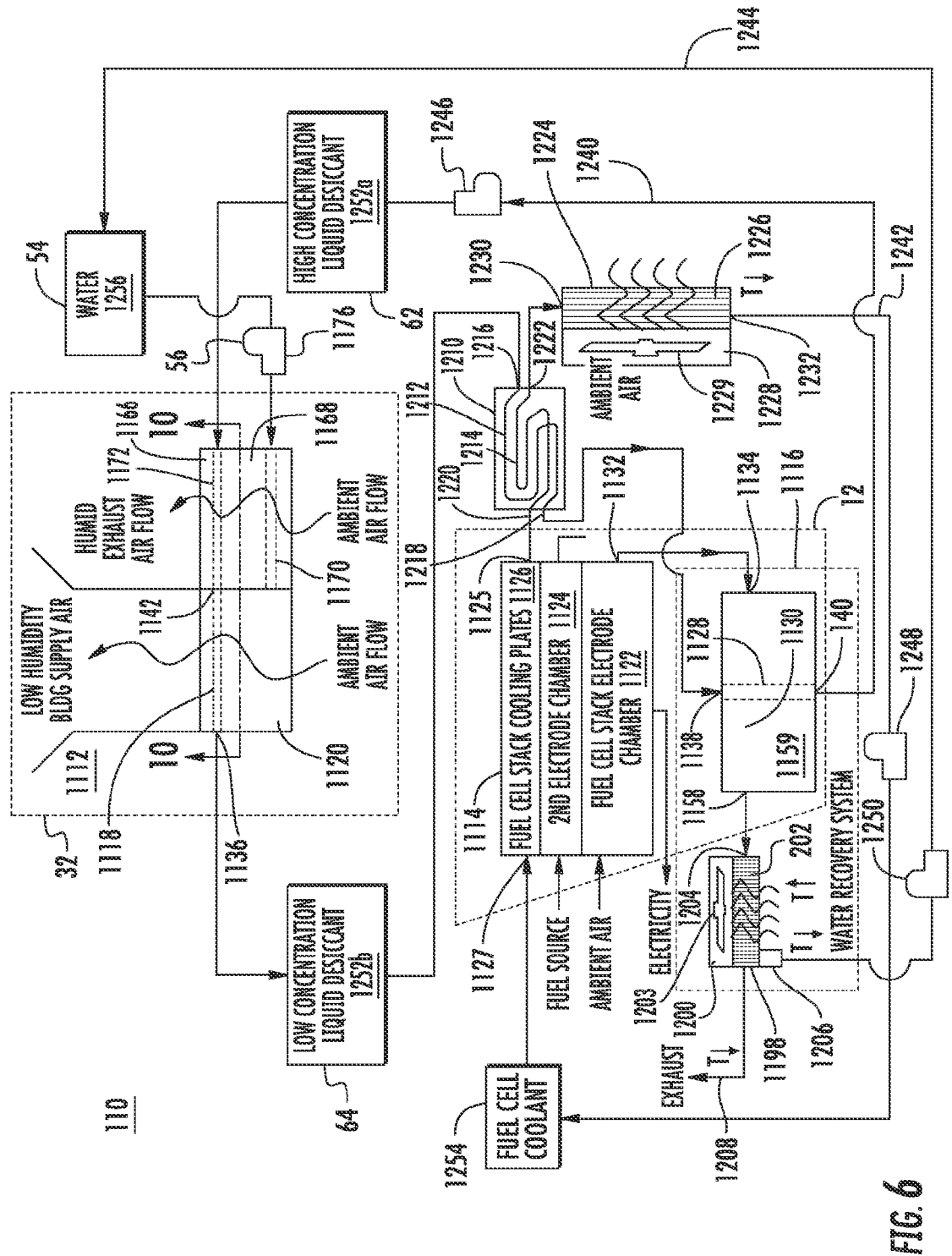
FIG. 6 is a diagram of a liquid desiccant regeneration and dehumidification system as described herein.
Figure 12:
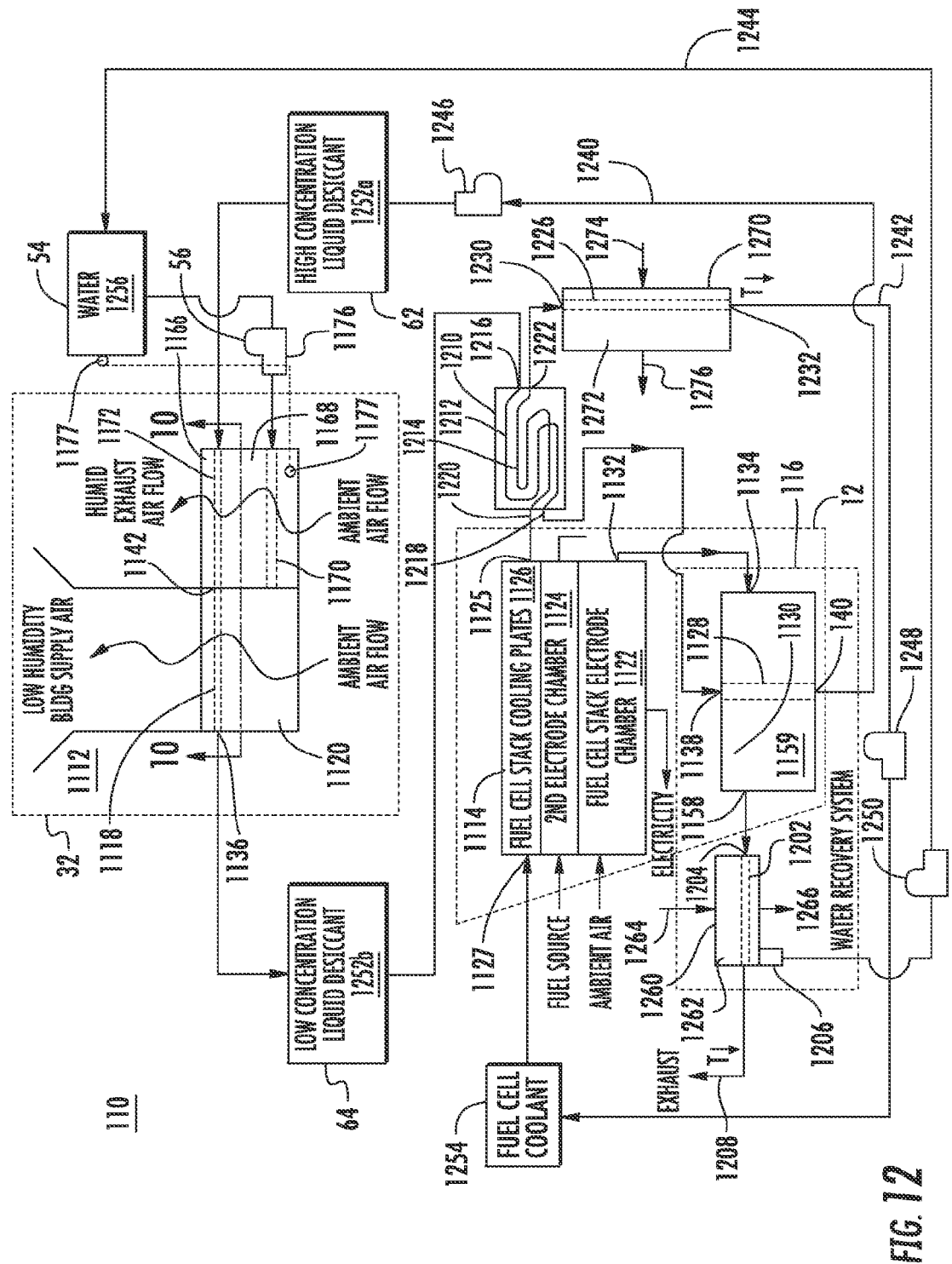
FIG. 12 is a diagram of a liquid desiccant regeneration and dehumidification system as described herein.
Figure 13:
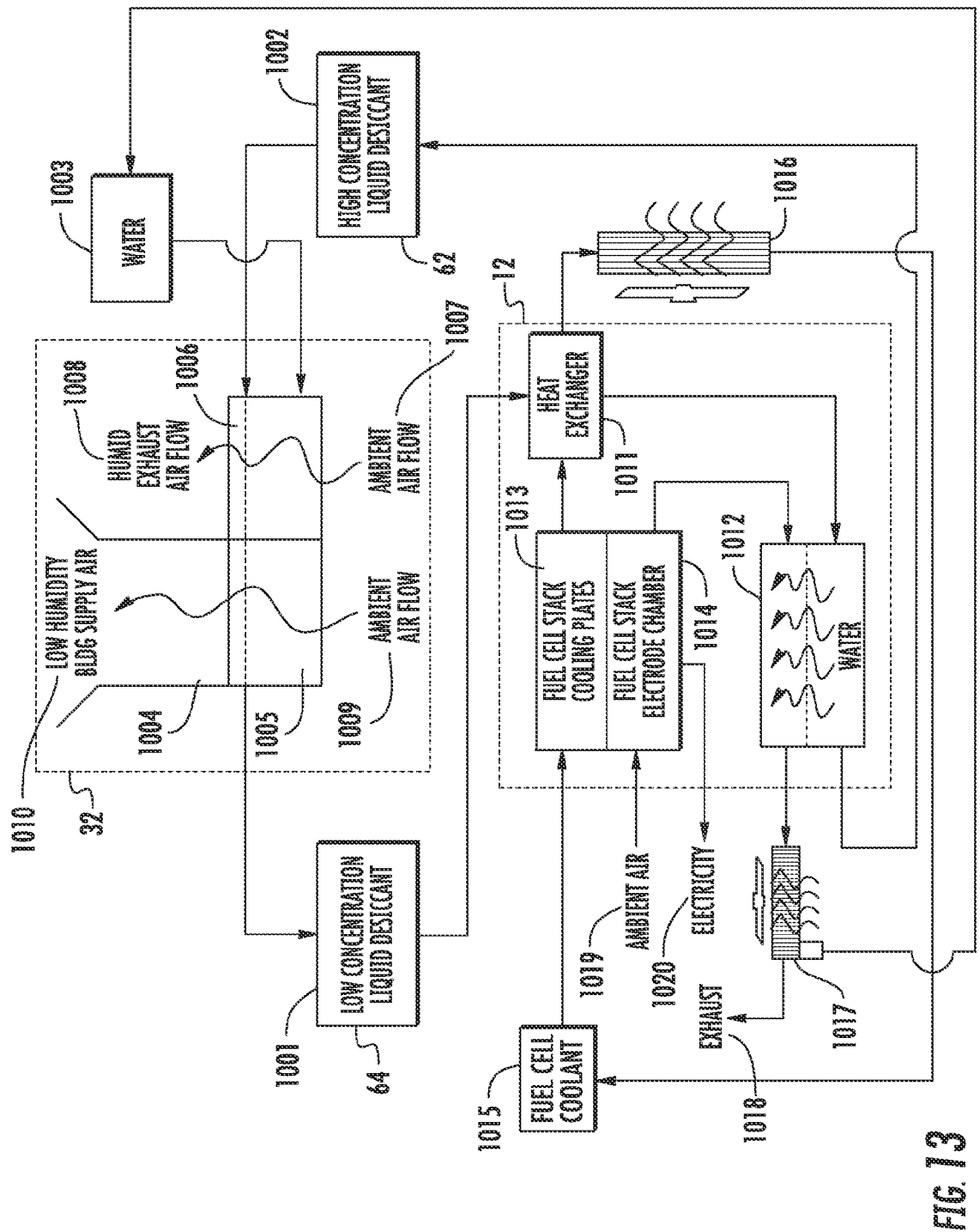
FIG. 13 is a diagram of a liquid desiccant regeneration and dehumidification system as described herein.

While FIGS. 13-18, FIGS. 6-11, and FIG. 12 are described using different reference numbers, it should be understood that FIGS. 13 and 6 (and 12) relate to substantially identical embodiments. Thus, where a discussion of FIGS. 13-18 relate to an equivalent structure of FIGS. 6-11, it should be understood that the description is equally applicable to the corresponding structure of FIGS. 6-11, and vice versa. For example, the dehumidifier 1004 of FIG. 13 corresponds with the dehumidifier 112 of FIG. 6; the evaporative cooling chamber 1006 of FIG. 13 corresponds to the evaporative cooling unit 1166 of FIG. 6; the heat exchanger 1011 of FIG. 13 corresponds to the heat exchanger unit 1210 of FIG. 6; the fuel cell components 1013/1014 of FIG. 13 correspond to the fuel cell 1114 of FIG. 6; the water recovery device 1012 of FIG. 13 corresponds to the desiccant regeneration unit 1159 of FIG. 6; the radiator 1017 of FIG. 13 corresponds to the WR radiator 1198 of FIG. 6; the radiator 1016 of FIG. 13 corresponds to the fuel cell coolant radiator 1224 of FIG. 6, the low concentration liquid desiccant tank 1001 (64) of FIG. 13 corresponds to the low concentration liquid desiccant storage 1252*b* (64) of FIG. 6; the high concentration liquid desiccant tank 1002, (62) of FIG. 13 corresponds to the high concentration liquid desiccant storage 1252*a* (62) of FIG. 6; and the water storage tank 1003 (54) of FIG. 13 corresponds with the water tank 1256 (54) of FIG. 6. Similar correlations can be made with respect to FIG. 12.

As shown in FIGS. 6-11, the combined air conditioning power generation system 1110 can include a dehumidifier 1112, a fuel cell 114, and a water recovery (WR) unit 1116. The dehumidifier 1112 can include a dehumidifier desiccant duct 1118 that contacts a dehumidifier air duct 1120. The fuel cell 1114 can include a first electrode chamber 1122, a second electrode chamber 1124, and fuel cell stack cooling plates 1126. The fuel cell stack cooling plates 1126 can be in thermal communication with the first and/or second electrode chambers 1122, 1124. In some embodiments, the first electrode 1122, is a cathode and the second electrode 1124 is an anode, while the first electrode 1122 is an anode and the second electrode 1124 is a cathode in other embodiments.

The water recovery (WR) unit 1116 can include a WR desiccant duct 1128 that contacts a WR air duct 1130. in some embodiments, the outlet 1132 of the first electrode chamber 1122 (e.g., a cathode chamber or an anode chamber) can be in fluid communication with an inlet 1134 of the WR air duct 1130. In some embodiments, such as a solid oxide fuel cell (SOFC), the first electrode chamber 1122 can be an anode chamber, while the first electrode chamber 1122 can be a cathode chamber in other embodiments. In some embodiments, the outlet 1136 of the dehumidifier desiccant duct 1118 is in fluid communication with the inlet 1138 of the WR desiccant duct 1128. In some embodiments, the outlet 1140 of the WR desiccant duct 1128 is in fluid communication with an inlet 1142 of the dehumidifier desiccant duct 1118. Examples of fuel cells useful in the system 1110 include, but are not limited to, proton exchange membrane fuel cells, direct methanol/ethanol fuel cells, phosphoric acid fuel cells, solid oxide fuel e and molten carbonate fuel cells.

In some embodiments, a first duct can be in contact with a second duct, where the first duct passes through the second duct or the second duct passes through the first duct. In some embodiments, the first duct can pass through the second duct and the direction of fluid flow in first duct can be approximately perpendicular to the direction of fluid flow in the second duct. Such arrangements may apply to any ducts in contact with one another disclosed herein.

Figure 7:
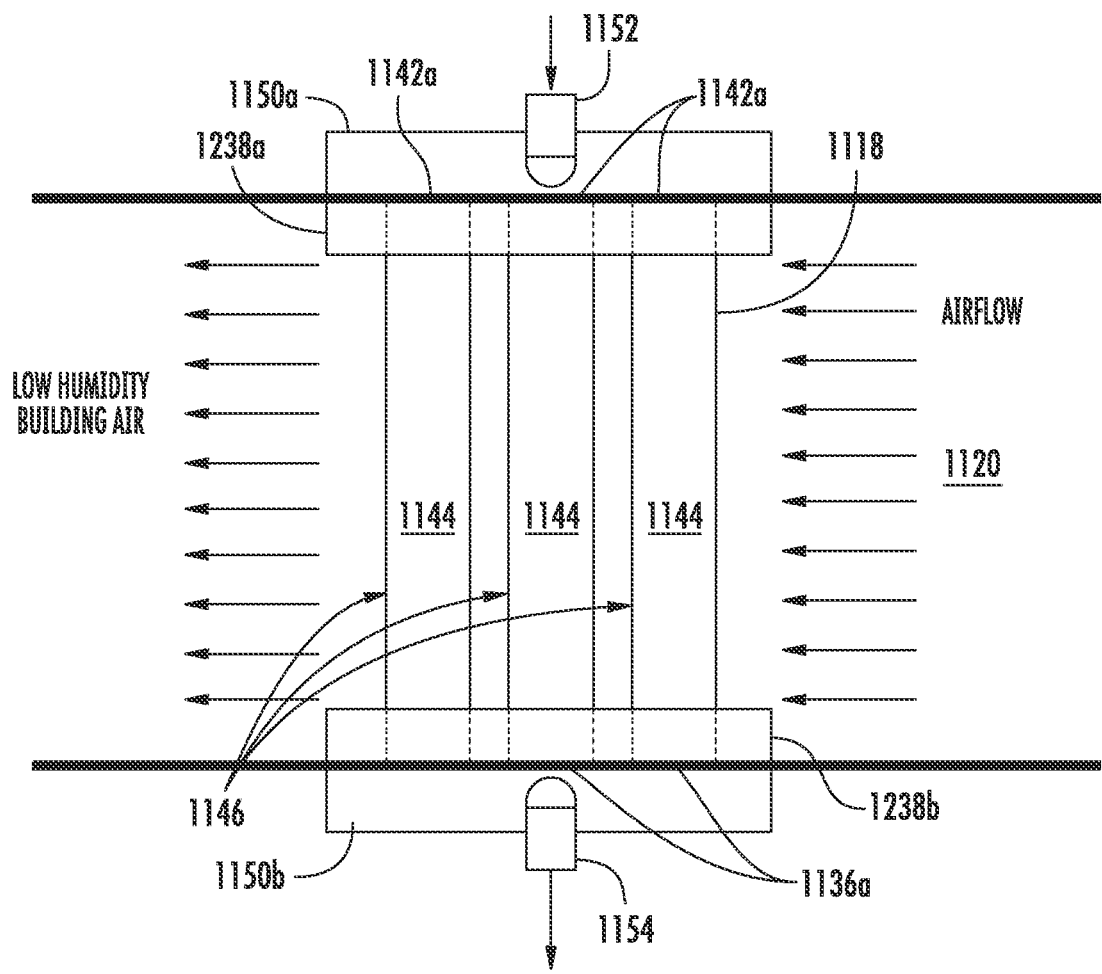
FIG. 7 is a diagram of a dehumidifier as described herein.

In some embodiments, the dehumidifier desiccant duct 1118 can pass through the dehumidifier air duct 1120. As shown in FIG. 7, in some embodiments, the dehumidifier desiccant duct 1118 can include one Of a plurality of dehumidifier desiccant conduits 1144. In some embodiments, the direction of flow of the at least one de humidifier desiccant tube 1144 is angled relative to the direction of flow of the dehumidifier air duct 1120. In some embodiments, the direction of flow of the at least one dehumidifier desiccant tube 1144 is approximately perpendicular (e.g., 90°±10°, or 90°±5°, or 90°±2.5°) to the direction of flow of the dehumidifier air duct 1120. In some embodiments, the dehumidifier desiccant duct 1118 includes a plurality of dehumidifier desiccant conduits 1144, which may be staggered across the dehumidified air duct 1120, as shown in FIG. 7 (similar arrangements are shown in FIGS. 8-11).

In some embodiments, the dehumidifier desiccant duct 1118 comprises a plurality of dehumidifier desiccant conduits 1144, and the dehumidifier 1112 further includes a dehumidifier desiccant header 1150a in fluid communication with inlets 1142a of the plurality of dehumidifier desiccant conduits 1144. In some embodiments, the inlet 1152 of the dehumidifier desiccant header 1150a is in fluid communication with the outlet 1140 of the WR desiccant duct 1128.

In some embodiments, the dehumidifier further includes a dehumidifier desiccant header 1150b in fluid communication with outlets 1142b of the plurality of dehumidifier desiccant conduits 1136a. in some embodiments, the outlet 1154 of the dehumidifier desiccant header 1150b is in fluid communication with the inlet 1138 of the WR desiccant duct 1128.

In some embodiments, the dehumidifier desiccant duct 1118 and the dehumidifier air duct 1120 are on opposite sides of, or share a common wall comprising, a dehumidifier membrane 1146. In some embodiments, the dehumidifier membrane 1146 is permeable to water vapor, but otherwise does not allow the transport of liquids from one side of the dehumidifier membrane 1146 to the other. Such water vapor permeable membranes and their properties are described throughout this disclosure.

In some embodiments, the dehumidifier membrane 1146 allows water vapor in the air within the dehumidifier air duct 1120 to cross the dehumidifier membrane 1146 and pass into a desiccant stream within the dehumidifier desiccant duct 1118. In some embodiments, as a result of water vapor passing from the air in the dehumidifier air duct 1120 into the dehumidifier desiccant duct 1118, the liquid desiccant stream exiting the dehumidifier desiccant duct 1118 has a lower concentration of desiccant (higher concentration of water) than the liquid desiccant stream entering the dehumidifier desiccant duct 1118, and the air stream exiting the dehumidified air duct 1120 has a lower humidity than the air stream entering the dehumidified air duct 1120. The system 1110 can be operated so that the contents of the dehumidifier desiccant duct 1118 do not pass through to the air in the dehumidifier air duct 1120.

In some embodiments, the water recovery unit 1116 includes a desiccant regeneration unit 1159 that includes the WR desiccant duct 1128 and the WR air duct 1130. In some embodiments, the WR desiccant duct 1128 and the WR air duct 1130 are on opposite sides of, or share a common wall comprising, a WR membrane 1148. In some embodiments, the WR membrane 1148 is permeable to water vapor, but otherwise does not allow the transport of liquids from one side of the WR membrane 1148 to the other. For instance, the WR membrane 1148 can allow water in a desiccant stream within the WR desiccant duct 1128 to cross the WR membrane 1148 and pass into the cathode exhaust stream within the WR air duct 1130.

In some embodiments, the WR membrane 1148 allows water from the WR desiccant duct 1128 to cross the WR membrane 1148 and pass into the exhaust stream within the WR air duct 1130. in some embodiments, as a result of water vapor passing from the liquid desiccant in the WR desiccant duct 1128 into the WR air duct 1130, the liquid desiccant stream exiting the WR desiccant duct 1118 has a higher concentration of desiccant (lower concentration of water) than the liquid desiccant stream entering the WR desiccant duct 1128, and the exhaust stream exiting the WR air duct 1130 has a higher humidity or water content than the exhaust stream entering the WR air duct 1130. The system 1110 can be operated so that only water vapor passes from the WR desiccant duct 1128 to the WR air duct 1130.

Figure 8:
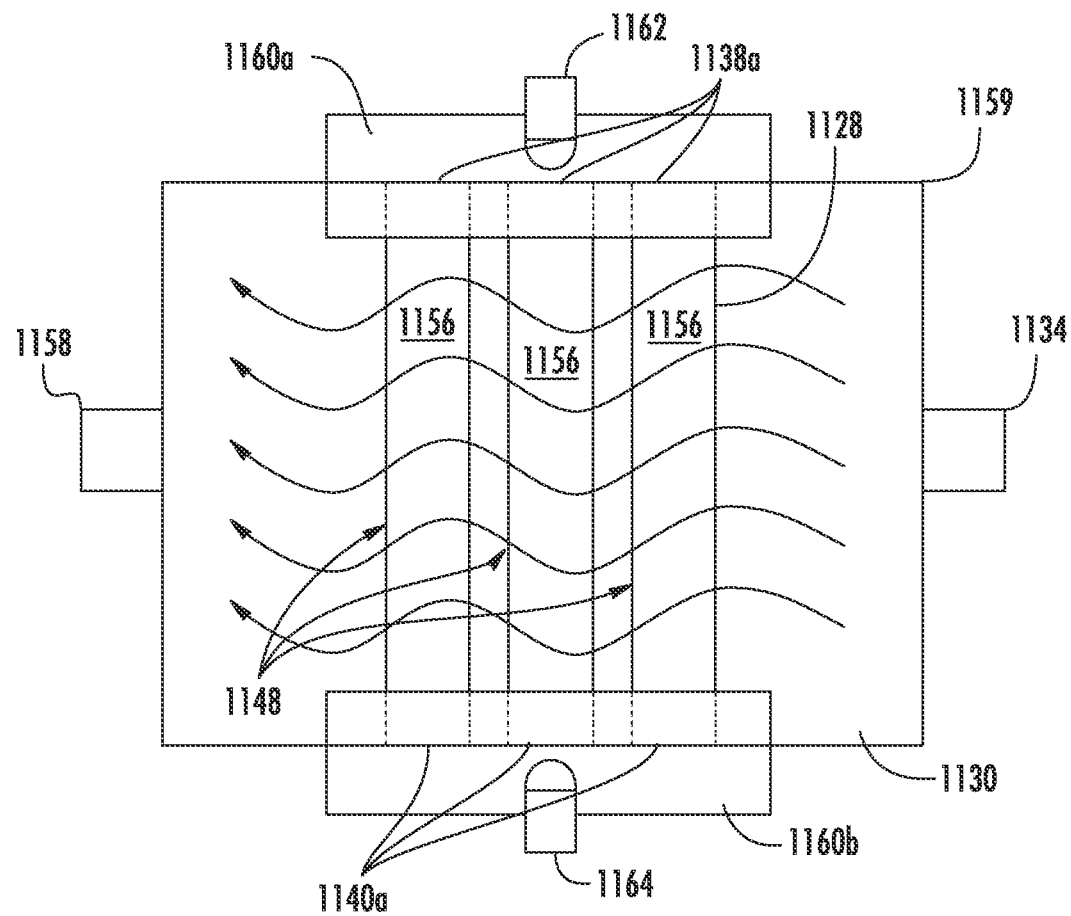
FIG. 8 is a diagram of a portion of a water recovery stage as described herein.

In some embodiments, the WR desiccant duct 1128 can pass throughout the WR air duct 1130. As shown in FIG. 8, in some embodiments, the WR desiccant duct 1128 can include a plurality of WR desiccant conduits 1156. In some embodiments, the direction of flow of the at least one WR desiccant tube 1156 is angled relative to the direction of flow of the WR air duct 1130. In some embodiments, the direction of flow of the at least one WR desiccant tube 1156 is approximately perpendicular (e.g., 90°±10°, or 90°±5°, or 90°±2.5°) to the direction of flow of the WR air duct 1120. In some embodiments, the WR desiccant duct 1128 includes a plurality of dehumidifier desiccant conduits 1156, which may be staggered across the dehumidified air duct 1130, as shown in FIG. 8 (similar arrangements are shown in FIGS. 7 and 9-11).

In some embodiments, the WR desiccant duct 1128 comprises a plurality of WR desiccant conduits 1156, and the system 1110 includes a WR desiccant header 1160a in fluid communication with inlets 1138a of the plurality of WR desiccant conduits 1156. In some embodiments, the inlet 1162 of the WR desiccant header 1160a is in fluid communication with the outlet 1136 of the dehumidifier desiccant duct 1118.

As shown in FIG. 8, in some embodiments, the system also includes a WR desiccant header 1160b in fluid communication with outlets 1140b of the plurality of dehumidifier desiccant conduits 1156. in some embodiments, the outlet 1164 of the WR desiccant header 1160b is fluid communication with the inlet 1142 of the dehumidifier desiccant duct 1118.

Figure 9:
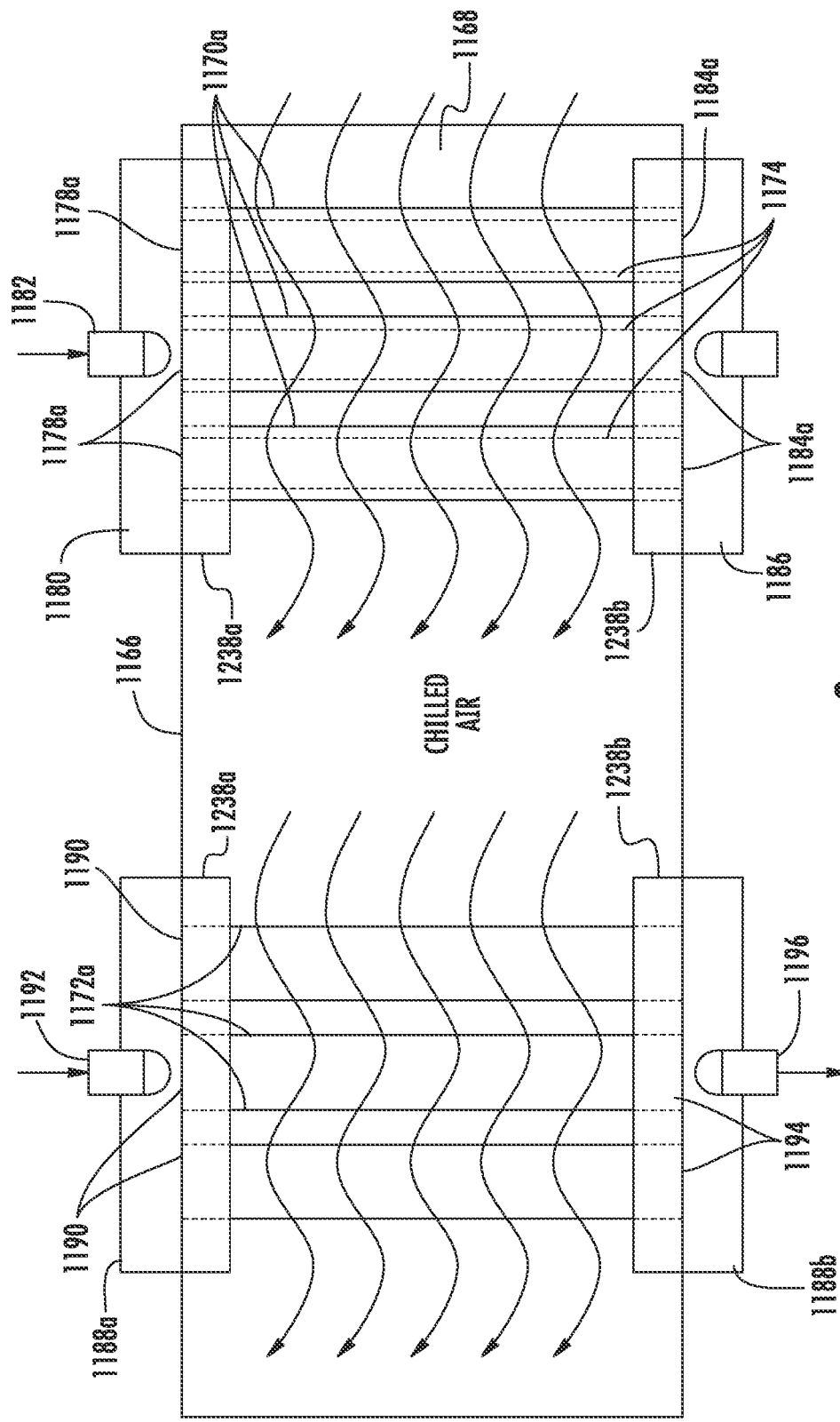
FIG. 9 is a diagram of a portion of an evaporative cooling stage as described herein.

As shown in FIG. 9, in some embodiments, the combined air conditioning, power generation system 1110 includes an evaporative cooling (EC) unit 1166 that includes an EC air duet 1168 for contacting cooling air with an EC water duct 1170 and an EC desiccant duct 1172. In some embodiments, the EC water duct(s) 1170 and the EC desiccant duct(s) 1172 are arranged so that fluid in the EC air duct 1168 encounters the EC water duct(s) 1170 and the EC desiccant duct(s) 1172 sequentially. In some embodiments, the EC water duct(s) 1170 and the EC desiccant duct(s) 1172 are interspersed.

Figure 33:
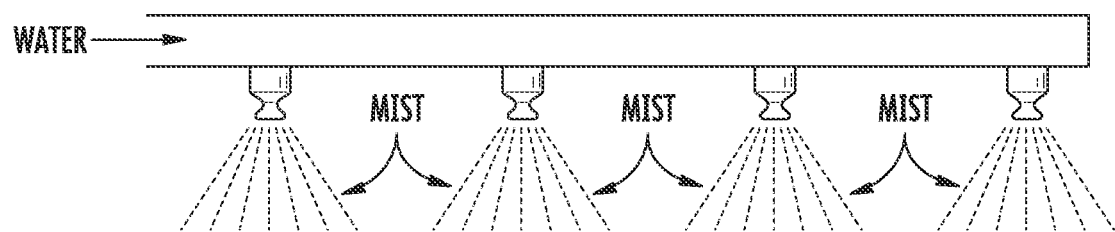
FIG. 33 is a diagram of a misting device as disclosed herein.

The EC water duct 1170 can transfer water droplets or vapor into cooling air passing through the EC air duct 1168 in order to provide psychrometric or evaporative cooling of the cooling air. For example, in some embodiments, the EC water duct 1170 can include an EC membrane 1174 that is permeable to water vapor for providing evaporative cooling of the cooling air passing through the EC air duct 1168. In other embodiments, the EC water duct 1170 can spray droplets of water into the cooling air passing through the EC air duct 1168. An example of such a sprayer is shown in FIG. 33. In some embodiments, the EC water duct 1170 can include a plurality of EC water conduits 1170a. In some embodiments the EC water duct 1170 can be adapted to allow water to flow on the exterior portion of the EC water duct 1170 (e.g., orifices positioned along an upper portion of the EC water duct 1170).

In some embodiments, the only outlet of the EC water duct 1170 is through nozzles or the walls of the EC water duct (e.g., through orifices or the EC membrane 1174). In some embodiments, the system 1110 also includes an EC water pump 1176 in fluid communication with the EC water duct 1170 for maintaining a target pressure within the EC water duct 1170. This allows the system to control the amount of psychrometric cooling utilized in the evaporative cooling unit 1166. The pressure maintained in the EC water duct 1170 should be sufficient to cause a desired amount of water molecules to pass into the EC air duct 1168. In some embodiments, the EC water pump 1176 is controlled using level sensor(s) or switch(es) 1177 which maintains a certain water level corresponding to a certain water flow.

In some embodiments, such as the one shown in FIG. 9, the EC desiccant duct 1172 can be one or more EC desiccant conduits 1172a. In some embodiments, the walls of the EC desiccant conduits 1172a can have a high thermal conductivity and be impermeable to the desiccant stream and the water in the air stream. This allows the chilled air that has undergone evaporative cooling as a result of the water released by the EC water duct 1170 to cool the desiccant stream in the EC desiccant duct 1172 before it enters the dehumidifier 1112.

In some embodiments, an inlet 1178, 1178a of the EC water duct 1170 can be in fluid communication with an outlet 1158 of the WR air duct 1130.

In some embodiments, the evaporative cooling unit 1166 can also include an EC water header 1180 in fluid communication with inlets 1178a of the plurality of EC water conduits 1170a. In some embodiments, an inlet 1182 of the EC water header 1180 is in fluid communication with the outlet 1158 of the WR air duct 1134. In some embodiments, the outlets 1184 of the plurality of EC water conduits 1170a can be in fluid communication with an end cap 1186 with no outlet.

In some embodiments, the evaporative cooling unit 1166 also includes an EC desiccant header 1188a in fluid communication with inlets 1190 of the plurality of EC desiccant conduits 1172a. In some embodiments, the inlet 1192 of the EC desiccant header 1188a is in fluid communication with the outlet 1140 of the WR desiccant duct 1128.

In some embodiments, the evaporative cooling unit 1166 also includes an EC desiccant header 1188b in fluid communication with outlets 1194 of the plurality of EC desiccant conduits 1172a. In sonic, embodiments, the outlet 1196 of the EC desiccant header 1188b is in fluid communication with an inlet 1142, 1152 of the dehumidifier desiccant duct 1120 (e.g., dehumidified desiccant conduits 1144 or dehumidifier desiccant header 1150a), an inlet 1190, 1190a of the EC desiccant duct 1172, 1172a, or both.

Figure 10:
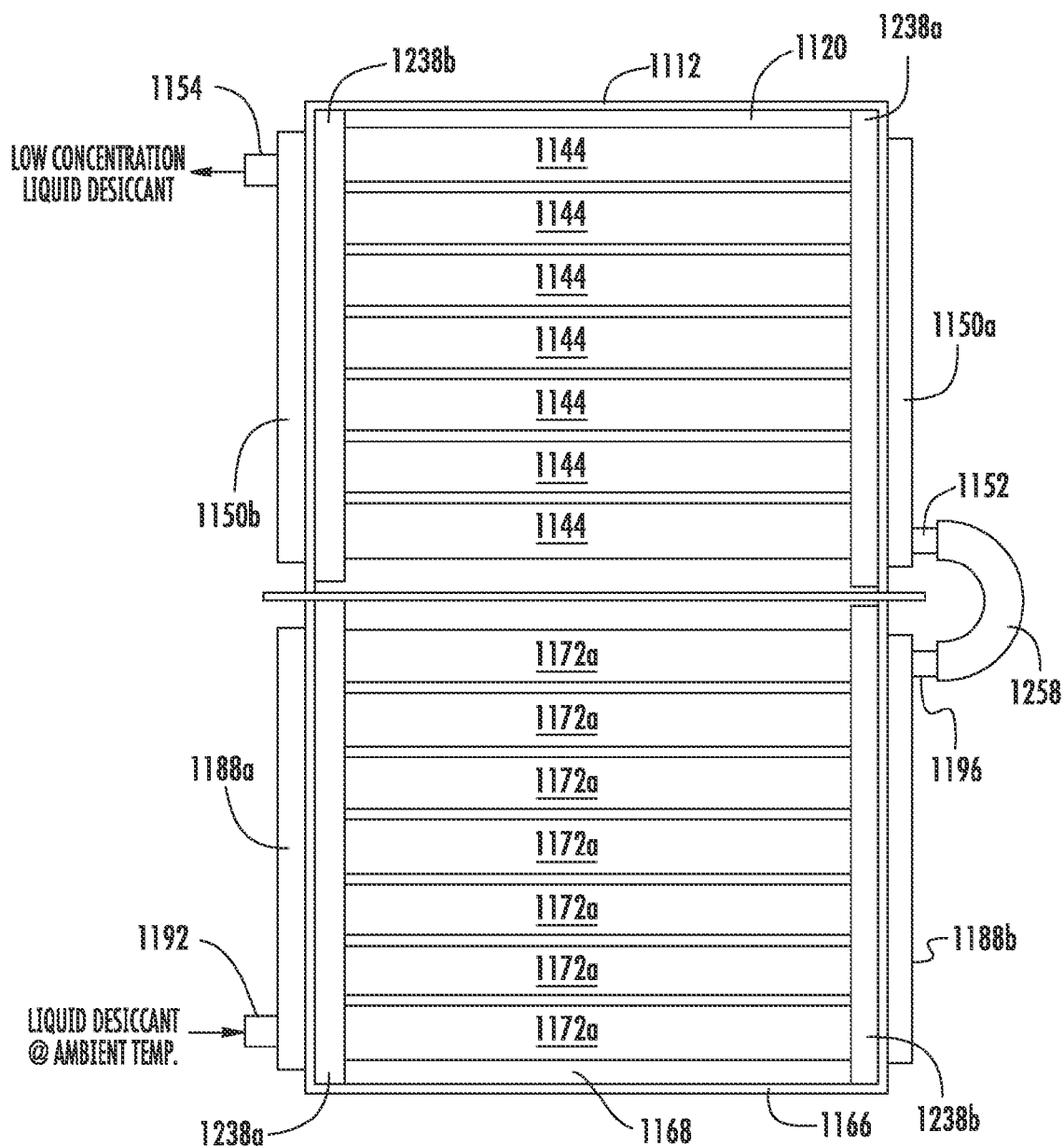
FIG. 10 is a diagram showing a liquid desiccant handling system for an evaporative cooling and dehumidification stage according to an embodiment described herein.

As shown in FIG. 10, in some embodiments, the dehumidifier 1112, and the evaporative cooling unit 1166 can be part of a common housing and the outlet 1194 of the EC desiccant duct 1172 can be directly connected to the inlet 1142 of the dehumidifier desiccant duct 1118 by a connecting tube or pipe 1258. FIG. 10 is one embodiment of a cross-sectional view of the air ducts 1120/1169 of FIG. 6 taken along cut line 10-10, where the direction of air flow is into the page.

In some embodiments, as shown in FIG. 6, the system 1110 includes a water recovery (WR) radiator 1198. The WR radiator 1198 can include a WR radiator cooling duct 1200 and a WR radiator water feed duct 1202. The WR radiator water feed duct 1202 can be a radiator and the WR radiator cooling duct 1200 can be adapted for blowing ambient air into contact with the WR radiator water feed duct 1202. A WR radiator fan 1203 can be positioned to force air through the WR radiator cooling duct 1200 and onto the WR radiator water feed duct 1202.

An outlet 1158 of the WR air duct 1130 can be in fluid communication with an inlet 1204 of the WR radiator water feed duct 1202. In some embodiments. the WR radiator water feed duct 1202 has outlets: a WR radiator water line 1206 and a WR radiator exhaust 1208, The WR radiator water line 1206 can be in fluid communication with an inlet 1178 of the EC water duct 1170. in sonic embodiments, the WR radiator exhaust 1208 can be in fluid communication with the environment, while the WR radiator exhaust 1208 can be in fluid communication with a space to be conditioned (e.g., heated) in other embodiments.

In some embodiments, the system 1110 includes a heat exchanger (HX) unit 1210 that includes a HX desiccant duct 1212 contacting a HX coolant duct 1214. In some embodiments, the HX desiccant duct 1212 is in thermal communication with the HX coolant duct 1214. In some embodiments, the HX desiccant duct 1212 is not in fluid communication with the HX coolant duct 1214. The heat exchanger unit 1210 can be a counter-flow heat exchanger, such as a counter-flow, plate heat exchanger.

In some embodiments, an inlet 1216 of the HX desiccant duct 1212 is in fluid communication with the outlet 1136 of the dehumidifier desiccant duct 1118. In some embodiments, an outlet 1218 of the HX desiccant duct 1212 is in fluid communication with an inlet 1138 of the WR desiccant duct 1128. In some embodiments, an inlet 1220 of the HX coolant duct 1214 is in fluid communication with a fuel cell stack cooling plate outlet 1125. In some embodiments, an outlet 1222 of the HX coolant duct 1214 is in fluid communication with a fuel cell stack cooling plate inlet 1127.

In some embodiments, the system 1110 includes a fuel cell coolant (FCC) radiator 1224. In some embodiments, the FCC radiator 1224 includes a. FCC coolant duct 1226 and a FCC radiator air duct 1228. The FCC coolant duct 1226 can be a radiator and the FCC radiator air duct 1228 can be adapted for blowing ambient air into contact with the FCC coolant duct 1226. A FCC radiator fan 1229 can be positioned to force air through the FCC radiator air duct 1228 and impinge the air on the FCC coolant duct 1226.

In some embodiments, an inlet 1230 of the FCC coolant duct 1226 is in fluid communication with a HX coolant duct outlet 1222 and an outlet 1232 of the FCC coolant duct 1226 is in fluid communication with a fuel cell stack cooling plate inlet 1127. In some embodiments, the FCC radiator air duct 1228 is open to ambient air (e.g., the outdoors) at both the inlet 1234 and the outlet 1236.

In some embodiments, the outlet 1236 of the FCC radiator air duct 1228 can be in fluid communication with a space in need of conditioned air, e.g., a building. In such instances, the air exiting the outlet 1236 of the FCC radiator air duct 1228 can be used to heat the space.

As shown in FIG. 12, in some embodiments either or both of the radiators 1198, 1224 can be replaced by liquid (e.g., water) cooled heat exchangers 1260, 1270. In such embodiments, the outlet of the refrigerant line can be in fluid communication with a water supply, such as a building water supply, for providing hot water.

In some embodiments, the water recovery line 1244 can include a water recovery line heat exchanger 1260. The water recovery line heat exchanger 1260 can include a WRL refrigerant duct 1262 and a WR water feed duct 1202. The WR water feed duct 1202 can be in thermal communication, but not fluid communication, with the WRL refrigerant duct 1262. In some embodiments, a domestic or industrial water supply can be in fluid communication with an inlet 1264 of the WRL refrigerant duct 1262 and the outlet 1266 of the WRL refrigerant duct 1262 can provide hot water for domestic or industrial use. Thus, in some embodiments, the water recovery line heat exchanger 1260 can function as a hot water heater, with the outlet 1266 providing hot water for domestic or industrial use.

An outlet 1158 of the WR air duct 1130 can be in fluid communication with an inlet 1204 of the WR water feed duct 1202. In some embodiments, the WR water feed duct 1202, has two outlets: a WR water line 1206 and a WR exhaust 1208. The WR water line 1206 can be in fluid communication with an inlet 1178 of the EC water duct 1170. In some embodiments, the WR exhaust 1208 can be in fluid communication with the environment, while the WR radiator exhaust 1208 can be in fluid communication with a space to be conditioned (e.g., heated) in other embodiments.

In some embodiments, the FC coolant loop 1242 can include a coolant recovery line heat exchanger 1270. The CRL heat exchanger 1270 can include a FCC coolant duct 1226 and a CRL refrigerant duct 1272. The FCC coolant duct 1226 can be in thermal communication, but not fluid communication, with the CRL refrigerant duct 1272. In some embodiments, a domestic or industrial water supply can be in fluid communication with an inlet 1274 of the CRL refrigerant duct 1272 and the outlet 1276 of the CRL refrigerant duct 1272 can provide hot water for domestic or industrial use. Thus, in some embodiments, the CRL heat exchanger 1270 can function as a hot water heater, with the outlet 1266 providing hot water for domestic or industrial use.

In some embodiments, an inlet 1230 of the FCC coolant duct 1226 is in fluid communication with a HX coolant duct outlet 1222 and an outlet 1232 of the FCC coolant duct 1226 is in fluid communication with a fuel cell stack cooling plate inlet 1127.

As shown in FIG. 11, in some embodiments where a plurality of conduits (t) (e.g., 1144, 1156, 1172*a*, 1170*a*, etc.) is used, the plurality of conduits can be held in a desired configuration by end plates 1238*a*, 1238*b*, The end plates 1238*a*, 1238*b* can be coupled to the conduits (t) so that the ends of the conduits (t) are not blocked and there is a fluid-tight seal between the outside of the conduits and each end plate 1238*a*, 1238*b*. The end plates 1238*a*, 1238*b* help prevent mixing of the streams in the different ducts, particularly where cross-flow arrangements and headers are used.

In some embodiments, the system 1110 can be adapted to include a desiccant loop 1240, a fuel cell coolant loop 1242, and a water recovery line 1244, Each of these loops 1240, 1242, 1244 can include one or more control pumps 1246, 1248, 1250, respectively, for transporting the relevant fluid through the loop. Each of these loops can have no fluid communication with the other loops, except for the transfer of water vapor that occurs in the desiccant regeneration unit 1159.

The desiccant loop 1240 can include the dehumidifier desiccant duct 1118 in fluid communication with the HX desiccant duct 1212 in fluid communication with the WR desiccant duct 1128 in fluid communication with the EC desiccant duct 1172 in fluid communication with the dehumidifier desiccant duct 1118. The desiccant loop 1240 can also include a high concentration liquid desiccant tank 1252*a*, a low concentration liquid desiccant tank 1252*b*, or both 1252*a*, 1252*b*, Although the low concentration liquid desiccant tank 1252*b* is shown between then dehumidifier desiccant duct 1118 in fluid communication with the HX desiccant duct 1212, it will be understood that the low concentration liquid desiccant tank 1252*b* can also be positioned between the HX desiccant duct 1212 and the WR desiccant duct 1128.

The fuel cell coolant loop 1242 can include the fuel cell stack cooling plates 1126 in fluid communication with the FIX coolant duct 1214 in fluid communication with the FCC coolant duct 1226 in fluid communication with the fuel cell stack cooling plates 1126.

The water recovery line 1244 can start with the supersaturated exhaust exiting the WR air duct 1130 in fluid communication with the WR radiator water feed duct 1202 in fluid communication with the WR radiator water line 1206 in fluid communication with the EC water duct 1170.

Also described is a method of operating a combined air conditioning power generation system 110 as described herein. The method can be a continuous method. The method can include dehumidifying an air stream using a liquid desiccant stream; and regenerating the liquid desiccant stream using an exhaust stream from an electrode chamber of a fuel cell. In some embodiments, the air stream and the liquid desiccant stream are in fluid communication through a dehumidifier membrane 146 that allows moisture in the air to pass into the liquid desiccant stream.

The exhaust stream can be from an anode chamber or a cathode chamber of a fuel cell, exhaust stream can have a high humidity (e.g., >70% RH, >80% RH, >90% RH) and a temperature above room temperature (e.g., >40° C., >50° C., >60° C., >70° C., >80° C., >90° C., or >100° C.).

In some embodiments, the method can also include capturing cooling water from the exhaust stream used in the regenerating step; and cooling the liquid desiccant stream before the dehumidifying step. The cooling step can include evaporative cooling of the liquid desiccant stream using the cooling water.

In some embodiments, the capturing step includes contacting the exhaust stream with a refrigerant stream. In some embodiments, the refrigerant stream is used for air conditioning or as a domestic or commercial water supply. The method can also include any of the interactions described with respect to the particular unit operations described herein.

A dehumidifier system that uses a liquid desiccant, such as those disclosed herein, to dehumidify an incoming air stream for air conditioning purposes is described. The design of the dehumidifier is such that heat energy is continually being removed throughout the dehumidification process by means of, but not necessarily exclusively of, air flow from the atmosphere, water recovered from the liquid desiccant during its regeneration process, and/or through the flow of cooled liquid desiccant. The system is designed in such a way that the water that is absorbed from the ambient air and that enters into the liquid desiccant stream is recovered. This water recovery system uses a liquid cooled fuel cell stack and utilizes the heat produced from its operation to increase the temperature of the liquid desiccant and promote water desorption. The fuel cell's cathode exhaust air and humidity is also used to promote water recovery by using this stream as a water collection, conveyance and precipitation agent.

The use of liquid desiccant in the systems described herein enables regulation of the rate of air dehumidification by controlling the liquid desiccant flow. Additionally, the liquid desiccant dehumidifies air through a water vapor permeable barrier that can be composed of a microporous polymer or a water permeable polymer. In this way, liquid desiccant entrainment into the air conditioning supply air stream is prevented. The dehumidification process is isothermal, which increases the effectiveness of the air dehumidification process. This in turn results in lower liquid desiccant flow rates and reduces the size, cost and complexity of the liquid desiccant conveyance systems, such as pumps, valves, and line sizes. The continuous operation of the system relies on the capacity to regenerate the liquid desiccant from a low concentration (high water content) state to a high concentration (low water content) state. The way the fuel cell is used and the designs of the system components enables liquid desiccant regeneration to results in recovery of the water obtained from the liquid desiccant and in the generation of electricity. The resulting device, an isothermal air dehumidifier, that generates electricity as a by-product of its operation, has enormous value since it increases the overall efficiency of air-conditioning.

FIG. 13 shows the air dehumidification system with all its principal components. A dehumidifier (1004) takes ambient air (1009) which has a certain temperature and humidity level. The ambient air enters a dehumidification chamber (1005) where high concentration liquid desiccant that has been chilled in an evaporative cooling chamber (1006) absorbs the air's humidity. The liquid desiccant exits the dehumidification chamber (1005) at a lower concentration than when it enters. This low concentration liquid desiccant (1001) is stored. Exiting the dehumidification chamber is low humidity building supply air (1010). The evaporative cooling chamber is also fed with ambient air (1007) that is being humidified and in this manner its temperature reduced to its wet bulb temperature. The high concentration liquid desiccant flowing in the evaporative cooling chamber (1006) is cooled by the humidified ambient air. The humid air (1008) leaving the evaporative cooling chamber is exhausted to the environment. The high concentration liquid desiccant (1002) is stored in a vessel, as is the water (1003).

In order to maintain the process of dehumidification, water (1003) and high concentration liquid desiccant (1002) must be replenished. This is done through a water recovery and desiccant regeneration system that uses the heat, water and fuel cell cathode exhaust air. Liquid fuel cell coolant (1015), which can be any suitable fuel cell cooling fluid that could include but is not restricted to be water, ethylene glycol, oils, polymer blends, or a combination thereof, flows into the fuel cell stack cooling plates (1013) collecting the heat generated by the operation of the fuel cell stack. Fuel cell stack operation produces electricity (1020) as a by-product. The fuel cell coolant exiting the fuel cell stack cooling plates (1013) is then passed through a heat exchanger (1011). This heat exchanger enables heat transfer between a stream of low concentration liquid desiccant and the fuel cell coolant stream exiting the fuel cell stack cooling plates (1013). In doing so, the temperature of the low concentration liquid desiccant stream is increased, reducing the amount of water in solution with the desiccant. The process of dissolution of water from the liquid desiccant is endothermic. The fuel cell coolant leaving the heat exchanger (1011) is further cooled using a radiator (1016). The heat exchanger (101)) is such that all its parts wetted by the low concentration liquid desiccant are made of materials that are chemically compatible with the liquid desiccant such as plastics, polymer blends, and coated metals. An embodiment of the heat exchanger (1011) design will be discussed later in this document.

The liquid desiccant leaving the heat exchanger (1011) is then supplied to a water recovery device (1012). The water recovery device is also supplied with air leaving the fuel cell stack anode chamber (1014). The fuel cell cathode chamber (1014) is supplied with ambient air (1019). This oxygen in this ambient air (1019) is reacted in the fuel cell stack cathode chamber (1014) to form water. The air leaving the fuel cell stack cathode chamber (1014) is warm, at a temperature close to, or equal to, the operating temperature of the fuel cell stack. Although warm, this air is typically super-saturated and typically has liquid water. This air is supplied to the water recovery device so that water, no longer in solution with the liquid desiccant flowing in the water recovery device (1012) flows from the liquid desiccant to the air side. The partial pressure of water in the air side is lower than in the liquid desiccant side. These sides of the water recovery device (1012) are separated by a water vapor permeable barrier that can be composed of micro-porous plastic or a hygroscopic polymer or a combination therefore. This barrier, does not permit liquid desiccant or air to mix within the water recovery device (1012). Air leaving the water recovery device is further cooled using ambient air in a radiator (1017). The liquid water condensed is collected and pumped to a water reservoir (1003). The air leaving the radiator (1017) is exhausted. High concentration liquid desiccant exits the water recovery device (1012) and is pumped or conveyed to a high concentration liquid desiccant reservoir (1002).

In some embodiments, the systems uses a barrier (1021) between the liquid desiccant and the streams with which this fluid needs to transfer heat and water. This barrier is composed of a plastic or polymer that is chemically compatible with the liquid desiccant.

Figure 14:
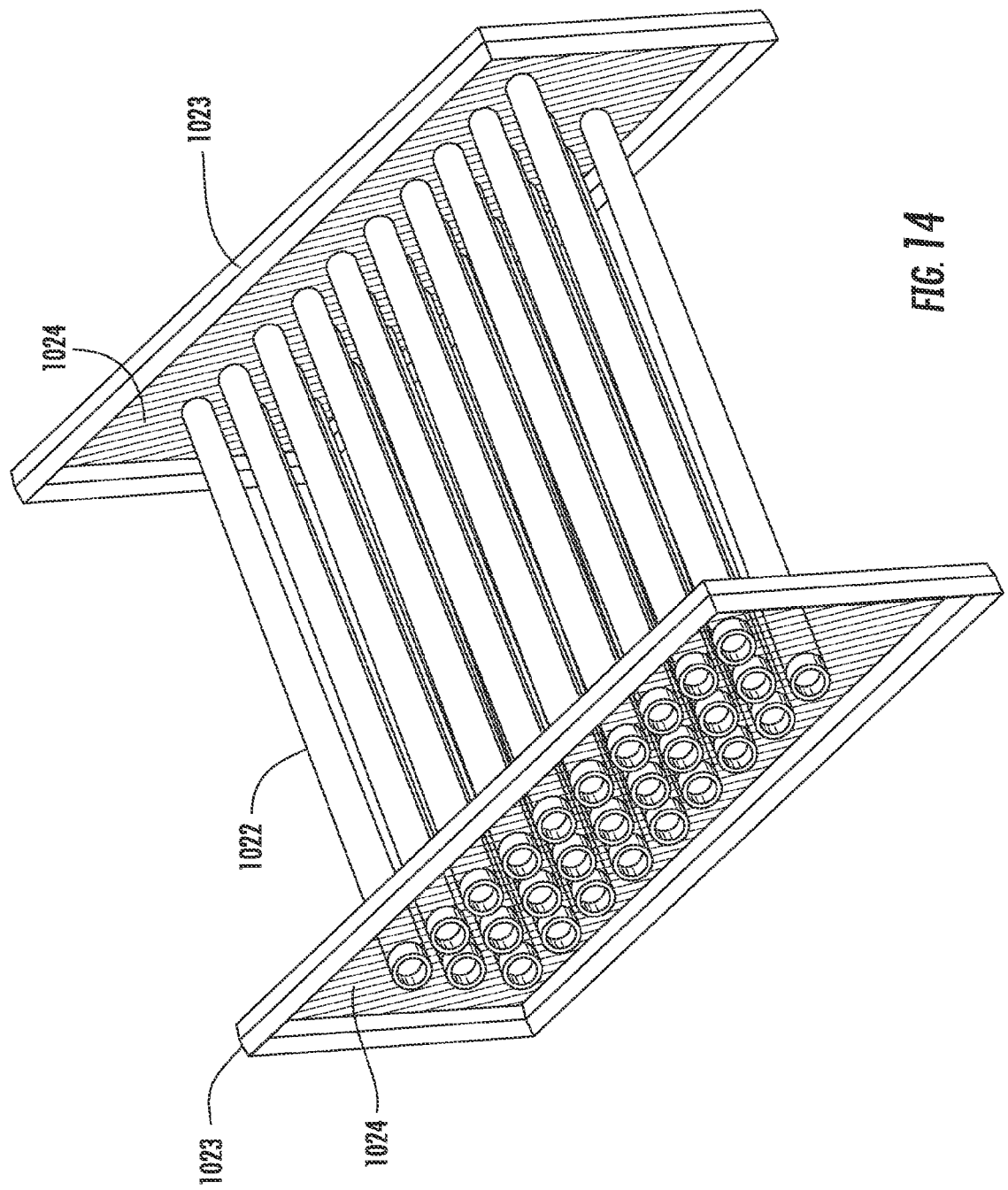
FIG. 14 is a perspective view of an arrangement of conduits as described herein.

The barrier (1021) can be arranged into a bundle of conduits (1022). This bundle of conduits (1022) can be arranged in a cylindrical or rectangular manner (as is shown in FIG. 14). The ends of this bundle of conduits (1022) can be stabilized (or embedded) in a framed (1023) as shown in FIG. 14. The frame can then be filled with a pourable and hardening polymer (1024) so that the openings to the ends of the bundle conduits (1022) are exposed and the body of bundle of conduits (1022) is separated from these ends. The same can be done with the other end of the bundle of conduits (1022).

The result is a plastic structure (1024) as shown in FIG. 11. Because of this structure (1024) liquid desiccant can pass within the individual cylindrical barriers (1021) and air or other fluids can pass across the body of the cylindrical barrier (1021). As previously discussed the barriers (1021) can be constructed of many materials. However, if water transfer is desired between the fluid passing across the bundle of conduits (1022) and the liquid desiccant passing within the individual barriers (1021) in the bundle of conduits (1022), then the material used for the barriers (1021) can be made of any of the compatible materials in a micro-porous configuration. The size of the pores must be large enough to enable the passage of water molecules and not the passage of air molecules such as nitrogen and oxygen. Note that the water molecule is smaller than these other molecules. An alternative to the use of micro-porous plastics is the use of water permeable plastics that allow water transport across them. One such plastic is Nafion, though others are described herein.

Figure 15:
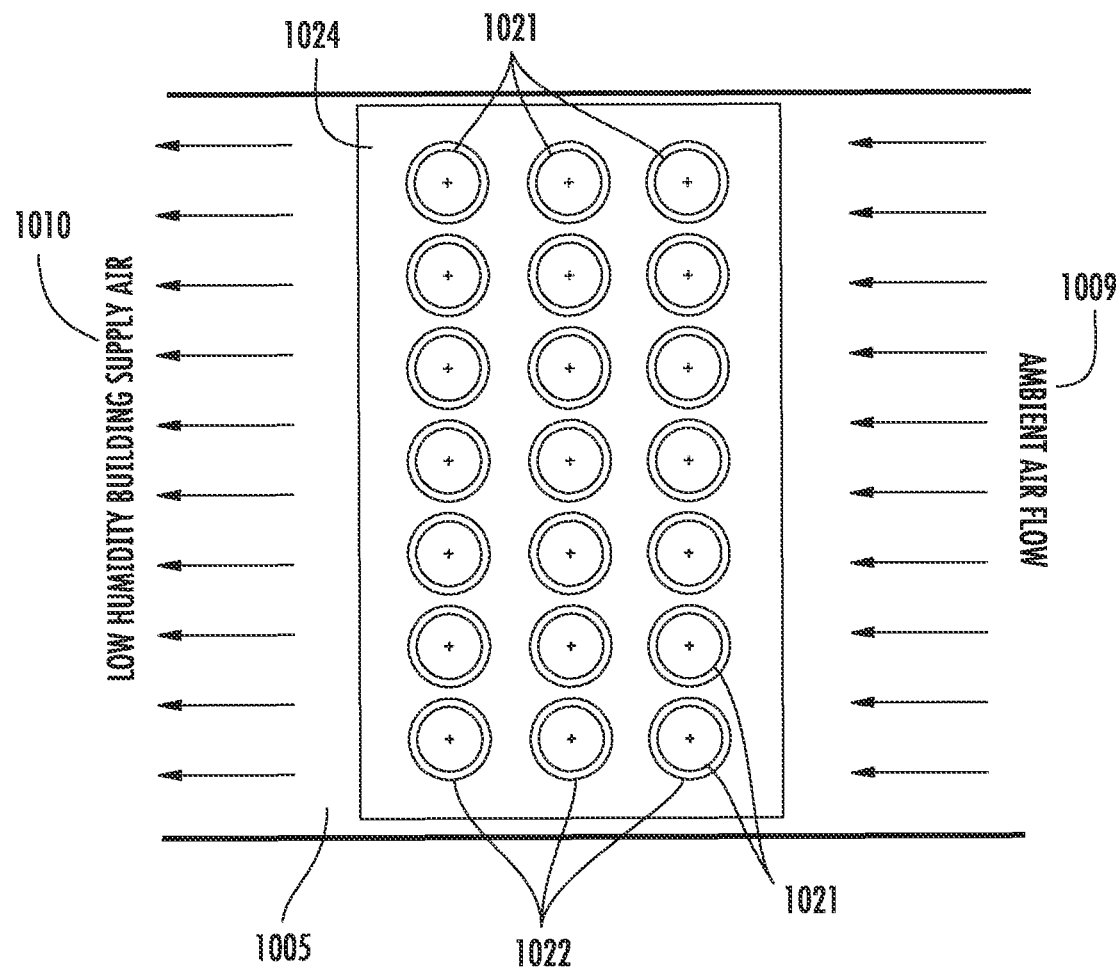
FIG. 15 is a side view of a dehumidification chamber as described herein.

FIG. 15 shows the dehumidification chamber (1005) of the air dehumidifier (1004), where ambient air flow (1009) flows through the external portion of the bundle of conduits (1022) in the structure (1024). High concentration liquid desiccant would flow within the barriers (1021) and would absorb humidity from the air.

Figure 16:
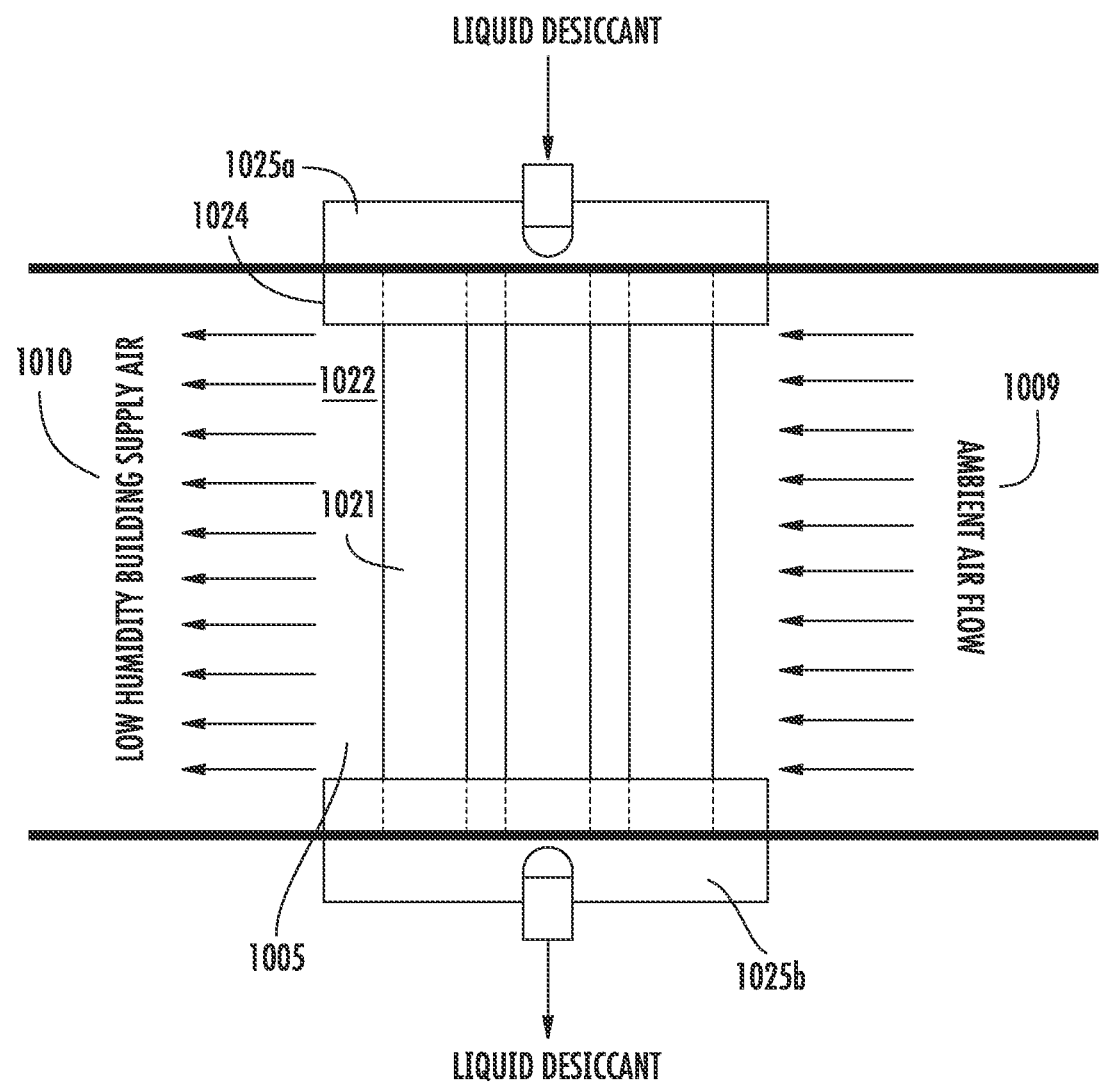
FIG. 16 is a top view of the dehumidification chamber of FIG. 15.

FIG. 16 shows a top view of the dehumidification chamber (1005) of the air dehumidifier (1004). This shows that the internal portion of the barriers (1021) in the tube bundle (1022) are in fluid connection with each and that liquid desiccant is introduced into them via a single entry port. A cap (1025a) provides a chamber in which liquid desiccant is distributed into the inner portion of the individual barrier (1021). A similar cap (1025b) exists on the other side of the structure (1024). This cap (1025*b*) collects the outflow of liquid desiccant from the individual barriers (1021).

Figure 17:
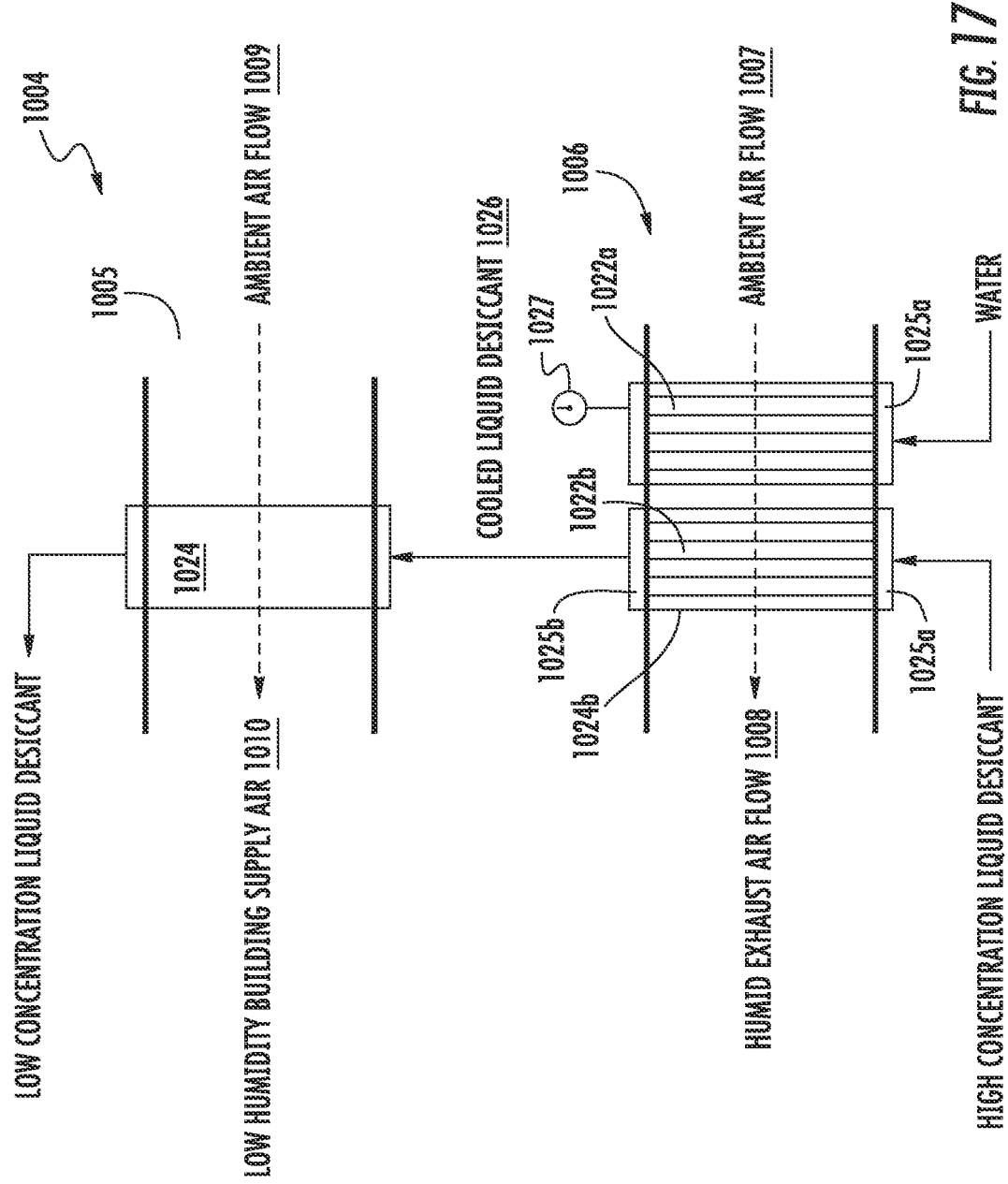
FIG. 17 is a top view of an air dehumidifier with a liquid desiccant cooling system as described herein.

FIG. 17 shows a more detailed conception of the air dehumidifier (1004). As shown, the dehumidifier is composed of two chambers, the air dehumidification chamber (1009) and the evaporative cooling chamber (1006). Both chambers make use of the tubular bundle structure (1024) to transfer heat or heat and water. In the evaporative cooling chamber (1006), ambient air (1007) flows through one or two structures (1024*a*, 1024*b*). The first structure (1024*a*) has water flowing within its tube bundle (1022*a*). The material barriers (1021) are made of microporous plastic, which enables water seepage from the tube bundle to the air. As air absorbs the water, its temperature drops and approaches the wet bulb temperature. Note that there is no outflow port in the cap (1025) of this structure (1024). This is because water is continually being drained through entrainment in air. Regulation of water flow into this structure could use a constant pressure device (1027) that ensures water pressure in the tube bundle is maintained within a certain range. As water is absorbed by the air, water pressure will decrease causing the valve to open allowing water to enter the structure (1024*a*). Another method uses water transport through capillary action within the barriers (1021). As water is consumed, and the barrier is dried, water enters the tube. Depending on the way in which water is introduced into the conduits or on the external surface of the tube, the orientation of the tube bundle may be vertical or horizontal.

The lower temperature air flows through a second structure (1024*b*) in the evaporative cooling chamber (1006). High concentration liquid desiccant flows within this structure (1024*b*). Since there is no desire to transport water between the air and the liquid desiccant, but only heat, the barriers (1021) in this structure (1024) are constructed of a material that is not porous or permeable to water. The material and the structure of the tube bundle (1022) are designed solely for the purpose of transferring heat, The liquid desiccant (1026) leaving the evaporative cooling chamber (1006) of the air dehumidifier (1004) is cool, and close to the wet bulb temperature of the ambient air. The cooled liquid desiccant (1026) then enters the dehumidifying chamber (1005) of the dehumidifier.

Figure 18:
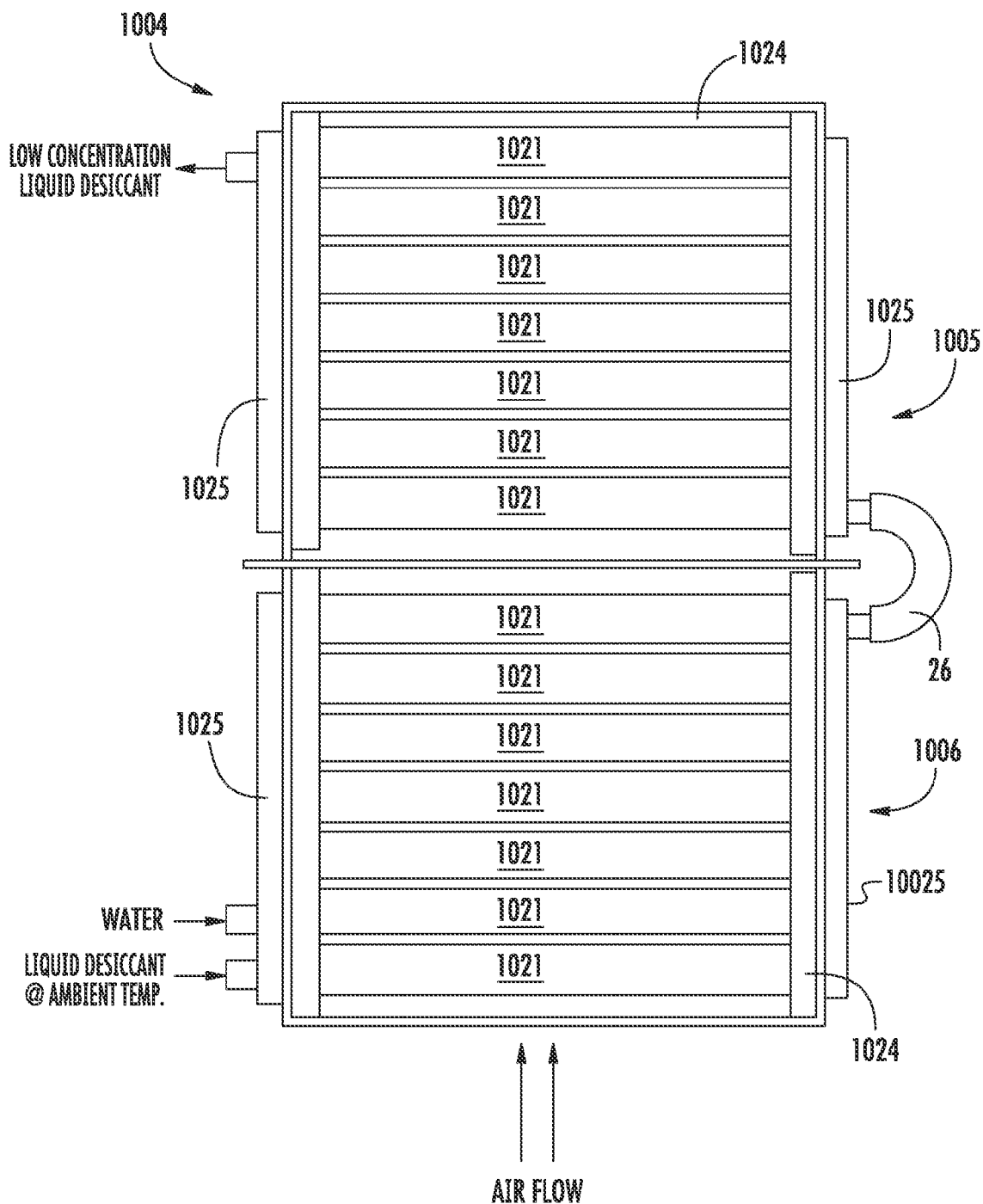
FIG. 18 is a diagram showing a liquid desiccant handling system for an evaporative cooling and dehumidification stage according to an embodiment described herein.

As shown in FIG. 18, the mechanical arrangement of the air dehumidifier (1004) can be in a single air duct that is divided so that a portion of the air passes through the evaporative cooling chamber (1006) and the other portion passes through the air dehumidification chamber (1005). In this figure, the air is flowing into the page. The advantage of this configuration is that the parts can be co-located and a single air source can be used.

In all the arrangements, the diameter and material used for the barrier can vary depending on the particular function of the structure. Lower diameter barriers result in higher surface are to volume ratio, which enhances mass transport and heat transfer. However, lower diameter increases the pressure drop through the harrier, so the number of barriers in a tube bundle has to increase. The material of the barrier can vary based on function. For example, the barriers in the structure used in the water recovery device (1012) can have an outer surface material that is hydrophobic or super-hydrophobic, such as Teflon for example. In this way, water droplets formed would roll easily from the tube into a collection basin. The embodiments for the water recovery device (1012) include those with a vertical tube bundle. In a similar manner, the barriers used in the evaporative cooling chamber (1006) structure could have an outer material that is hydrophilic. In this way water accumulated in the outer portion of the barrier would not off the tube but instead remain until fully dried by incoming ambient air.

A first specific system combined air conditioning power generation system can include dehumidifier comprising a dehumidifier desiccant duct that contacts a dehumidifier air duct, a fuel cell comprising an electrode chamber; and a water recovery (WR) unit comprising a WR desiccant duct that contacts a WR air duct, wherein an outlet of the electrode chamber is in fluid communication with an inlet of said WR air duct, wherein an outlet of said dehumidifier desiccant duct is in fluid communication with an inlet of the WR desiccant duct, and wherein an outlet of the WR desiccant duct is in fluid communication with an inlet of said dehumidifier desiccant duct.

A second specific system can be the first specific system, wherein said dehumidifier desiccant duct and said dehumidifier air duct are on opposite sides of a dehumidifier membrane, wherein the dehumidifier membrane is permeable to water vapor.

A third specific system can be the second specific system, wherein said dehumidifier membrane allows water in the air within the dehumidifier air duct to cross the dehumidifier membrane and pass into a desiccant stream within the dehumidifier desiccant duct.

A fourth specific system can be any of the foregoing specific systems, wherein the dehumidifier desiccant duct comprises at least one dehumidifier desiccant tube.

A fifth specific system can be any of the foregoing specific systems, wherein said WR desiccant duct and said WR air duct are on opposite sides of a WR membrane, wherein the WR membrane is permeable to water vapor.

A sixth specific system can be the fifth specific system, wherein said WR membrane allows water in a desiccant stream within the WR desiccant duct to cross the WR membrane and pass into the cathode exhaust stream within the WR air duct.

A seventh specific system can be any of the foregoing specific systems, wherein the a desiccant duct comprises a plurality of WR desiccant conduits.

An eighth specific system can be any of the foregoing specific systems, wherein said dehumidifier desiccant duct comprises a plurality of dehumidifier desiccant conduits, and said dehumidifier further comprises a dehumidifier desiccant header in fluid communication with inlets of said plurality of dehumidifier desiccant conduits, wherein an inlet of the dehumidifier desiccant header is in fluid communication with the outlet of the WR desiccant duct.

A ninth specific system can be any of the foregoing specific systems, further comprising an evaporative cooling (EC) unit comprising an EC air duct for sequentially contacting cooling air with an EC water duct and an EC desiccant duct, wherein said EC water duct comprises an EC membrane that is permeable to water vapor for providing evaporative cooling of the cooling air passing through the EC air duct.

A tenth specific system can be he ninth specific system, further comprising a WR radiator, comprising a WR radiator cooling duct and a WR radiator water feed duct, wherein an outlet of the WR air duct is in fluid communication with an inlet of the WR radiator water feed duct, wherein the WR radiator water feed duct has two outlets, a WR radiator water line and a WR radiator exhaust, wherein said WR radiator water line is in fluid communication with an inlet of said EC water duct.

An eleventh specific system can be the ninth specific system, further comprising an EC water pump in fluid communication with the EC water duct for maintaining a target pressure in the EC water duct.

A twelfth specific system can be the ninth system, wherein the only outlet of the EC water duct is through the EC membrane.

A thirteenth specific system can be the ninth specific system, wherein the EC water duct comprises a plurality of EC water conduits.

A fourteenth specific system can be the ninth specific system, wherein an outlet of the WR desiccant duct is in fluid communication with an inlet of the EC desiccant duct, wherein the EC desiccant duct comprises water impermeable walls, and wherein an EC desiccant duct outlet is in fluid communication with the inlet of the WR desiccant duct.

A fifteenth specific system can be the ninth specific system, wherein the EC desiccant duct comprises a plurality of EC desiccant conduits.

A sixteenth specific system can be the ninth specific system, further comprising a heat exchanger (HX) unit comprising a HX desiccant duct contacting a HX coolant duct, wherein: an inlet of the HX desiccant duct is in fluid communication with the outlet of the dehumidifier desiccant duct; an outlet of the HX desiccant duct is in fluid communication with an inlet of the WR desiccant duct; an inlet of the HX coolant duct is in fluid communication with a fuel cell stack cooling plate outlet; and an outlet of the HX coolant duct is in fluid communication with a fuel cell stack cooling plate inlet.

A seventeenth specific system can be the sixteenth specific system, further comprising a fuel cell coolant (FCC) radiator, comprising a FCC coolant duct and a FCC radiator air duct, wherein an inlet of the FCC coolant duct is in fluid communication with a HX coolant duct outlet and an outlet of the FCC coolant duct is in fluid communication with a fuel cell stack cooling plate inlet.

An eighteenth specific system can be the sixteenth specific system, wherein an inlet and an outlet of the FCC radiator air duct are in fluid communication with ambient air.

A nineteenth specific system can be the sixteenth specific system, wherein the fuel cell further comprises a second electrode chamber and fuel cell stack cooling plates in thermal communication with the first and second electrode chambers.

A twentieth specific system can be any of the foregoing specific systems, wherein the fuel cell further comprises a second electrode chamber and fuel cell stack cooling plates in thermal communication with the first and second electrode chambers.

A twenty-first specific system can be any of the foregoing specific systems, wherein the electrode chamber is a cathode chamber.

A twenty-second specific system can be any of the foregoing specific systems, wherein the electrode chamber is an anode chamber.

A first continuous method of operating a combined air conditioning power generation system, comprises: dehumidifying an air stream using a liquid desiccant stream; and regenerating the liquid desiccant stream using an exhaust stream from an electrode chamber of a fuel cell.

A second specific method can be the first specific method further comprising, capturing cooling water from the exhaust stream used in the regenerating step; and cooling the liquid desiccant stream before the dehumidifying step, wherein the cooling step comprising evaporative cooling of the liquid desiccant stream using the cooling water.

A third specific method can be the second specific method, wherein the capturing step comprises contacting the exhaust stream with a refrigerant stream, and the refrigerant stream is used for air conditioning or as a domestic or commercial water supply.

A fourth specific method can be the second specific method, wherein the air stream and the liquid desiccant stream are in fluid communication through a dehumidifier membrane that allows moisture in the air to pass into the liquid desiccant stream.

A fifth specific method can be any of the foregoing specific methods, wherein the air stream and the liquid desiccant stream are in fluid communication through a dehumidifier membrane that allows moisture in the air to pass into the liquid desiccant stream.

Third Discussion

Figure 19A:
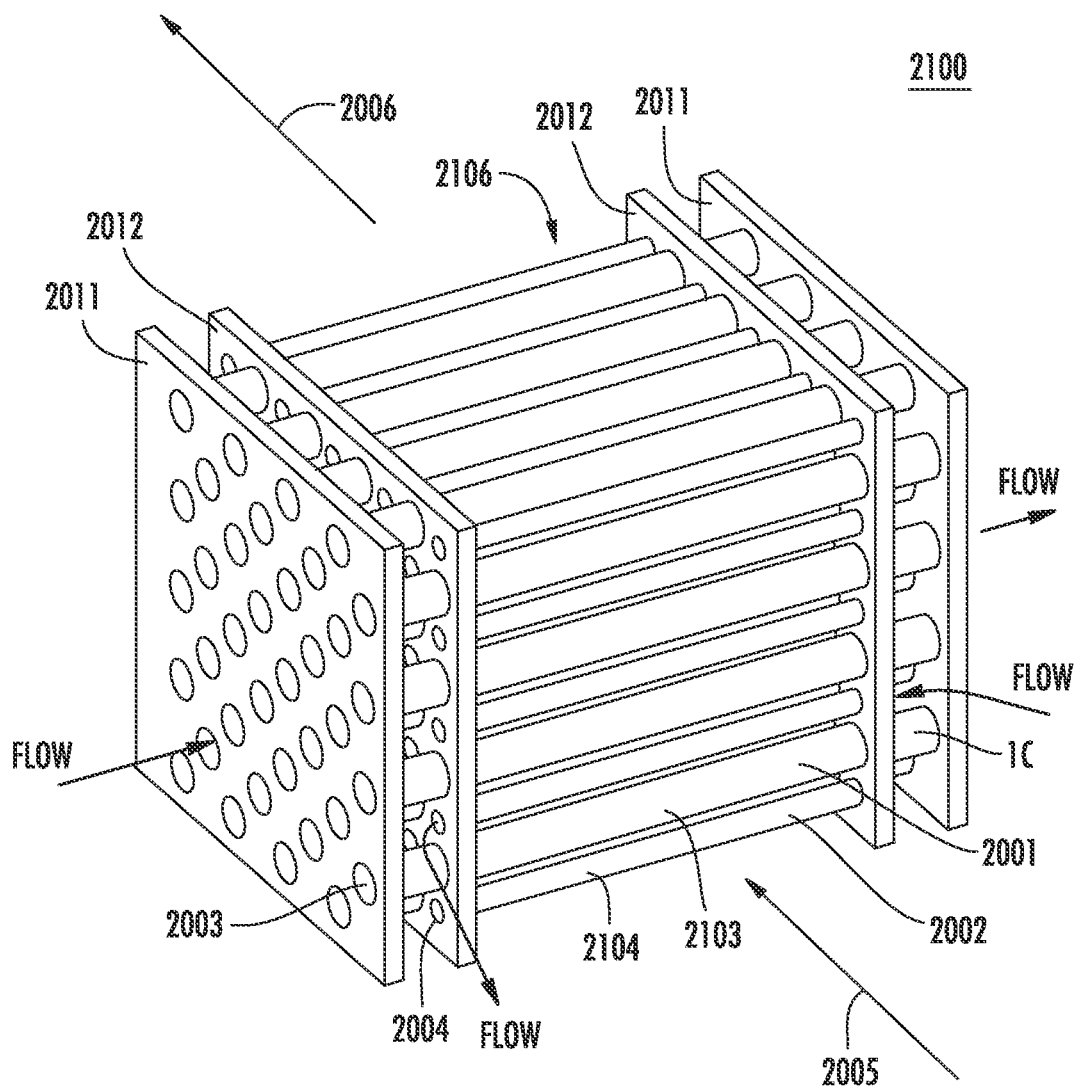
Figure 19B:
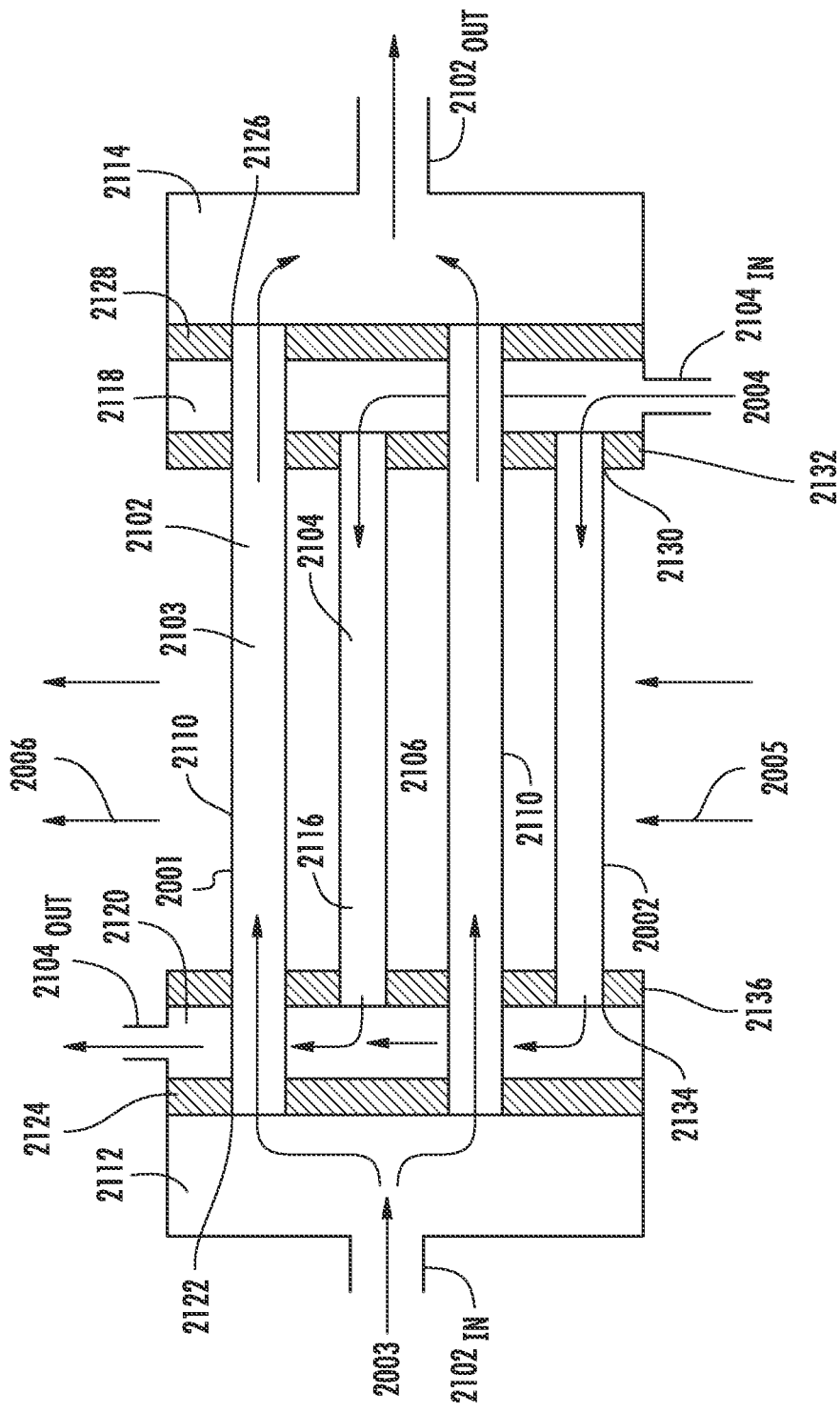
FIG. 19B is a cross-sectional view of the heat and mass transfer device of FIG. 19A.

FIG. 19*a* shows an embodiment of a heat and mass transfer device (2100) with distinct and separate heat transfer conduits (2001) and mass transfer conduits (2002), while FIG. 19*b* is a cross-sectional view of FIG. 19*a*. The mass transfer conduits (2002) are retained by and sealed against two mass transfer manifold plates (2012). Longer heat transfer conduits (2001) are retained by and sealed against two heat transfer manifold plates (2011) and two mass transfer manifold plates (2012). As shown in the figures, in some embodiments, the coolant (2003) is introduced into heat transfer conduits (2001) parallel to and interspersed among mass transfer conduits (2002) carrying liquid desiccant (2004), which is introduced between the heat transfer manifold plate (2011) and the mass transfer manifold plate (2012). The air to be dehumidified (2005) passes perpendicular to the axes of the mass transfer conduits (2002) and the heat transfer conduits (2001). Dehumidified air (2006) exits the device after it passes by the plurality of heat transfer conduits (2001) and mass transfer conduits (2002). As water vapor in the air to be dehumidified (2005) is absorbed by the liquid desiccant (2004) in the mass transfer conduits (2002), heat is transferred to the air being dehumidified (2005). This heat is then transferred from the air being dehumidified (2005) to the coolant (2003) in the heat transfer conduits (2001). In this fashion, the air being dehumidified (2005) acts as a heat transfer medium between the liquid desiccant (2004) and the coolant (2003), and the air being dehumidified (2005) is maintained at a constant or close to constant temperature.

Figure 20:
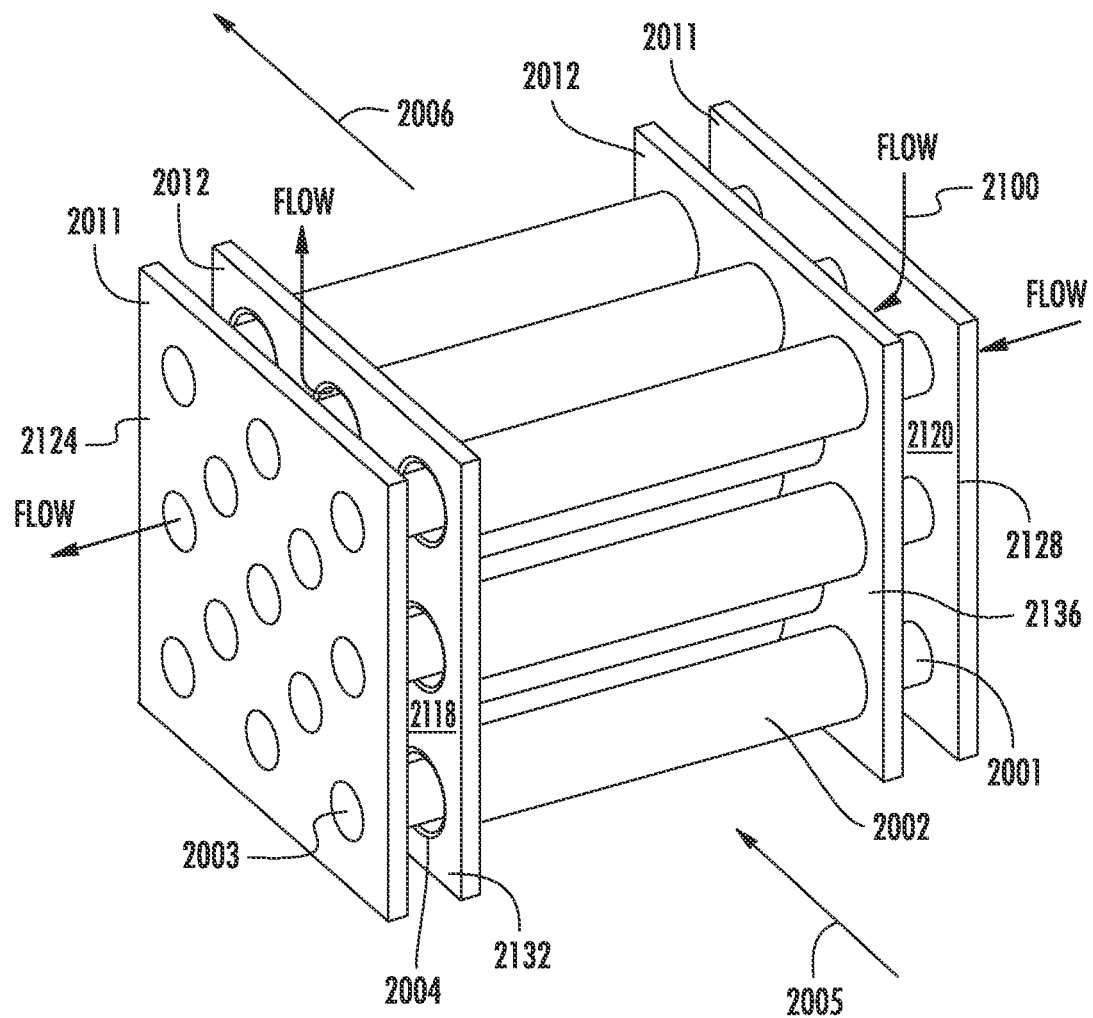
FIG. 20 is a perspective view of a tube-in-tube heat and mass transfer device as described herein.

FIG. 20 shows a second embodiment of a heat and mass transfer device (2100) that has distinct and concentric heat transfer conduits (2001) and mass transfer conduits (2002). In this embodiment, the heat transfer conduits (2001) are concentric and internal to larger diameter mass transfer conduits (2002). The mass transfer conduits (2002) are retained by and sealed against two mass transfer manifold plates (2012). Longer heat transfer conduits (2001) are retained by and sealed against two heat transfer manifold plates (2011). This arrangement leaves a gap between the outer diameter of the mass transfer conduits (2002) and the inner diameter of the heat transfer conduits (2001) into which the liquid desiccant may flow when introduced between the heat transfer manifold plate (2011) and the mass transfer manifold plate (2012). The air to be dehumidified (2005) passes perpendicular to the axis of the mass transfer conduits (2002). Dehumidified air (2006) exits the device after it passes by the plurality of mass transfer conduits (2002). As water vapor in the air (2005) is absorbed by the liquid desiccant (2004), the temperature of the liquid desiccant (2004) in the mass transfer conduits (2002) tends to increase. A coolant (2003) is introduced into the smaller, interior heat transfer conduits (2001), which reduces the magnitude of temperature increase of the liquid desiccant (2004), with which it is in thermal contact. The heat transfer conduits (2001) may be made entirely of a compatible material, not subject to corrosion by the liquid desiccant (2004), or they may be constructed from Aluminum or another material with high thermal conductivity, and then coated with a suitable barrier including PP, PPS, PVC, PTFE, and PVDF, among others. In either case, thin-walled tubing is desirable for improved heat transfer from the liquid desiccant (2004) to the coolant (2003). Other methods to increase heat transfer may also be used, such as fins, wall corrugations and features that increase fluid turbulence and heat transfer area.

As shown in FIGS. 21-24, some embodiments of the dehumidifying heat exchanger system include a liquid desiccant pump (2015) placed downstream from the dehumidifying heat exchanger. This placement ensures a lower liquid desiccant pressure as compared to the air to be dehumidified. Use of this approach reduces the likelihood of liquid desiccant leaks, even in the event of abrasive damage, pinholes or other imperfections of the microporous or solid electrolyte membrane of the mass transfer conduits.

Figure 25:
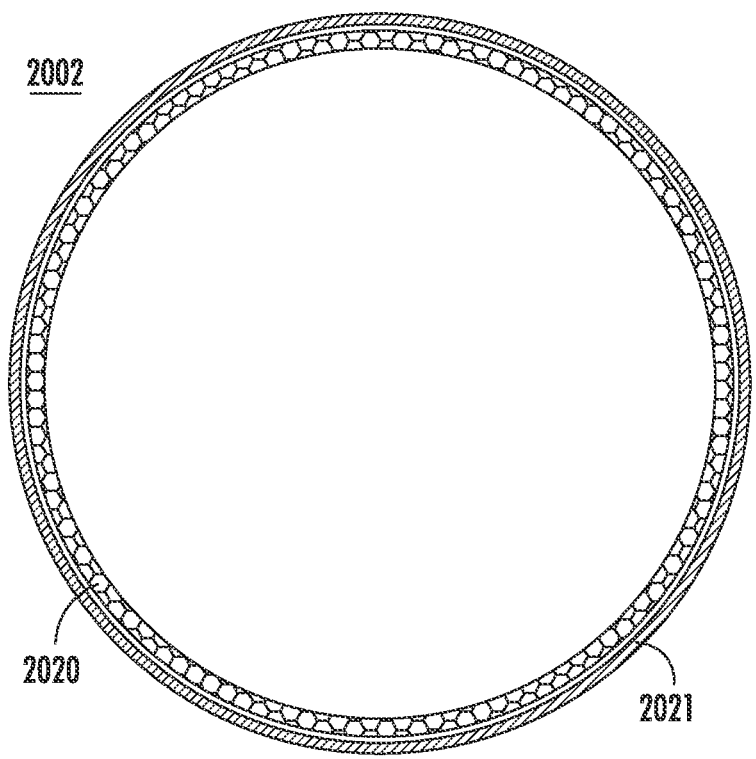
FIG. 25 is a cross-sectional view of a mass transfer conduit as described herein.

The mass transfer conduits in this section, and throughout the specification, may be produced using various materials and methods that achieve the desired water vapor transport from the humid air to the liquid desiccant and provide chemical compatibility with the liquid desiccant. FIG. 25 shows a cross-sectional view that describes an embodiment of the mass transfer tube (2002). In order to contain the liquid desiccant in the mass transfer tube (2002), a hydrophobic and microporous membrane (2021) with porosity including, but not limited to a range of 0.05 microns to 0.5 microns, may be used. The combination of small pores and a hydrophobic material prevents water from wicking through the microporous membrane under normal operating conditions (e.g., pressures under 20 psi). However, when the pressure inside the tube is increased above a breakthrough pressure liquid water can seep through the pore structure.

As used herein, "breakthrough pressure" relates to the minimum pressure at which liquid water will cross a hydrophobic microporous membrane that is only water-vapor permeable at lower pressures. For example, the breakthrough pressure of a hydrophobic sintered material with a porosity of 0.1 microns may be approximately 60 psi.

When operated at a breakthrough pressure, water will pass through to the surface of the hydrophobic, microporous material to produce a thin sheet of water around the surface. An alternate technique for producing a thin sheet of water on the surface of the ducts is utilizing a hydrophilic, microporous material under lower pressures. Mister spray-heads can be used to introduce water droplets for evaporative cooling anywhere herein where a hydrophobic, microporous material at a breakthrough pressure or a hydrophilic, microporous material is used. FIG. 33 shows an example of a mister configuration.

To promote water vapor transport, in some embodiments, a thickness of the microporous membrane (2021) includes, but is not limited to the range of 10 microns to 50 microns and its open area should exceed 50%. In one embodiment, the open area is greater than 70%. For the purpose of mechanically supporting this thin, microporous membrane, and to prohibit the collapse of the membrane tube in the case that the liquid desiccant is at a lower pressure than the surrounding ambient air, a structural, internal support tube (2020) can be provided. This design approach, with the microporous membrane (2021) covering the outside surface of the structural support tube (2020), permits the liquid desiccant to be nearest to the passing air to be dehumidified, and promotes water vapor transport across the membrane (2021). Both the structural tube (2020) and membrane (2021) may be produced from a suitable material such as PVDF, PP, PES, PPS, PVC, PTFE, and other suitable materials. Examples of mass transfer conduits include micro- and ultra-filtration conduits include those produced by Berghof from PES and PVDF membranes applied to single and dual layer supports.

Figure 26:
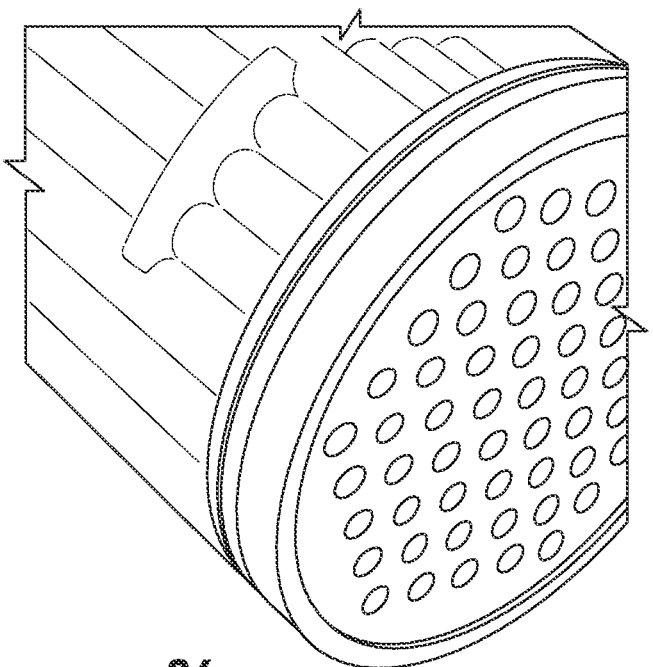
FIG. 26 is a perspective view of multiple filtration conduits housed in a larger cylindrical vessel for removal of solids from water at elevated pressures.

Another example includes FIG. 26, which shows a product from Porex, which is an assembly of multiple filtration conduits housed in a larger cylindrical vessel and is used for solids removal from water at elevated pressures. These commercial filtration conduits are produced from PVDF, PE and PES and employ microporous membranes with porosity in the range of 0.05 microns to 0.5 microns, which are applied to porous substrates with porosity in the range of 10 microns to 100 microns. Wall thickness of the tubular substrate can be ranges that include, but are not limited to 0.005" to 0.050". The placement of the microporous membrane can be on the outside surface of the tubular substrate.

In a second embodiment of the mass transfer tube (2002), a structural, porous tube (2020) is again used as a substrate, onto which a solid electrolyte membrane (2021) is applied. The porous substrate (2020) can include a sintered material such as PTFE, PVDF, PP or other suitable material, with porosity including, but not limited to the range of 10 microns to 500 microns. The electrolyte membrane (2021), which selectively transports water and not gases, is applied onto the outer surface of the substrate tube (2020) through spraying, dipping or other deposition methods. In some embodiments, a thickness of the electrolyte membrane (2021) is in a range that includes, but is not limited to 10 microns to 100 microns. A wall thickness range of the structural porous substrate tube (2020) includes, but is not limited to 0.005" to 0.050". In some embodiments, the porous substrate tube (2020) is formed of hydrophilic materials, in order to promote transfer of water through the sintered material and to the surface of the microporous membrane.

Figure 27:
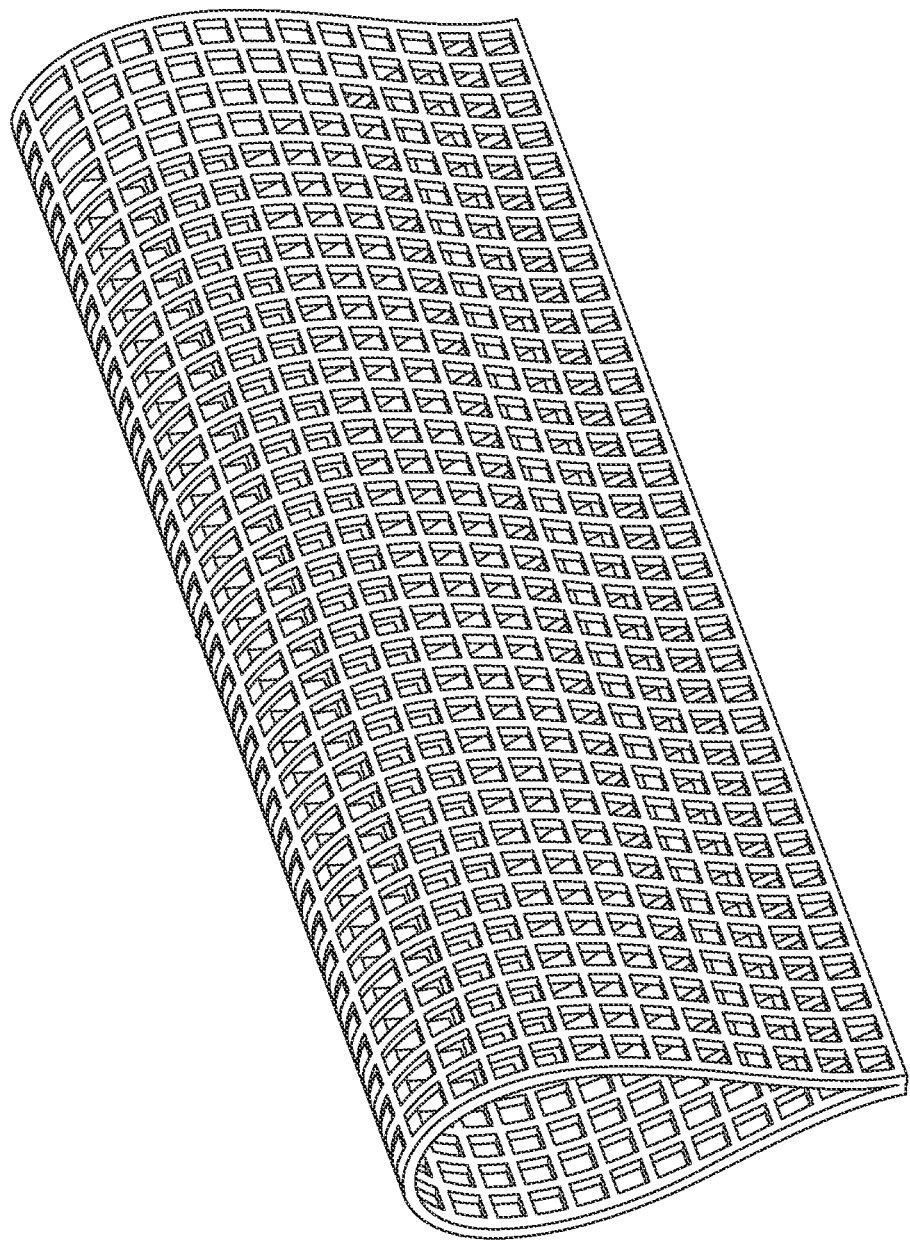
FIG. 27 is a perspective view of a porous support material that can be used for forming a mass support conduit.
Figure 28:
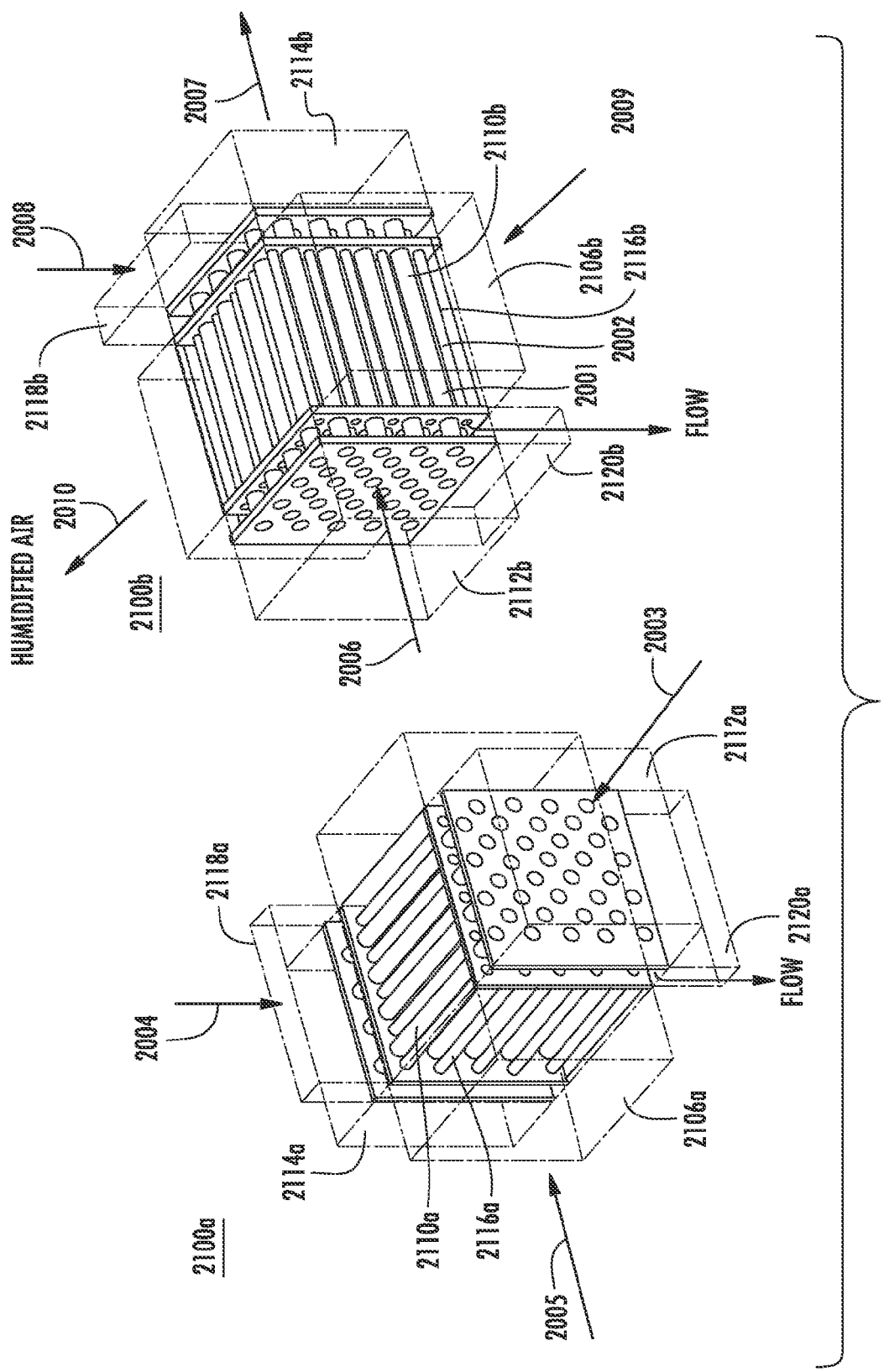
FIG. 28 is a perspective, semi-transparent view of an air conditioning process using two heat and mass exchange stages, which may be separate units or a single, combined unit.
Figure 29:
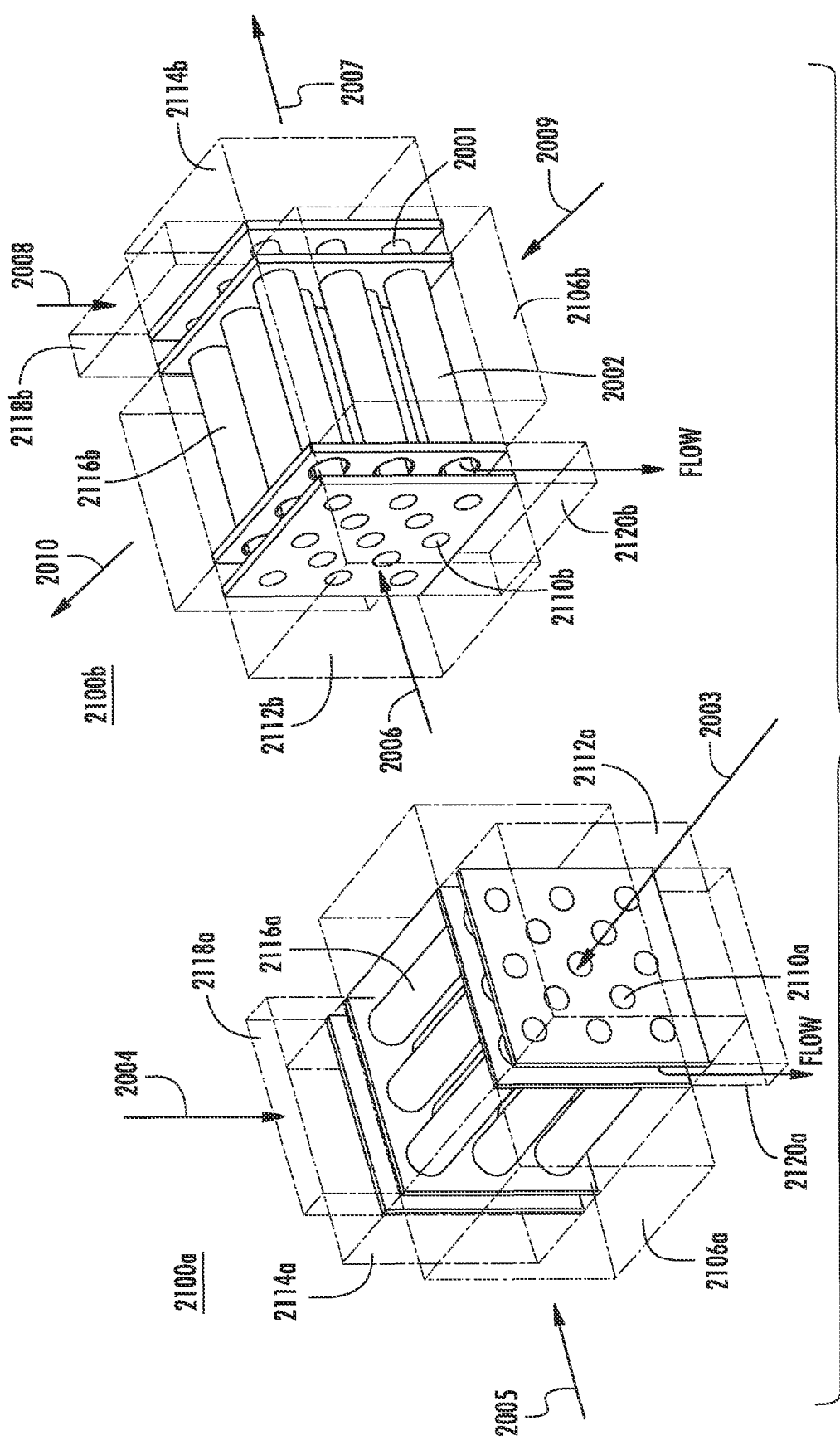
FIG. 29 is a perspective, semi-transparent view of an air conditioning process using two heat and mass exchange stages, which may be separate units or a single, combined unit.
Figure 30:
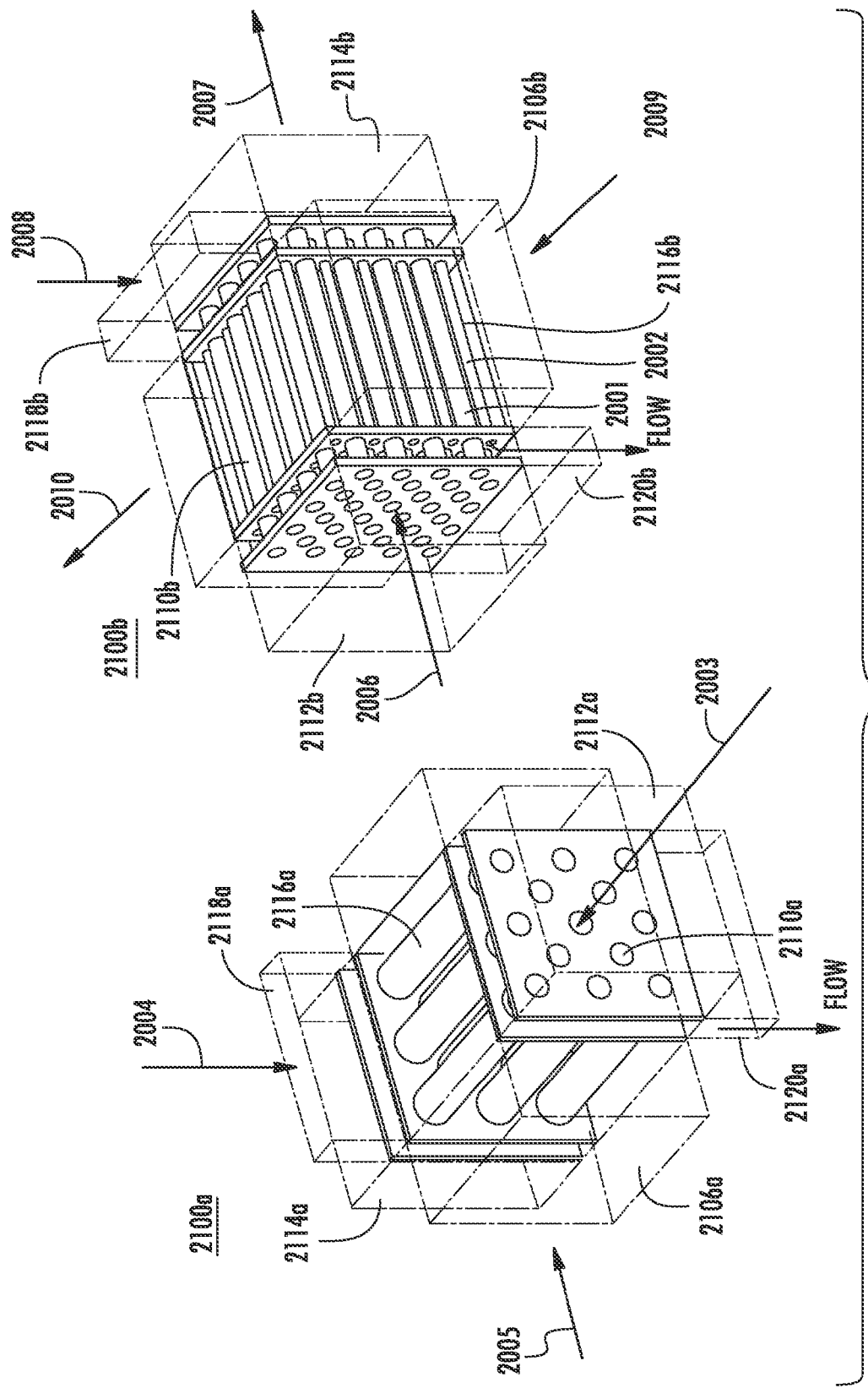
FIG. 30 is a perspective, semi-transparent view of an air conditioning process using two heat and mass exchange stages, which may be separate units or a single, combined unit.
Figure 31:
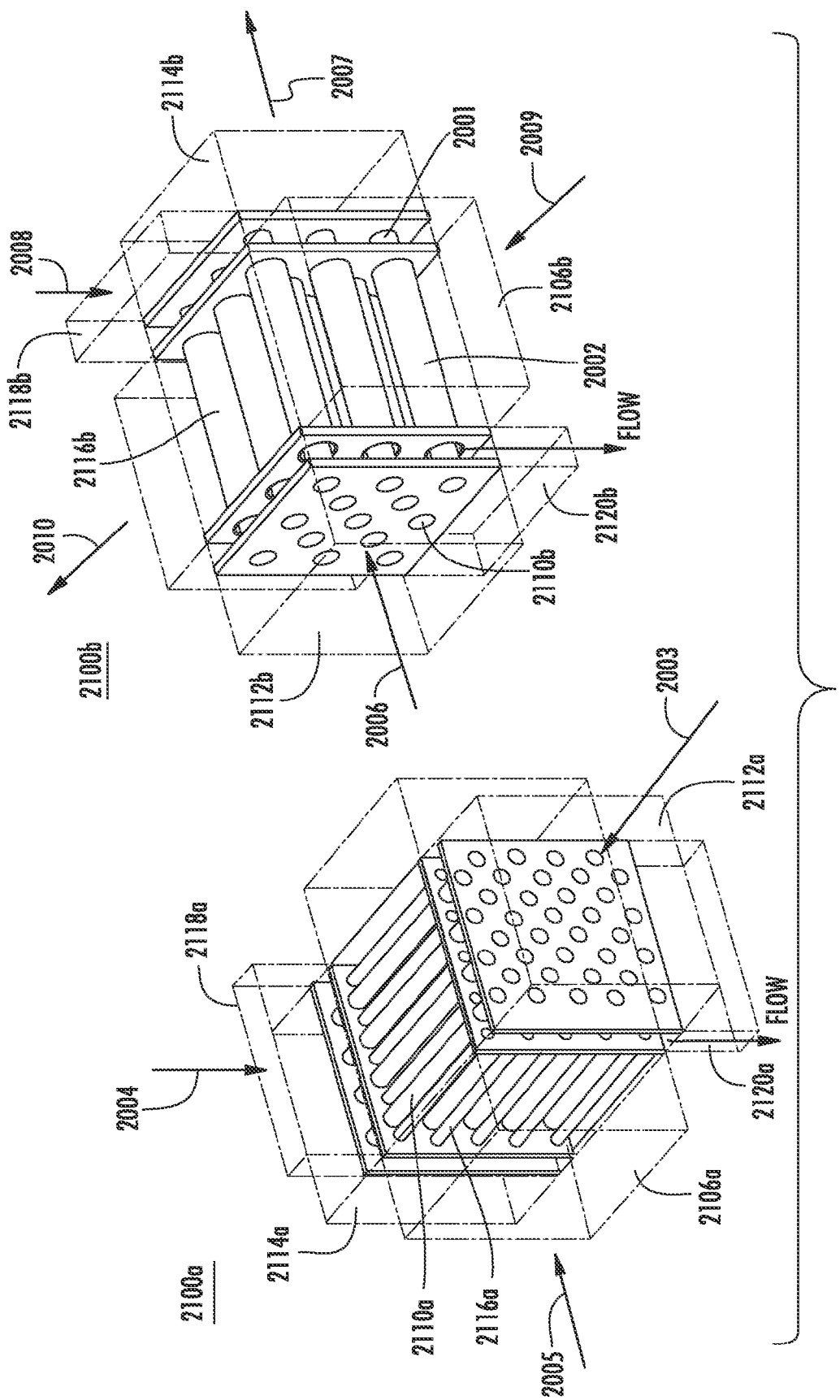
FIG. 31 is a perspective, semi-transparent view of an air conditioning process using two heat and mass exchange stages, which may be separate units or a single, combined unit.

In a third embodiment of the Mass transfer tube (2002), a structural porous or perforated tube (2020) is used as a mechanical support, onto which a microporous membrane (2021) or an aforementioned solid electrolyte membrane (2021) is attached. A porous tube (2020) may be produced from sintered PVDF, PP or other suitable material with porosity in the range that includes, but is not limited to 10 microns to 500 microns. A perforated tube (2020) with porosity in the range that includes, but is not limited to 0.05" to 0.5" may be produced by injection or compression molding PP, PVDF, or other suitable material. The structural tube (2020) may have circular cross section, or it may use a foil-shape or other combination of circular and angular sections that result in improved air flaw directed perpendicular to its axis (FIG. 27). Certain cross sections, such as the foil-shape will enable assembly of the porous and perforated structures (2020) and membranes (2021) from sheet materials, bonded at the trailing edge using heat staking, chemical adhesives and other methods known to one versed in the art.

One application for the dehumidifying heat exchanger is the aforementioned removal of latent heat from an air stream. A second application for the liquid desiccant regeneration system described herein is the removal of sensible heat from an air stream—the second stage in producing dry, cool air for building air conditioning and refrigeration, FIGS. 28, 29, 30, and 31 describe this two-stage air conditioning process to produce dry, cool air using two consecutive heat and mass transfer devices (2100), respectively. As it relates to FIGS. 28-31, cooling of a dehumidified air stream (2006) may he accomplished without increasing its humidity through heat exchange with a secondary air stream (2009) whose temperature is reduced by evaporative cooling with water (2008). The heat and mass transfer device (2100) of design shown in FIGS. 19*a*, 19*b*, or FIG. 20 may be used for this purpose by substituting water (2008) for the liquid desiccant (2004). In this second application, the dehumidified process air stream (2006) is introduced into heat transfer conduits (2001) that exchange heat only (not water). Ambient air (e.g., return air (2009) from the building) is directed across the mass transfer conduits (2002) where it picks up water vapor and experiences a reduction in temperature due to evaporative cooling. This cooled air (2009) then exchanges heat directly with the air in the heat transfer conduits (2001) when using the design of FIG. 19, or with the subsequent Mass transfer conduits (2002), when using the design of FIG. 20, which in turn exchange heat with the internal, concentric heat transfer conduits (2001). Dry, cool air (2007) is produced as a result of consecutively passing humid, hot air (2005) through two of the heat and mass transfer devices (2100); one configured for dehumidification of humid air (2005), and the second configured for humidification and cooling of a secondary air stream (2009).

In one variation, chilled water or refrigerant from a vapor compression cycle is introduced into the heat transfer conduits (2001) of the dehumidifying heat and mass transfer device. The chilled water or refrigerant serves as the coolant (2003), which exchanges heat with the liquid desiccant (2004) as in earlier embodiments. Depending on coolant (2003) temperature and flow rate, the liquid desiccant (2004) may be maintained at or reduced from its inlet temperature, further promoting dehumidification of the process air (2005) and potentially achieving the desired building process air temperature without the use of a second indirect cooling device.

FIG. 21 shows the implementation of the heat and mass transfer devices (2100) in an air conditioning system (2200) that is fueled with natural gas, provides dry, cool air, and produces electricity as a by-product. Heat from a fuel cell is used to regenerate the liquid desiccant (2004) by liberating the water absorbed in the dehumidifying heat and mass transfer device (2100). This dry air (2006) is subsequently introduced into the heat transfer conduits (2001) of a second heat and mass transfer device (2100), where it is indirectly cooled by a secondary air stream (2009) that is undergoing evaporative cooling.

In some embodiments, a heat and mass transfer device 2100 is described. The heat and mass transfer device can include a heat transfer duct system 2102, a mass transfer duct system 2104, and an air transport duct 2106. As best shown in FIGS. 19, 20 & 28-31, portions of the heat transfer duct system 2102 and the mass transfer duct system 2104 extend through the air transport duct 2106. The mass transfer duct system 2104 comprises a water vapor permeable wall 2108. As used herein, "water vapor permeable" refers to a material that is permeable to water vapor, but does not allow the transport of water from one side of the material (wall, membrane, etc.) to the other under standard pressures. For example, "water vapor permeable" membranes include microporous, hydrophobic materials.

In some embodiments, the heat transfer duct system 2102 includes a plurality of heat transfer ducts 2110 in fluid communication with a heat transfer fluid header chamber 2112 on one end and a heat transfer fluid exhaust chamber 2114 at an opposite end of the heat transfer ducts 2110. In some embodiments, the heat transfer ducts 2110 can be heat transfer conduits 2001 having a cylindrical cross-section. In some embodiments, the individual heat transfer ducts 2110 can be parallel to one another. In some embodiments, the flow through the air transport duct 2106 can be perpendicular to the flow through the heat transfer ducts 2110. Although referred to as "heat transfer fluid," it should be understood that in a closed cycle the heat transfer fluid will be relatively cold in some portions of the system (such as prior to cooling ambient air in an air conditioner), and warm in other portions of the system (after cooling the ambient air in an air conditioner). As used herein, "warm" is used to refer to temperatures at or above room temperature, for example, at least 25° C., or at least 30° C., while "cool" is used to refer to temperatures below room temperature, for example, below 20° C., or below 15° C.

In some embodiments, the mass transfer duct system 2104 includes a plurality of mass transfer ducts 2116 in fluid communication with a desiccant header chamber 2118 on one end and a desiccant exhaust chamber 2120 at an opposite end of the mass transfer ducts 2116. In some embodiments, the mass transfer ducts 2116 can be mass transfer conduits 2002 having a round cross-section. In some embodiments, the individual mass transfer ducts 2116 can be parallel to one another. In some embodiments, the flow through the air transport duct 2106 can be perpendicular to the flow through the mass transfer ducts 2116.

In some embodiments, such as those shown in FIGS. 19*a* & 19*b*, the plurality of mass transfer ducts 2116 are spaced apart from and interspersed with the plurality of heat transfer ducts 2110. As used herein, "interspersed with" is used to refer to arrangements where the ducts are independently placed and separated, but located in the same region, as shown in FIGS. 19*a* and 19*b*. The phrase "interspersed with" is intended to distinguish from arrangements where one duct is within another duct, as shown in FIG. 20.

As shown in FIG. 20, in some embodiments, each heat transfer duct 2110 is positioned within a mass transfer duct 2116. The mass transfer ducts 2116 are can be spaced apart from one another in some embodiments. In some embodiments, one heat transfer duct 2110 is positioned coaxially within each mass transfer duct 2116.

In some embodiments, the walls of the heat transfer ducts 2110 comprise a material selected from the group consisting of polyvinylidene difluoride (PVDF), polypropylene (PP), polyvinyl chloride (PVC), polyphenylene sulfide (PPS), polyethersulfone (PES), polytetrafluoroethylene (PTFE), and combinations thereof.

In some embodiments, the walls of the heat transfer ducts 2110 do not contain metal. This can be advantageous in embodiments where the heat transfer duct 2110 is within the mass transfer duct 2116, because such embodiments can expose the exterior wall of the heat transfer duct 2110 to a liquid desiccant flowing within the mass transfer duct 2116. In some embodiments, the wall of the heat transfer duct can be formed of a metal coated with a non-corrosive coating, e.g., polyvinylidene difluoride (PVDF), polypropylene (PP), polyvinyl chloride (PVC), polyphenylene sulfide (PPS), polyethersulfone (PES), polytetrafluoroethylene (PTFE), and combinations thereof.

As shown in FIGS. 19-33, in some embodiments, each heat transfer duct 2110 is longer than each mass transfer duct 2116. In some embodiments, the heat transfer ducts 2110 are the same length. In some embodiments, the mass transfer ducts 2116 are the same length.

As best shown in FIG. 19*b*, in some embodiments, a first end of each heat transfer duct 2110 is mounted to an opening 2122 in a heat transfer header plate 2124, and an opposite end of each heat transfer duct 2110 is mounted to an opening 2126 in a heat transfer exhaust plate 2128. In some embodiments, a first end of each mass transfer duct 2116 is mounted to an opening 2130 in a mass transfer header plate 2132, and an opposite end of each mass transfer duct 2116 is mounted to an opening 2134 in a mass transfer exhaust plate 2136.

As shown in FIG. 19b, embodiments where the flow within the mass transfer ducts 2116 is counter to the flow within the heat transfer ducts 2110, at least a portion of the desiccant header chamber 2118 can be between the heat transfer exhaust plate 2128 and the mass transfer header plate 2132. In such embodiments, at least a portion of the desiccant exhaust chamber 2120 is between the heat transfer header plate 2124 and the mass transfer exhaust plate 2136.

Although not shown, it will be easily understood that, in embodiments where the flow within the mass transfer ducts 2116 is in the same direction as the flow within the heat transfer ducts 2110, at least a portion of the desiccant header chamber 2118 is between the heat transfer header plate 2124 and the Mass transfer header plate 2132. In such embodiments, at least a portion of the desiccant exhaust chamber 2120 is between the heat transfer exhaust plate 2128 and the mass transfer exhaust plate 2136.

In some embodiments, no mass exchange occurs between the heat transfer duct system 2102 and the mass transfer duct system 2104. In some embodiments, the ducts 2110, 2116 can be attached to the respective header plate 2124, 2132 and/or exhaust plate 2128, 2136 in a manner that prevents leaks from one side of the plate 2124, 2128, 2132, 2136 to the other. Examples of techniques that can be used to produce such seals include, but are not limited to, (a) compression forces transferred through an elastomer o-ring, (b) welding, (c) screwed on fastening, (d) chemical bonding, and (e) combinations thereof. As is evident from FIGS. 19a, 19b, in some embodiments, the heat transfer ducts 2110 must interact with openings in the mass transfer plates 2132, 2136 to form a liquid tight seal in order to prevent fouling, of the heat transfer fluid stream and the liquid desiccant stream.

In some embodiments, each mass transfer duct 2116 is longer than each heat transfer duct 2110. Such embodiments are identical to those shown in FIGS. 19a, 19b, and 20, with the exception that heat transfer fluid is fed to the mass transfer ducts 2116 and the liquid desiccant is fed to the heat transfer duct 2110.

In some embodiments, the mass transfer duct system 2104 comprises walls 2019 formed from a water vapor permeable material. In some embodiments, the wall(s) 2019 can include a porous support material 2020 (e.g., a scaffolding, such as that shown in FIGS. 25 & 27) and a water vapor permeable material 2021. Examples of wall 2019 materials are those selected from the group consisting of a microporous plastic, structural porous duct 2020 covered with a microporous plastic 2021, a structural porous duct 2020 covered with a water-permeable, microporous polymer electrolyte membrane 2021, or a combination thereof. As used herein, "covered" includes, but is not limited to, instances where a material is coated onto a substrate and instances where a material (such as a film) is wrapped over or shrink wrapped onto the substrate, An example of a porous support material 2020 is shown in FIG. 27.

In some embodiments, the contents of the heat transfer duct system 2102 are in thermal communication with contents of the air transport duct 2106 via a wall 2103. The wall 2103 can include a material selected from the group consisting of polyvinylidene difluoride (PVDF), polypropylene (PP), polytetrafluoroethylene (PTFE), polyvinyl chloride (PVC), polyphenylene sulfide (PPS), polyethersulfone (PES), metal, and combinations thereof. In some embodiments, the wall can be formed of a metal coated by polyvinylidene difluoride (PVDF), polypropylene (PP), polytetrafluoroethylene (PTFE), or combinations thereof. In other embodiments, the wall can be formed of polyvinylidene difluoride (PVDF), polypropylene (PP), polytetrafluoroethylene (PTFE), polyvinyl chloride (PVC), polyphenylene sulfide (PPS), polyethersulfone (PES), or combinations thereof. Examples of metal that can be useful include, but are not limited to, titanium, stainless steel, and other corrosion resistant metals or alloys.

In some embodiments, a heat transfer fluid stream 2003 is fed into an inlet $2102_{IN}$ of the heat transfer duct system 2102. In some embodiments, the heat transfer fluid stream comprises a heat transfer fluid selected from a group that includes, but is not limited to, air, ethylene glycol, water, ammonia, fluorocarbons, chlorofluorocarbons, sulfur dioxide, batons, hydrocarbons, and mixtures thereof. As used herein, "halons" has its standard meaning, and includes haloalkanes.

In some embodiments, a liquid desiccant stream 2004 is fed into an inlet $2104_N$ of mass transfer duct system 2104. In some embodiments, a desiccant (e.g., salt) concentration of the liquid desiccant stream 2004 is lower at an outlet $2104_{OUT}$ of the mass transfer duct system 2104 than at the inlet $2104_{IN}$ of the mass transfer duct system 2104.

In some system embodiments, such as those shown in FIGS. 21-24 and 28-32, an air conditioning system 2200 that includes a first heat and mass transfer device $2100_A$ and a second heat and mass transfer device $2100_B$ and any variants thereof described herein, is described. In some embodiments of the air conditioning system 2200, an exhaust of the first air transport duct $2106_{A,OUT}$ is in fluid communication with an inlet to the second heat transfer duct system $2102_{B,IN}$. For clarity, the subscript A will be used to refer to features of the first heat and mass transfer device $2100_A$, while the subscript B will be used to refer to features of the second heat and mass transfer device $2100_B$, and the subscript C to refer to features of the third heat and mass transfer device $2100_C$.

In some embodiments, air 2009 flowing through the second air transport duct $2106_B$ is humidified by a liquid stream 2008 flowing in the second mass transfer duct $2102_B$.

In some air conditioning system embodiments:
a first heat transfer fluid stream is fed into the first heat transfer duct system $2102_A$, $2112_A$;
a high concentration liquid desiccant stream is fed into the first mass transfer duct system $2104_A$, $2118_A$;
air being conditioned is fed into the first air transport duct $2106_A$;
dehumidified air exiting the first air transport duct $2106_A$ is fed into the second heat transfer duct system $2102_B$, $2112_B$;
water is fed into the second mass transfer duct system $2104_B$, $2118_B$; and
secondary air 2009 is fed into the second air transport duct $2106_B$.

In such embodiments, the second mass transfer duct system $2104_B$ can include a wall e.g., walls of the mass transfer ducts $2116_B$) comprising a mass transfer membrane that is selectively permeable to water vapor. In such embodiments, the secondary air 2009 is humidified by water passing through the mass transfer membrane of the mass transfer ducts $2116_B$ to produce humidified process air 2010. In such embodiments, the mass transfer ducts $2116_B$ can be formed of a water-vapor permeable membrane and operated at a pressure above the breakthrough pressure of water-vapor permeable membrane, or the mass transfer ducts $2116_B$ can be formed of a water permeable, microporous material. In either case, a thin film of water can be produced on the exterior of the mass transfer ducts $2116_B$ in order to facilitate humidification of the secondary air 2009.

In some embodiments, the first heat transfer fluid stream 2003 comprises air and the second heat transfer fluid stream comprises air 2009 that undergoes evaporative cooling with water 2008 that sheets over the surface of the Mass transfer ducts $2116_B$. In some embodiments, the mass transfer ducts 2116B can have water permeable, microporous walls. In other embodiments, the mass transfer ducts 2116B can have walls formed from water vapor permeable walls and the water pressure can be at or above the breakthrough pressure. In some embodiments, an exhaust stream from the second heat transfer duct system $2102_B$, $2114_B$ comprises dehumidified, cooled air 2007 that is supplied to a space being air conditioned. Examples of such embodiments are shown in FIGS. 21-24 & 32.

In some embodiments, a low concentration liquid desiccant stream exiting the first mass transfer duct system $2104_{A, OUT}$, $2120_A$ is regenerated to produce a high concentration liquid desiccant stream fed into an inlet of the first mass transfer duct system $2104_{A, IN}$, $2118_A$.

In some embodiments, the air conditioning system 2200 includes a fuel cell 2138. In some embodiments, the heat (e.g., from the coolant used in the fuel cell) produced by the fuel cell 2138 is used to regenerate the liquid desiccant stream by driving water out of the liquid desiccant stream and produce a high concentration liquid desiccant stream. Examples of such embodiments are shown in FIGS. 21-24 & 32.

In some embodiments, such as those shown in FIGS. 21-24 & 32, the air conditioning system 2200 includes a regeneration system 2140. In some embodiments, such as the one shown in FIG. 21, the regeneration system relies upon a counter-flow heat exchanger 2145. In some embodiments, warm heat transfer fluid (e.g., hot water) front the fuel cell 2138 is fed into the heat transfer line inlet 2152 of the heat exchanger 2145 and the heat transfer fluid exiting the heat transfer line outlet 2154 is returned to the fuel cell 2138. A low concentration liquid desiccant stream from the desiccant exhaust chamber 2120A can be fed into a heat exchanger desiccant inlet 2156 of the heat exchanger 2145. The low-concentration liquid desiccant is heated as is passes through the heat exchanger 2145. The low-concentration liquid desiccant exiting the heat exchanger desiccant outlet 2158 then proceeds to a mass transfer unit 2150.

The low-concentration liquid desiccant from the heat exchanger desiccant outlet 2158 enters the mass transfer unit 2150 through the mass transfer desiccant inlet 2160 then flows through the mass transfer desiccant ducts 2161 before exiting the mass transfer desiccant outlet 2162. The fuel cell exhaust 2163 is fed into the mass transfer heating inlet 2164, passes through a mass transfer heating ducts 2165 and exits the mass transfer heating outlet 2166. Water in the liquid desiccant stream which was previously heated in the heat exchanger 2145 is driven out of the mass transfer desiccant ducts 2161 in the form of water vapor. In some embodiments, the mass transfer desiccant ducts 2161 have water vapor permeable, microporous walls to drive water out of the low-concentration liquid desiccant and produce a high concentration liquid desiccant stream exiting the mass transfer desiccant outlet 2162.

The high-concentration liquid desiccant stream exiting the mass transfer desiccant outlet 2162 can then be fed into a radiator 2168 for cooling. The high concentration liquid desiccant stream can then be fed into the desiccant header chamber $2118_A$ of the first heat and mass transfer device $2100_A$.

In other embodiments, such as those shown in FIGS. 22-24 & 32, the regeneration system 2140 can include a moisture removal duct 2106C, and a desiccant regeneration duct 2116C that extends through the moisture removal duct 2106C, wherein water vapor from the liquid desiccant stream in the desiccant regeneration duct 2116C selectively passes through a desiccant regeneration duct membrane forming the wall of the duct 2116C and into the moisture removal duct 2106C where it is entrained in the humidified air 2011. In some embodiments, such as those shown in FIGS. 22-24, warm coolant from the fuel cell 2138 heats the liquid desiccant stream thereby driving water from the liquid desiccant stream in the mass transfer ducts 2116C into the removal stream passing through the moisture removal duct 2106C. The high humidity water recovery stream 2011 can be fed into a radiator to precipitate and capture the moisture in the water recovery stream 2011.

In some embodiments, the regeneration system 2140 includes a third heat/mass transfer device 2100C as described herein. In such embodiments, an outlet 2120A of the first mass transfer duct system 2104A is in fluid communication with an inlet 2118C of the third mass transfer duct system 2104C, and an outlet 2120C of the third mass transfer duct system 2104C is in fluid communication with an inlet 2118A of the first mass transfer duct system 2104A. In some embodiments, the warm exhaust from the fuel cell 2138 is fed into an inlet of the third air transport duct 2106C, and warm heat transfer fluid (e.g., hot water) from the fuel cell 2138 is fed into an inlet 2112C of the third heat transfer duct system 2102C. Examples of such embodiments are shown in FIGS. 22-24 & 32.

Figure 22:
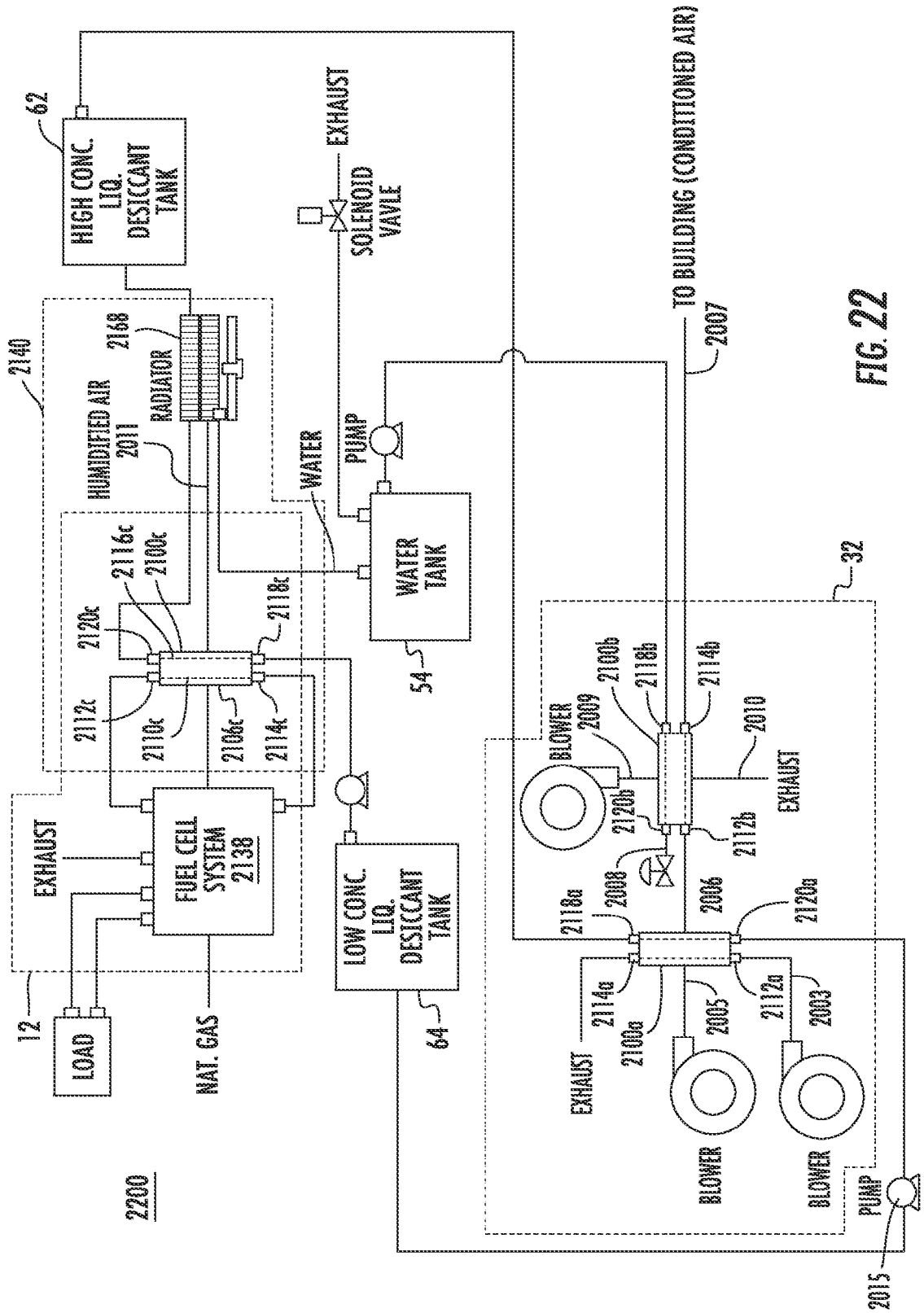
FIG. 22 is a diagram of a liquid desiccant regeneration and dehumidification system as described herein.
Figure 23:
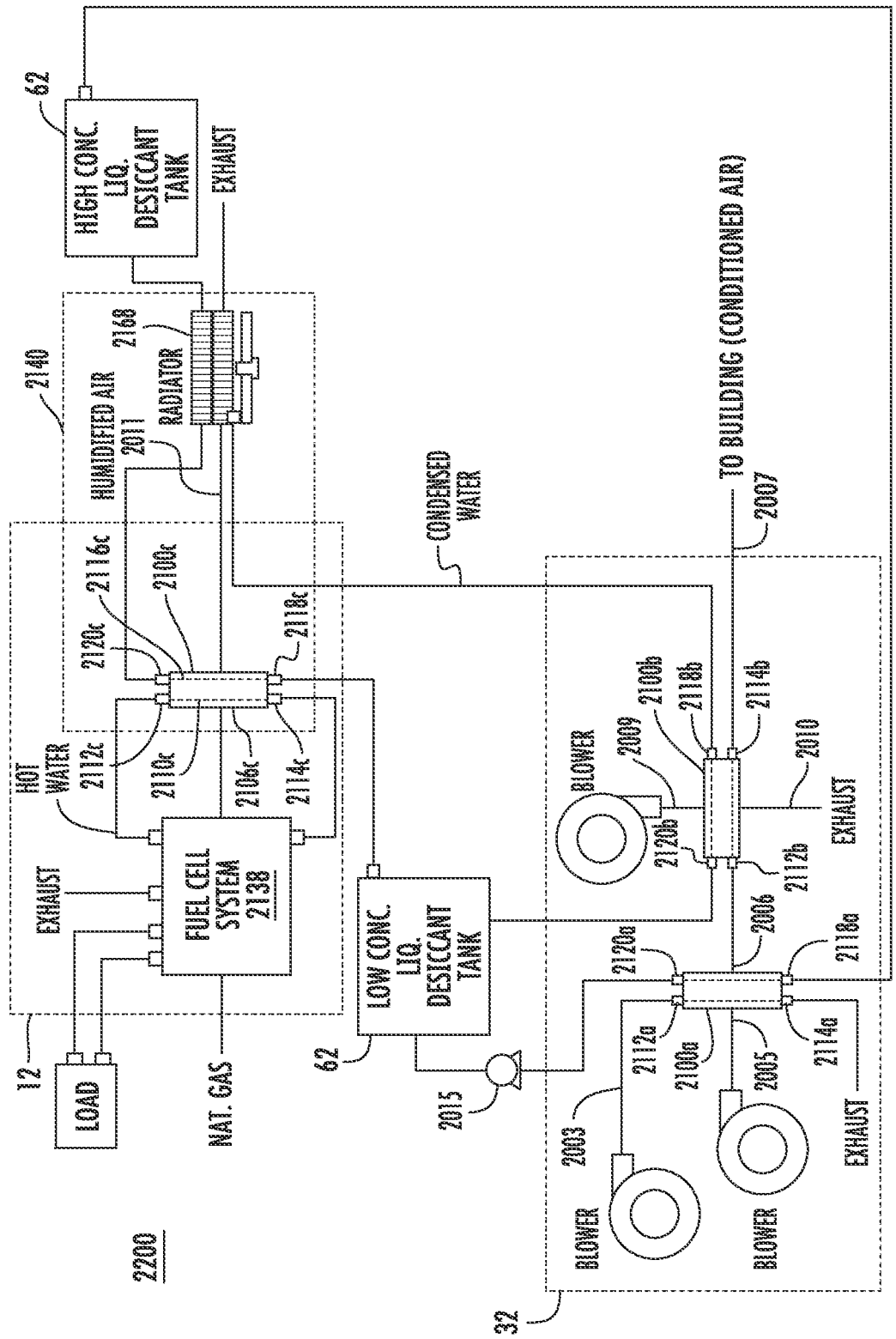
FIG. 23 is a diagram of a liquid desiccant regeneration and dehumidification system as described herein.
Figure 24:
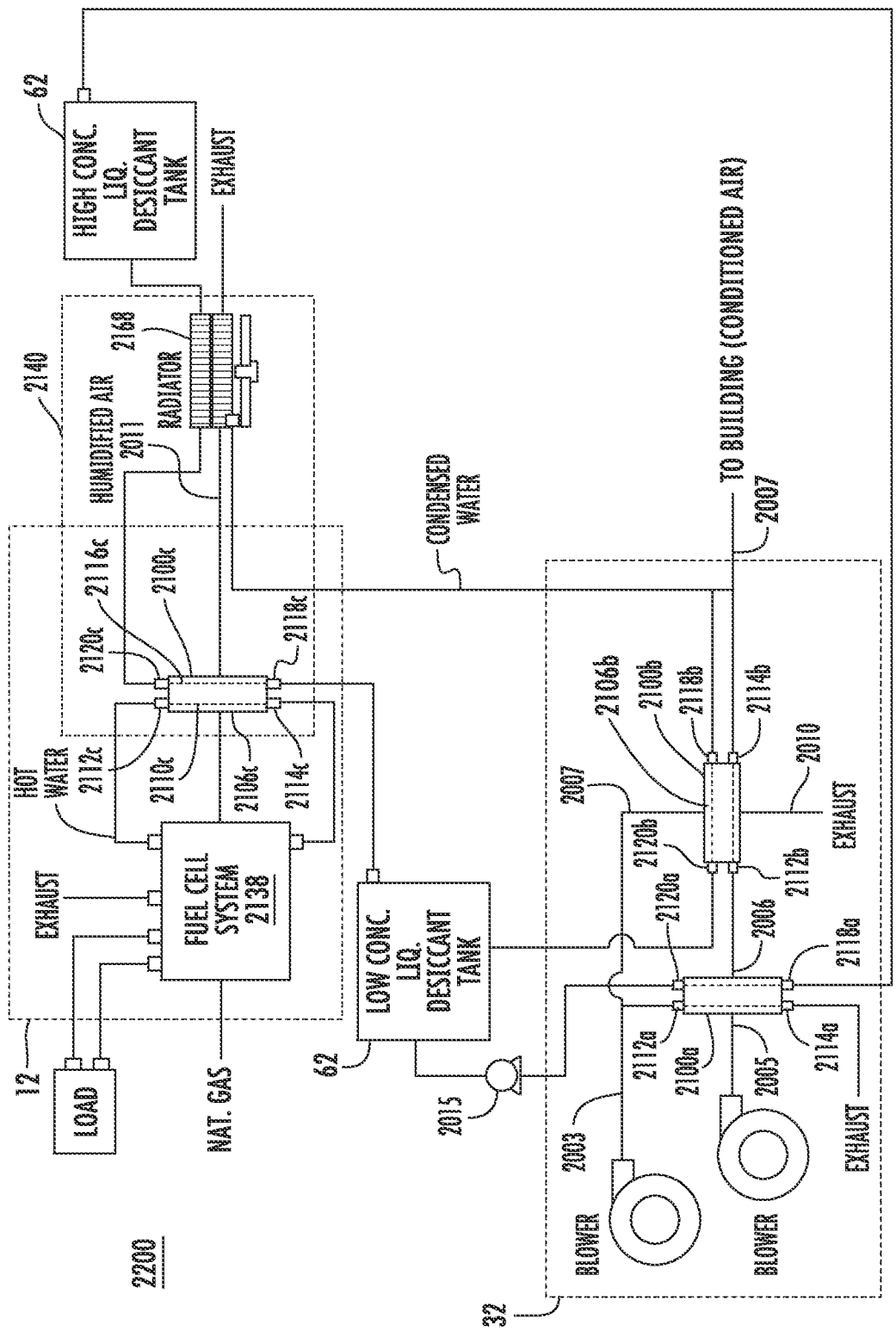
FIG. 24 is a diagram of a liquid desiccant regeneration and dehumidification system as described herein.
Figure 32:
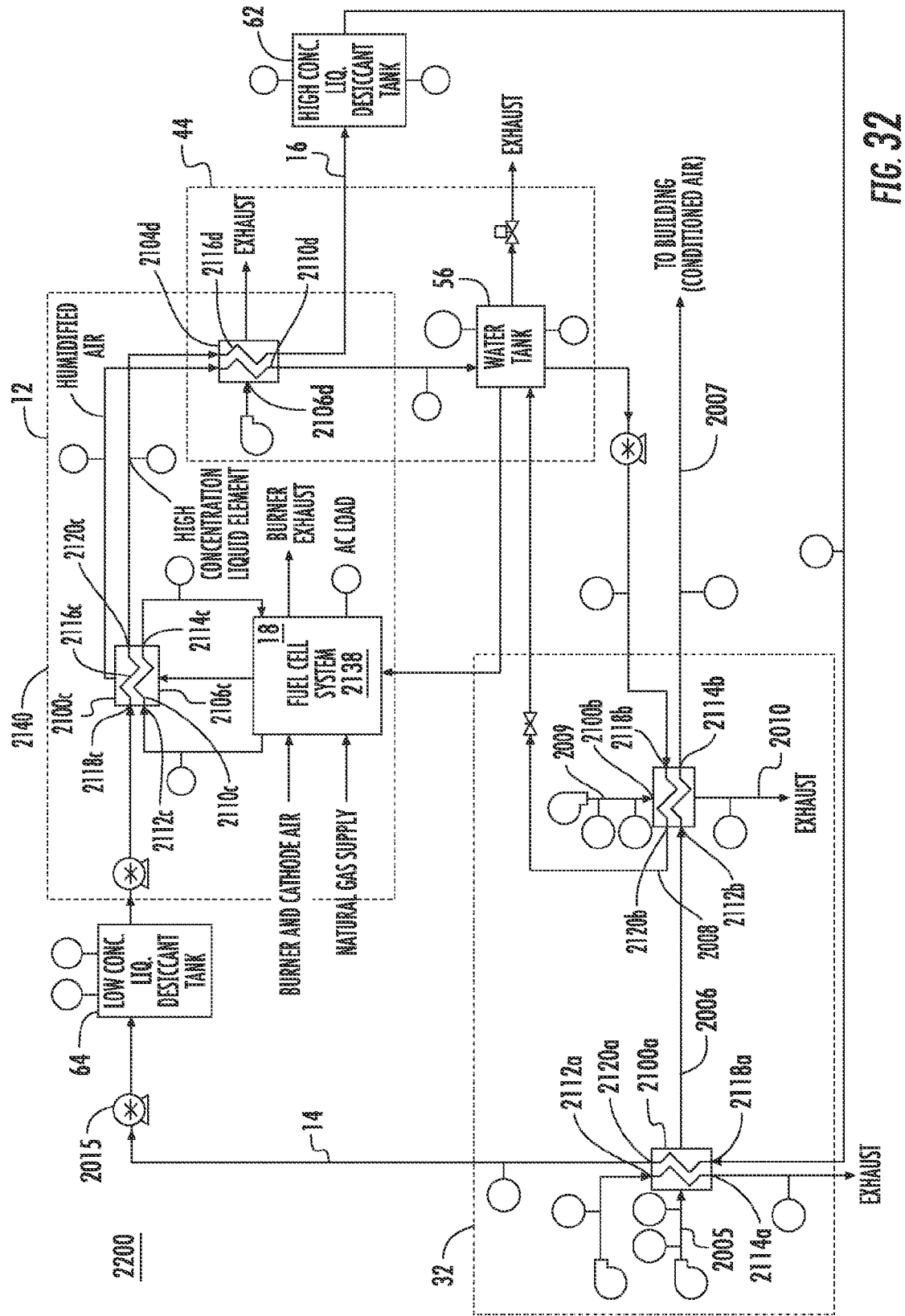
FIG. 32 is a diagram of a liquid desiccant regeneration and dehumidification system as described herein.

As shown in FIGS. 22-24 & 32, the high concentration liquid desiccant exiting the third desiccant exhaust chamber 2120C is then fed into a heat exchanger intended to cool the high concentration liquid desiccant stream before it is fed into the first desiccant header chamber 2118A. In FIGS. 22-24, the heat exchanger is a radiator used using a fan and ambient air to cool the cooled, humidified fuel cell exhaust stream exiting the third air transport duct 2106C and the high concentration liquid desiccant exiting the third desiccant exhaust chamber 2120C. In FIG. 32, the heat exchanger is a fourth heat and mass exchange unit 2100D that has been modified to use impermeable mass transfer ducts 2116D, so that there is no mass exchange. Rather, the air flowing through the air transport duct 2106D is used to cool both the humid fuel cell exhaust stream flowing through the heat transfer ducts 2110D and the high-concentration liquid desiccant stream in the mass transfer ducts 2116D (which have been modified so they are not mass transfer ducts).

A first specific heat and mass transfer device can include a heat transfer duct system; a mass transfer duct system; and an air transport duct. wherein portions of said heat transfer duct system and said mass transfer duct system extend through said air transport duct, wherein the mass transfer duct system comprises a water vapor permeable wall.

A second HMX device includes the first HMX device wherein said heat transfer duct system comprises a plurality of heat transfer ducts in fluid communication with a heat transfer fluid header chamber on one end and a heat transfer fluid exhaust chamber at an opposite end of the heat transfer ducts.

A third HMX device includes any of the foregoing HMX devices, wherein the mass transfer duct system comprises a plurality of mass transfer ducts in fluid communications with a desiccant header chamber on one end and a desiccant exhaust chamber at an opposite end of the mass transfer ducts.

A fourth HMX device includes the third HMX device, wherein said heat transfer duct system comprises a plurality of heat transfer ducts in fluid communication with a heat transfer fluid header chamber on one end and a heat transfer fluid exhaust chamber at an opposite end of the heat transfer ducts.

A fifth HMX device includes the fourth HMX device, wherein said plurality of mass transfer ducts are spaced apart from and interspersed with and said plurality of heat transfer ducts.

A sixth HMX device includes the fourth HMX device, wherein each heat transfer duct is positioned within a mass transfer duct, and wherein said mass transfer ducts are spaced apart from one another.

A seventh HMX device includes the sixth HMX device, wherein one heat transfer duct is positioned coaxially within each mass transfer duct.

A eighth HMX device includes the sixth HMX device, wherein walls of said heat transfer ducts comprise a material selected from the group consisting of polyvinylidene difluoride (PVDF), polypropylene (PP), polyvinyl chloride (PVC), polyphenylene sulfide (PPS), polyethersulfone (PES), polytetrafluoroethylene (PTFE), and combinations thereof.

A ninth HMX device includes the fourth HMX device, wherein each heat transfer duct is longer than each mass transfer duct.

A tenth HMX device includes the ninth HMX device, wherein a first end of each heat transfer duct is mounted to an opening in a heat transfer header plate, and an opposite end of each heat transfer duct is mounted to an opening in a heat transfer exhaust plate; wherein a first end of each mass transfer duct is mounted to an opening in a mass transfer header plate, and an opposite end of each mass transfer duct is mounted to an opening in a mass transfer exhaust plate; wherein at least a portion of said desiccant header chamber is between said heat transfer header plate and said mass transfer header plate; and wherein at least a portion of said desiccant exhaust chamber is between said heat transfer exhaust plate and said mass transfer exhaust plate.

A eleventh HMX device includes the fourth HMX device, wherein each mass transfer duct is longer than each heat transfer duct.

A twelfth HMX device includes any of the foregoing HMX devices, wherein no mass exchange occurs between said heat transfer duct system and said mass transfer duct system.

A thirteenth HMX device includes any of the foregoing HMX devices, wherein said mass transfer duct system comprises a wall formed from a material selected from the group consisting of a microporous plastic, structural porous duct covered with a microporous plastic, a structural porous duct covered with a water permeable polymer electrolyte membrane, or a combination thereof.

A fourteenth HMX device includes any of the foregoing HMX devices, wherein contents of the heat transfer duct system are in thermal communication with contents of the air transport duct via a wall, wherein said wall comprises a material selected from the group consisting of polyvinylidene difluoride (PVDF), polypropylene (PP), polyvinyl chloride (PVC), polyphenylene sulfide (PPS), polytetrafluoroethylene (PTFE), metal, and combinations thereof.

A fifteenth HMX device includes any of the foregoing HMX devices, wherein an inlet of said heat transfer duct is in fluid communication with a heat transfer fluid stream.

A sixteenth HMX device includes the fifteenth HMX device, wherein the heat transfer fluid stream comprises a heat transfer fluid selected from the group consisting of air, ethylene glycol, propylene glycol, glycerol, water, ammonia, fluorocarbons, chlorofluorocarbons, sulfur dioxide, halons, hydrocarbons, and mixtures thereof.

A seventeenth HMX device includes any of the foregoing HMX devices, wherein a liquid desiccant stream is fed into an inlet of said mass transfer duct system.

An eighteenth HMX device includes the seventeenth HMX. device, wherein a desiccant concentration of the liquid desiccant stream is lower at an exit of the mass transfer duct system than at the inlet of the mass transfer duct system.

A first air conditioning system includes first and second HMX devices according to any of the foregoing HMX devices, wherein an exhaust of the first air transport duct is in fluid communication with an inlet to the second heat transfer duct system.

A second air conditioning system that includes the first air conditioning system, wherein air flowing through the second air transport duct undergoes evaporative cooling by a liquid stream containing water flowing in the mass transfer duct.

A third air conditioning system that includes any of the foregoing air conditioning systems, wherein:
 a first heat transfer fluid stream is fed into the first heat transfer duct system;
 a high concentration liquid desiccant stream is fed into the first mass transfer duct system;
 air being conditioned is fed into the first air transport duct;
 dehumidified air exiting the first air transport duct is fed into the second heat transfer duct system;
 a stream containing water is fed into the second mass transfer duct system; and
 secondary air is fed into the second air transport duct,
wherein the second mass transfer duct system comprises a wall comprising a mass transfer membrane that allows liquid water to pass, and wherein said secondary air undergoes evaporative cooling by water passing through the mass transfer membrane.

A fourth air conditioning system that includes the third air conditioning system, wherein the first heat transfer fluid stream comprises air.

A fifth air conditioning system that includes any of the foregoing air conditioning systems, wherein an exhaust stream from the second heat transfer duct system comprises dehumidified, cooled air that is supplied to a space being air conditioned.

A sixth air conditioning system that includes any of the foregoing air conditioning systems, wherein a low concentration liquid desiccant stream exiting said first mass transfer duct system is regenerated to produce a high concentration liquid desiccant stream fed into an inlet of the first mass transfer duct system.

A seventh air conditioning system that includes any of the foregoing air conditioning systems, further comprising a fuel cell, wherein warm heat transfer fluid from the fuel cell is used to regenerate the liquid desiccant stream by driving water out of the liquid desiccant stream.

An eighth air conditioning system that includes the sixth air conditioning system, further comprising a regeneration system, comprising: a moisture removal duct; and a desiccant regeneration duct extends through said moisture removal duct, wherein water vapor from the liquid desiccant stream in said desiccant regeneration duct selectively passes through a desiccant regeneration duct membrane into the moisture removal duct.

A ninth air conditioning system that includes the sixth air conditioning system, wherein warm heat transfer fluid from the fuel cell heats the liquid desiccant stream thereby driving water from the liquid desiccant stream into the fuel cell exhaust stream passing through the moisture removal duct.

A tenth air conditioning system that includes the ninth air conditioning system, wherein the regeneration system comprises a third HMX device according to any of the foregoing specific HMX devices, wherein an outlet of the first mass transfer duct system is in fluid communication with an inlet of the third mass transfer duct system, and an outlet of the third mass transfer duct system is in fluid communication with an inlet of the first mass transfer duct system.

An eleventh air conditioning system that includes the tenth air conditioning system, wherein the warm exhaust from the fuel cell is fed into an inlet of the third air transport duct, and warm heat transfer fluid from the fuel cell is fed into an inlet of the third heat transfer duct system.

Fourth Discussion

Described herein are methods and designs for a system where the heat exhausted from an engine is used to heat a liquid desiccant and/or an air stream, the latter referred as carrier air in this document. The carrier air is heated so that the partial pressure of the water vapor contained in the carrier air is lower than the concentration of water in a liquid desiccant stream that will be regenerated. The interaction between the liquid desiccant and the carrier air is accomplished through a membrane that is permeable to water vapor but not to the transfer of liquids, such as the liquid desiccant or liquid water. Given the difference in water concentration between the carrier air and the liquid desiccant, water flows from the liquid desiccant to the carrier air in the form of water vapor.

The process of liquid desiccant regeneration is continuously heated by a hot coolant stream proceeding from the engine that carries part or all of the heat produced by the engine. The hot coolant can in the form of a gas or a liquid. In some embodiments, the coolant can be a phase changing fluid in order to enhance heat transfer.

Desiccant regeneration occurs within a heat and mass transfer system (HMX) that enables heat transfer between the liquid desiccant, the coolant, and the carrier gas. It also enables exchange of water vapor between the liquid desiccant and the carrier air. The HMX is composed of a plurality of conduits over which carrier gas flows in a counterflow or cross flow manner. A certain group of the conduits flow liquid desiccant and another group of conduits flow coolant.

The outer wall of any of the conduits containing liquid desiccant described herein can be made of a material that is hydrophobic, impermeable to liquids, and permeable to water vapor. Such materials can be sulfonated tetrafluoroethylene based fluoropolymer-copolymer (Nafion™, sold by DuPont), water conducting fluoropolymers, and non-fluorinated proton conducting polymers such as NanoClear™, available from Dais Analytic, high density polyethelene, spunband olefins, among others described herein. The conduits in which coolant flow continuously warm the air, maintaining its relative humidity low. The distribution of these conduits can be such that a greater concentration of conduits carrying coolant occurs in the HMX area closer to the inlet of the carrier air.

An alternative HMX design is one where there is a tube assembly composed of a tube or a plurality of conduits within a larger diameter tube. In this case coolant flows within the smaller diameter conduits in the tube assembly and liquid desiccant flows within the larger diameter tube, but not within the smaller diameter conduits. The wall of the inner, smaller diameter conduits is made of a material that allows for heat transfer between the coolant and the liquid desiccant, but does not allow for mixing of the liquid desiccant with the coolant. These tube are made of materials that are chemically compatible with the liquid desiccant. The outer wall of the tube assembly is composed of a material that is permeable to water vapor but not permeable to liquids. The HMX would be composed of a plurality of these tube assemblies. Carrier air flows around these tube assemblies in crossflow. The liquid desiccant and the coolant flow counter-flow with respect to each other.

There may be cases where the coolant flow is much higher than the carrier air flow, or in which due to design or pressure drop considerations, it is convenient for the coolant to flow on the outside of the HMX conduits or tube assemblies. In these cases, the HMX would be composed of a chamber with a plurality of tube assemblies. These tube assemblies would be composed of an outer tube in which one or more smaller diameter conduits are located within. These smaller diameter conduits flow carrier gas within them. The outer, larger diameter tube flows liquid desiccant. The walls of the smaller diameter conduits are made of a material that is permeable to water vapor but not permeable to the flow of liquids. The wall of the outer, larger diameter tube is made of a material that is chemically compatible with the liquid desiccant but that is impermeable to gas or liquid. In this way, the liquid desiccant and the coolant only have heat transfer interaction but no mixing occurs. This design is principally relevant for cases where the coolant is a gas.

An alternative case may occur, where the coolant may be too hot to flow next to the liquid desiccant. In this case the HMX tube assemblies are, as previously described, made of a larger diameter tube within which is at least a single smaller diameter tube. The carrier air flows within the larger diameter tube but not within the smaller diameter conduits. The liquid desiccant flaws within the smaller diameter conduits. The wall of the smaller diameter tube is made of a material permeable to water vapor and not permeable to liquids. The wall of the outer diameter tube is made of a material that prevents mixing between the hot coolant and the carrier air, but allows for heat transfer between the carrier air and the hot coolant. By heating the carrier air directly, and indirectly heating the liquid desiccant, the liquid desiccant stream can be protected from elevated coolant temperatures that could lead to chemical deterioration of the liquid desiccant.

In order to maintain separation between the flows within the conduits, the HMX assembly uses headers. The HMX conduits have two distinct lengths. The different lengths enable introduction of liquid desiccant into conduits of a certain length and either coolant or carrier air (depending on design as discussed in the paragraphs above) into conduits of a different length. The header of the HMX has two chambers, one adjacent the other. The header chamber closest to the interior portion of the HMX has fluid connection with the interior portion of the shorter length conduits, but does not have fluid connection with the interior portion of longer length conduits. The header chamber farthest from the interior of the HMX is in fluid connection with the interior portion of the longer length conduits. The two header chambers are not in fluid connection with each other.

In an alternative HMX design, where the tube-in-tube assemblies are not employed, the header chambers are next to each other but not in fluid connection with each other.

Heat and mass transfer enhancements can be made to the HMX. In the case that the carrier air flows across the outside of the HMX conduits or tube assemblies, mass transfer between the air and the liquid desiccant can be enhanced by placing walls in the HMX so that the carrier air has to flow a tortuous path. In this way the space velocity of the carrier air in the HMX can be varied enhancing mass transfer.

An alternative method of enhancing mass and heat transfer in the HMX would be through the addition of vertical features that block a portion of the carrier air flow through the HMX. In this way, vortices and turbulence can be accomplished. These features can be rods over which the carrier air must pass. The rods may have roughness or features to enhance the creation of vortices or turbulences. These features can also be used to create helical bulk flow of the carrier air through the HMX by acting as fins that direct flow.

The engine exhaust gas contains products of the oxidation of a fuel, which includes water. In the case the engine exhaust has a higher temperature than the carrier air entering the system, gas to gas heat exchanger is used to transfer heat from the engine exhaust to the carrier air. The carrier air then enters into the HMX. The gas to gas heat exchanger can be made of plates with triangular or corrugated sheets that form structural elements as well as flow channels. The corrugated sheets form channels that are perpendicular to the channels in the adjacent plates. The direction of the corrugations also block air flow into certain plates This ensures the engine exhaust gas does not mix with the carrier air in the gas to gas heat exchanger. Other methods for gas to gas heat exchange known in the art can also be used.

The carrier air leaving the HMX is mixed with the engine exhaust gas leaving the gas to gas heat exchanger. A mixer can be used to reduce the pressure drop associated with the integration of the two flows. Leaving the mixer the combined gas is cooled in order to condense the air in the air stream. The condenser can use ambient air as the cooling fluid. Water condensed is collected in a water reservoir. The cool gas leaving the condenser is exhausted.

Instances may exist where carrier air and engine exhaust gas mixing is not practical due to flow rate disparity, pressure drop considerations, or chemical compatibility. In these cases, the carrier eras is independently condensed through an independent condenser. The carrier gas leaving the HMX also passes through an independent condenser. The water condensed from both the carrier air stream and from the engine exhaust gas is collected in a water reservoir.

The liquid desiccant, at a high concentration point, leaving the HMX is stored in a reservoir.

Compared to the state of the art, the systems described herein offer many advantages. For example, the liquid desiccant regeneration systems not only regenerates the liquid desiccant but it also collects water produced from the engine and the water removed from the liquid desiccant during the regeneration process. Water recovery and accumulation is highly valuable. If the engine exhaust stream and the carrier air stream is devoid of toxic substances, the water collected could be used for human, agricultural, or livestock processes. Water can also be used to support air conditioning operation. Water can also be used to support engine processes, such as fuel processing or cooling.

The liquid desiccant regeneration systems described herein also prevents the mixture of liquid desiccant with other streams. Liquid desiccants are typically corrosive. Maintaining the liquid desiccant separate from other flows reduces the potential for corrosion of valves, tanks, ducting, etc.

The liquid desiccant regeneration systems will now be described more particularly, by way of example, with reference to the accompanying drawings, in which:

FIG. 34 shows an embodiment of a process diagram for the liquid desiccant regeneration system. As shown, low concentration liquid desiccant (3002) flows from a reservoir (3001) to the HMX (3015). The HMX (3015) also receives a hot coolant stream (3006) leaving an engine (3005). Carrier air (3008) is introduced to the system and flows through an air to air heat exchanger (3021) where it warmed. The warm carrier air (3009) is introduced into the HMX. The carrier air (3008) is warmed through heat exchange with engine exhaust (3013) leaving the engine (3005). Within the (3015) the coolant provides the heat to support the transfer of water vapor from the liquid desiccant (3002) to the warm carrier air (3009). The streams leaving the HMX (3015) is humidified carrier air (3010), high concentration liquid desiccant (3003), and coolant (3007). The coolant (3007) returns to the engine. The high concentration liquid desiccant (3003) is stored in a reservoir (3004). Carrier air (3010) leaving the HMX (3015) is mixed with engine exhaust (3014) in a mixer (3016) designed to reduce pressure drop associated with the combination of the two streams. The combined flow (3011) is cooled in a condenser (3017) which is a heat exchanger cooled with outside air (3018) or any other fluid that is at a lower temperature than the combined flow (3011) leaving the mixer. The cooling of the combined flow (3011) condenses a portion of the water in the flow. This water condensed (3019) is stored in a water reservoir (3020). The combined flow (3012) leaving the condenser is exhausted.

Figure 35:
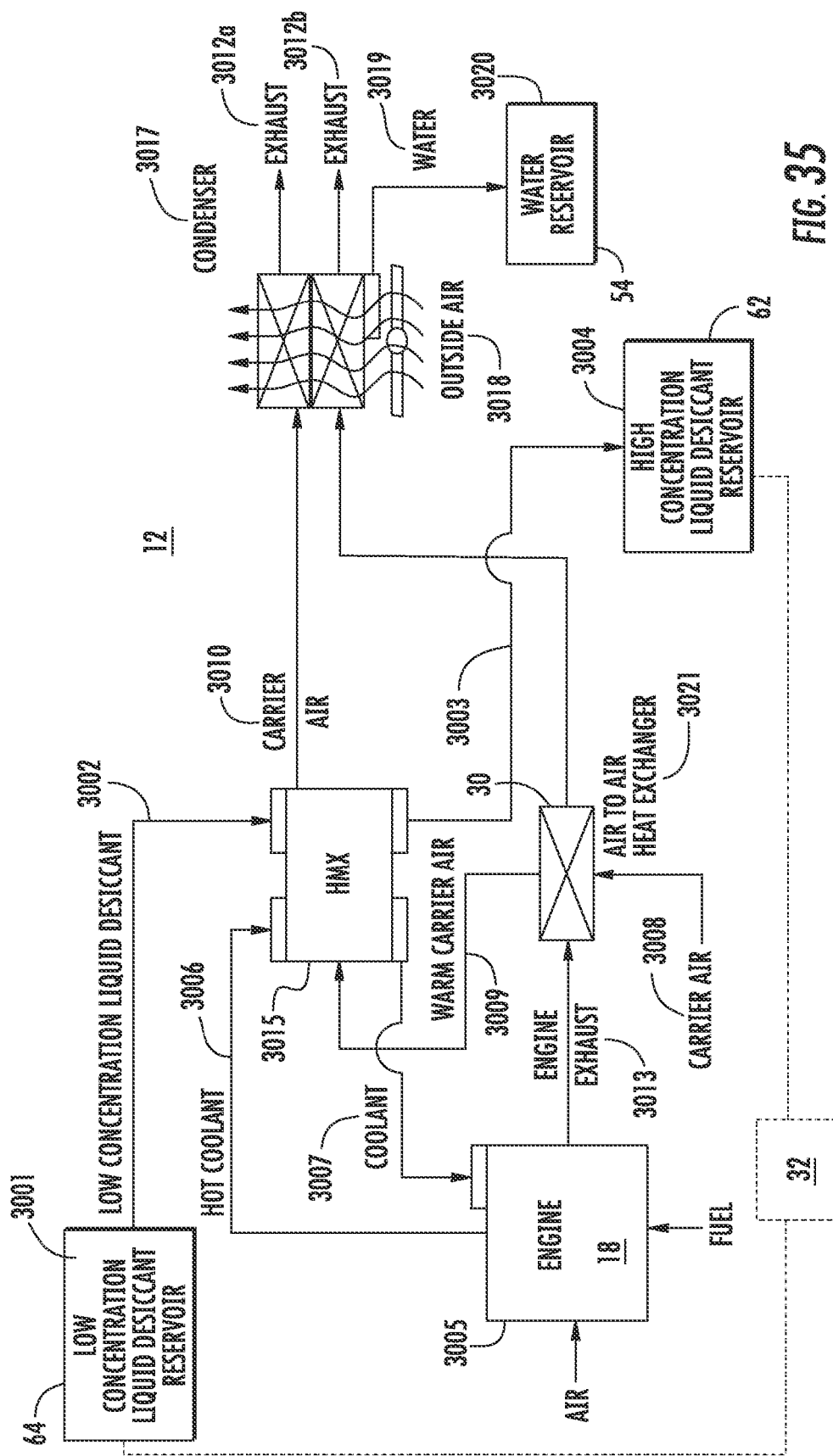
FIG. 35 is a diagram of a liquid desiccant regeneration system as described herein.

FIG. 35 shows the same process as described in FIG. 34, however in this case, the carrier air (3010) leaving the HMX (3015) is condensed in a separate heat exchanger in the condenser (3017). The engine exhaust (3014) leaving the air to air heat exchanger (3021) is also condensed in a separate heat exchanger in the condenser (3017). Each gas stream leaving the condenser (3017) has its own exhaust (3012 and 3013).

Figure 36:
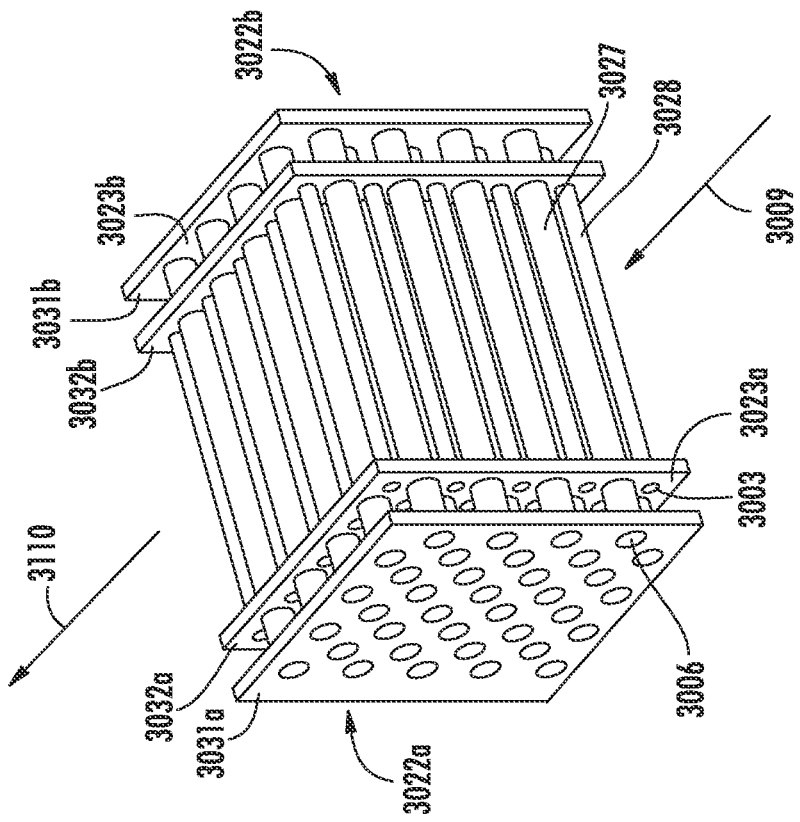
FIG. 36 is a perspective view of a heat and mass exchange stage as described herein.

FIG. 36 shows an embodiment of the design of the HMX (3015). The figure shows the tat portion of the HMX (3150) and its internal walls, in order to show its general geometry and construction. Carrier air (3009) enters the HMX (3015) and flow around conduits carrying coolant (3027) and conduits carrying liquid desiccant (3028). The walls of the conduits carrying liquid desiccant (3028) are made of material that is hydrophobic, permeable to water vapor, but not permeable to liquids. The conduits carrying coolant (3027) are longer than the conduits carrying liquid desiccant (3028). The liquid desiccant tube ends are sealed and attached to plates (3032a and 3032b) at each end. The ends of the conduits carrying coolant (3027) are sealed and attached to plates (3031a and 3031b). The different tube lengths form separate spaces (3022a, 3022b, 3023a and 3023b) where liquid desiccant (3003) and coolant (3006) can be introduced into the HMX (3015).

Figure 37:
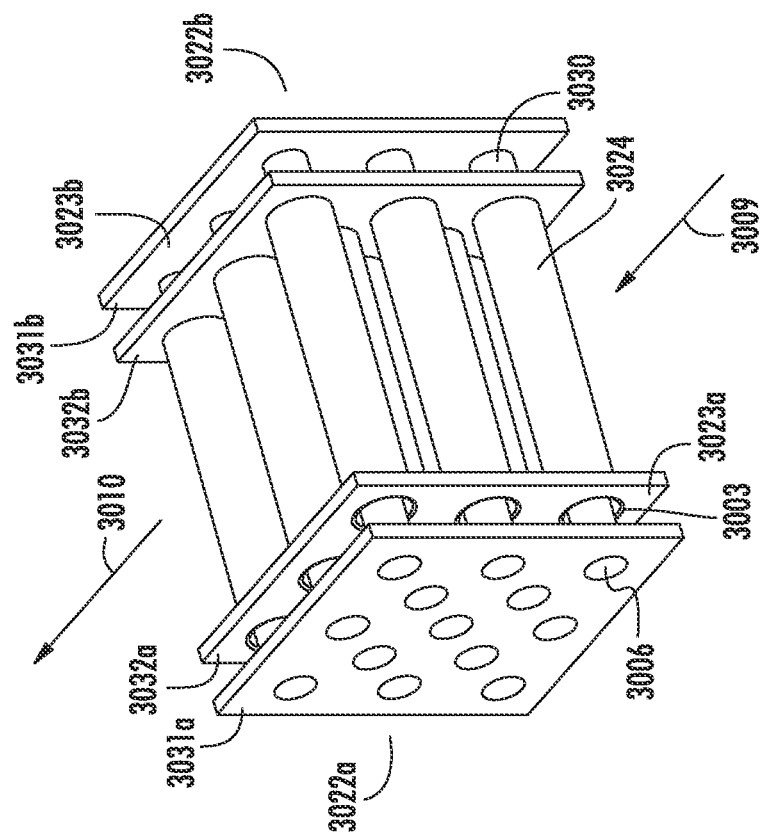
FIG. 37 is a perspective view of a heat and mass exchange stage as described herein.

FIG. 37 shows the HMX (3015) design using tube assemblies (3024). As in FIG. 36 carrier air (3009) flow across the tube assemblies (3024). The tube assemblies (3024) are composed of two different diameter conduits, the smaller one inside the other. The smaller diameter tube is longer than the larger diameter tube. The longer length tube is attached and sealed to the wall of the tube at its ends to two plates (3031a and 3031b). Flow in and out of the tube is not restricted by the plates (3031a and 3031b). These plates (3031a and 3031b) form fluid barrier between the fluids entering and exiting the longer length tube in the tube assembly (3024). Plates (3032a and 3032b) are attached to the ends of the shorter length tube in the tube assembly (3024) in such a way that they seal the wall of the tube to the plates (3032a and 3032b) but do not restrict flow in an out of the tube.

FIG. 38 shows in greater detail the construction of the tube assembly (3024) in an HMX in a cross-sectional cutout view of the HMX. Hot coolant (3006) enters the HMX (3015) in the chamber (3022a) created by an external header wall (3033a) and the plate (3031a) that is attached to wall (3030) of the longer length conduits of the tube assembly (3024). The hot coolant is able to flow into the longer length tube of the tube assembly (3024) and exit into the chamber (3022b) formed by the space between an external header wall (3033b) and the plate (3031b) attached to the tube wall (3030) at the other end of the longer length tube in the tube assembly (3024). The coolant (3007) exits the HMX (3015) through the chamber (3022b). FIG. 37 shows a top down flow of hot coolant (3006), however this is arbitrary. The coolant (3006)

flow could be bottom to top in the HMX (3015). Also, the orientation of the HMX (3015) can be any which way better suits the use of the liquid desiccant regeneration systems described herein for a certain application.

As shown in FIG. 38, the low concentration liquid desiccant (3002) enters the HMX (3015) in through the chamber (3023*b*) opposite the entry chamber (3022*a*) of the hot coolant (3006). The entry chamber (3023*b*) of the low concentration liquid desiccant (3002) is bound by the plate (3031*b*) attached to the wall (3030) at the end of the longer length tube of the tube assembly (3024) and the plate attached to the plate (3032*b*) attached to the wall (3029) of the shorter length tube of the tube assembly (3024). Liquid desiccant (3002) is able to flow around the outer wall (3030) of the longer length tube of the plate assembly (3024) but there is no fluid connection between the liquid desiccant stream (3002 and 3003) and the coolant streams (3006 and 3007). The liquid desiccant (3002) is able to flow in the annular space between the longer length tube and the shorter length tube of the tube assembly (3024). The outer wall (3029) of the shorter length tube of the tube assembly (3014) is entirely or partially composed of a hydrophobic material that is permeable to water vapor but not to liquids. Carrier air (3009) that enters the HMX (3015) picks up water vapor from the liquid desiccant (3002) as it flows around the tube assemblies (3024) in the HMX. The liquid desiccant leaves the HMX (3015) through a chamber (3023*a*) that maintains separated the liquid desiccant stream (3003) and the coolant stream (3006). A plurality of these tube assemblies (3024) exist in the HMX (3015).

FIG. 39 shows a cross-section top view of a tribe assembly (3024). Carrier air (3009) flows around the tube assembly (3024). The outermost wall (3029) of the tube assembly is made of a hydrophobic material permeable to water vapor but not permeable to liquids. Liquid desiccant (3003) flows out of the page (shown with a period to represent this) and within the annular compartment made by the wall (3030) of the innermost tube of the tube assembly (3024) and the outermost wall of the tube assembly (3029). Hot coolant (3006) flows into the page (shown as a plus sign to represent this), so the liquid desiccant (3003) and the hot coolant (3006) are in counterflow. The innermost wall (3030) of the tube assembly (3024) is made of a material that completely seals the coolant (3006) from the liquid desiccant (3003), but allows heat transfer between the two fluids.

FIG. 40 shows an alternative structure of the tube assembly (3024), where hot coolant (3006) flows across the outside of the tube assembly (3024). In this case outermost wall (3030) of the tube assembly (3024) is made of a material that allows heat transfer between the coolant (3006) and the liquid desiccant (3003). The liquid desiccant flows within the annular compartment bound by the outermost wall (3030) of the tube assembly (3024) and the innermost wall (3029) of the tube assembly. Carrier air (3009) flows within the innermost tube in the tube assembly (3024). The innermost wall (3029) of the tube assembly is made of a hydrophobic material that is permeable to water vapor but not to liquids.

FIG. 41 shows another alternative to the structure of the tube assembly (3024), where hot coolant (3006) flows across the outside of the tube assembly (3024). In this case outermost wall (3030) of the tube assembly (3024) is made of a material that allows heat transfer between the carrier air (3009) and the coolant (3006). The carrier air flows within the annular compartment bound by the outermost wall (3030) of the tube assembly (3024) and the innermost wall (3029) of the tube assembly. Liquid desiccant (3003) flows within the innermost tube in the tube assembly (3024). The innermost wall (3029) of the tube assembly is made of a hydrophobic material that is permeable to water vapor but not to liquids.

Figure 42A:
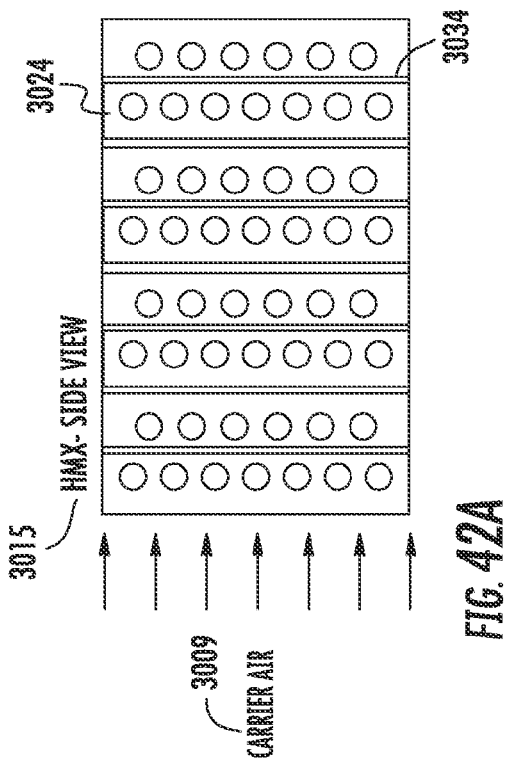
Figure 42B:
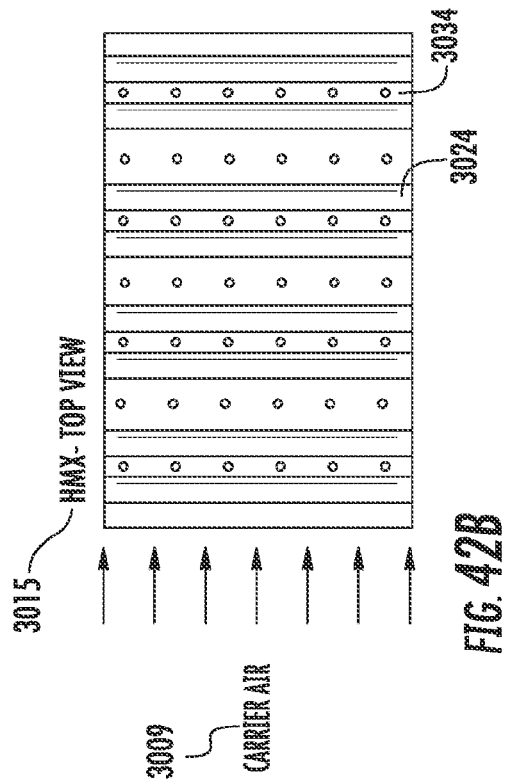
FIG. 42B is a top or side view of the same heat and mass exchange assembly.

FIG. 42A and FIG. 42B show the HMX (3015) with heat and mass transfer enhancements between the carrier air (3009) and the tube assemblies (3024). Flow disrupters (3034) are place throughout the HMX order to create turbulence and direct flow. The flow disrupters (3034) shown in this embodiment are cylindrical rods placed so that they run perpendicular to the direction of the tube assemblies (3024).

Figure 43:
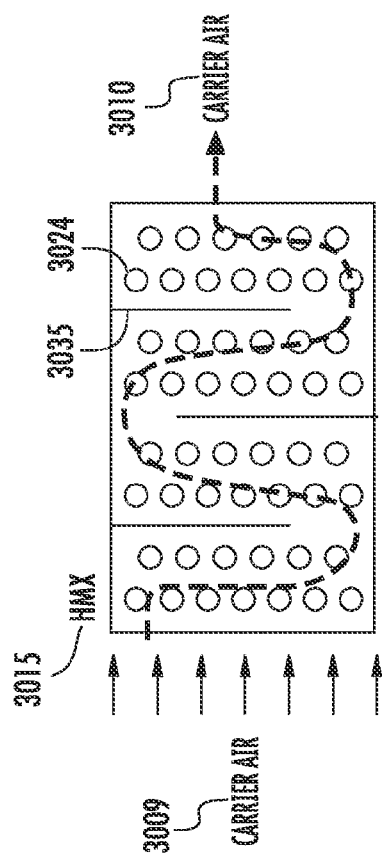
FIG. 43 is aside Of top view of a heat and mass exchange assembly, including flow disruptors, as described herein.

FIG. 43 shows the HMX (3015) with structural elements that cause the flow of the carrier air (3009) to be sinusoidal throughout the HMX (3015). This increases reactor effective length.

A first liquid desiccant regeneration system can include a heat and mass exchanger, comprising: a plurality of exchange components extending across a heat and mass exchanger duct, wherein a flow through said heat and mass exchanger duct is cross-flow relative to said exchange components, wherein said exchange components comprise a plurality of first elongated, hollow conduits and a plurality of second elongated, hollow conduit; and an engine producing an exhaust stream and a coolant stream, wherein said exhaust stream is in thermal communication with a carrier air stream subsequently fed into the heat and mass exchanger, wherein said heat and mass exchanger receives a liquid desiccant stream, the coolant stream, and a carrier air stream, wherein one of said first and second elongated, hollow conduits comprises a water vapor permeable tube wall, and wherein the liquid desiccant stream and the carrier air stream are in contact with said water vapor permeable tube wall.

A second desiccant regeneration system according to the first desiccant regeneration system, wherein said each of said first and second elongated, hollow conduits is spaced apart from the other.

A third desiccant regeneration system according to the second desiccant regeneration system, wherein said first elongated, hollow conduits extend laterally across said heat and mass exchanger duct and said second elongated, hollow conduits extend transverse to said first elongated, hollow conduits.

A fourth desiccant regeneration system according to the second desiccant regeneration system, wherein each of said first elongated, hollow conduits is an outer conduit of a tube-in-tube exchanger component, each of said tube-in-tube exchanger components further comprising an inner conduit, wherein an inner lumen is defined by said inner conduit and an outer flow channel is external to said inner conduit and adjacent a wall of said second elongated, hollow conduit.

A fifth desiccant regeneration system according to any of the foregoing desiccant regeneration systems, wherein said exchange components comprise tube-in-tube exchange components, wherein each tube-in-tube components comprises one first elongated, hollow conduit within one second elongated, hollow conduit, forming an inner lumen within said first elongated, hollow conduit and an outer flow channel external to said first elongated, hollow conduit and adjacent a wall of said second elongated, hollow conduit.

A sixth desiccant regeneration system according to the fifth desiccant regeneration system, wherein said coolant stream flows through said central lumen, said liquid desiccant stream flows through said sheath, and said carrier air stream flows through said heat and mass exchanger duct.

A seventh desiccant regeneration system according to the sixth desiccant regeneration system, wherein the coolant stream and the liquid desiccant stream are configured in a counter flow arrangement.

A eighth desiccant regeneration system according to the fifth desiccant regeneration system, wherein said carrier air stream flows through said central lumen, said liquid desiccant stream flows through said sheath, and said coolant stream flows through said heat and mass exchanger duct.

A ninth desiccant regeneration system according to the eighth desiccant regeneration system, wherein the carrier air stream and the liquid desiccant stream are configured in a counter flow arrangement.

A tenth desiccant regeneration system according to the fifth desiccant regeneration system, wherein said liquid desiccant stream flows through said central lumen, said carrier air stream flows through said sheath, and said coolant stream flows through said heat and mass exchanger duct.

An eleventh desiccant regeneration system according to the tenth desiccant regeneration system, wherein the liquid desiccant stream and the carrier air stream are configured in a counter flow arrangement.

A twelfth desiccant regeneration system according to any of the foregoing desiccant regeneration systems, wherein the carrier air stream exiting the heat and mass exchanger passes through a condenser, wherein a water trap of said condenser is in fluid communication with a reservoir.

A thirteenth desiccant regeneration system according to any of the foregoing desiccant regeneration systems, wherein, after thermally contacting the carrier air stream, the exhaust stream passes through a condenser, wherein a water trap of said condenser is in fluid communication with a reservoir.

A fourteenth desiccant regeneration system according to the thirteenth desiccant regeneration system, wherein, the carrier air stream exiting the heat and mass exchanger is mixed with the exhaust stream to form a combined air stream and the combined air stream passes through a condenser.

A fifteenth desiccant regeneration system according to any of the foregoing desiccant regeneration systems, wherein a low concentration liquid desiccant reservoir is in fluid communication with a high concentration liquid desiccant reservoir via the liquid desiccant stream.

A sixteenth desiccant regeneration system according to any of the foregoing desiccant regeneration systems, wherein, after passing through the heat and mass exchanger, the coolant stream is reintroduced into the engine.

A seventeenth desiccant regeneration system according to any of the foregoing desiccant regeneration systems, further comprising a plurality of flow disrupters extending from at least one wall of said heat and mass exchanger duct.

An eighteenth desiccant regeneration system according to the seventeenth desiccant regeneration system, wherein the flow disrupters extend across said heat and mass exchanger duct.

A nineteenth desiccant regeneration system according to the seventeenth desiccant regeneration system, wherein said flow disrupters have a cross-sectional shape selected from the group consisting of airfoils, triangles, rectangles, ovals, egg-shaped.

A twentieth desiccant regeneration system according to the seventeenth desiccant regeneration system, wherein said heat and mass exchanger duct comprises first and second longitudinal walls opposite one another, and said flow disrupters comprise at least one first fin extending from the first longitudinal wall partially across said heat and mass exchanger duct and at least one second fin extending from the second longitudinal wall partially across said heat and mass exchanger duct.

A twenty-first desiccant regeneration system according to the twentieth desiccant regeneration system, wherein said flow disruptors cause flow through said heat and mass exchanger duct to travel in an s-shaped path.

A twenty-second desiccant regeneration system according to any of the fifth through twenty-first desiccant regeneration systems, wherein at least one of said tube-in-tube exchange components comprises a flow disrupter.

A twenty-third desiccant regeneration system according to any of the foregoing desiccant regeneration systems, wherein said exhaust stream is contacted with said carrier air stream via a heat exchanger.

A twenty-fourth desiccant regeneration system according to any of the fifth through twenty-third desiccant regeneration systems, wherein each of said tube-in-tube exchanger components further comprises an intermediate elongated, hollow conduit, wherein the outer flow channel is defined between an outer wall of said intermediate elongated, hollow conduit and said second elongated, hollow conduit, and an intermediate flow channel is defined between said first elongated, hollow conduit and said intermediate elongated, hollow conduit.

The foregoing is provided for purposes of illustrating, explaining, and describing embodiments of this invention. Modifications and adaptations to these embodiments will be apparent to those skilled in the art and may be made without departing from the scope or spirit of this invention.

The invention claimed is:
1. An air conditioning system, comprising:
a liquid desiccant regenerator comprising:
 an engine that generates energy through electrochemical oxidation of a fuel, said engine producing a heated exit stream, and
 at least one water vapor permeable regenerator wall;
a dehumidification system comprising:
 at least one water vapor permeable dehumidifier wall,
wherein a low concentration liquid desiccant stream extends from a dehumidification system (DS) desiccant outlet to a low concentration liquid desiccant reservoir, then feeds into a desiccant regenerator (DR) desiccant inlet,
wherein a high concentration liquid desiccant stream extends from a DR desiccant outlet to a high concentration liquid desiccant reservoir, then feeds into a DS desiccant inlet,
wherein a carrier stream and the low concentration liquid desiccant are in contact with opposite sides of each of said at least one water vapor permeable regenerator walls, wherein the low concentration liquid desiccant is heated by heat from the heated exit stream to drive water from the low concentration liquid desiccant through each of the at least one water vapor permeable regenerator walls to the carrier stream to form a humidified carrier stream,
wherein a process air stream and the high concentration liquid desiccant stream are in contact with opposite sides of the water vapor permeable dehumidifier wall, wherein moisture from said process air stream passes through the water vapor permeable dehumidifier wall to the high concentration liquid desiccant, and
wherein a desiccant concentration in said high concentration liquid desiccant stream is higher than a desiccant concentration in said low concentration liquid desiccant stream.
2. The air conditioning system according to claim 1, wherein said heated exit stream is selected from the group consisting of heated heat exchange fluid, an exhaust stream, and both.

3. The air conditioning system according to claim 1, wherein the heated exit stream is an exhaust stream and the carrier stream comprises the exhaust stream.

4. The air conditioning system according to claim 1, further comprising a heat exchanger, wherein the heated exit stream contacts and heats the carrier stream in the heat exchanger.

5. The air conditioning system according to claim 4, wherein the carrier stream comprises ambient air, recirculated air from a space being air conditioned, or a combination of both.

6. The air conditioning system according to claim 1, wherein the heated exit stream is heated heat exchange liquid exiting the engine, and wherein the heated heat exchange liquid contacts and heats the low concentration liquid desiccant stream, the carrier stream, or both.

7. The air conditioning system according to claim 1, wherein the heated exit stream comprises heated heat exchange liquid exiting the engine and a heated exhaust stream;
   wherein the heated heat exchange liquid contacts and heats the low concentration liquid desiccant; and
   wherein (a) the heated exhaust stream contacts and heats the carrier stream, or (b) the carrier stream comprises the heated exhaust stream.

8. The air conditioning system according to claim 1, comprising an air conditioning system comprising said dehumidification system and at least one air conditioning heat exchange tube, wherein:
   (a) said high concentration liquid desiccant stream and a heat exchange fluid are in contact with opposite sides of the air conditioning heat exchange conduits, for cooling said high concentration liquid desiccant stream,
   (b) said process air and the heat exchange fluid are in contact with opposite sides of the air conditioning heat exchange conduits, for cooling said process air, or
   (c) said high concentration liquid desiccant stream and a first heat exchange fluid are in contact with opposite sides of a first group of said air conditioning heat exchange conduits, for cooling said high concentration liquid desiccant stream, and said process air and a second heat exchange fluid are in contact with opposite sides of a second group of said air conditioning heat exchange conduits, for cooling said process air.

9. The air conditioning system according to claim 8, further comprising:
   a water recovery system, comprising:
      a water recovery heat exchange tube, wherein said humidified carrier air and a water recovery heat transfer fluid are in contact with opposite sides of the water recovery heat exchange conduits,
      a water reservoir for receiving water precipitating from said humidified carrier air, and
      a flow control system for controlling transport of a water stream from said water reservoir to one side of said air conditioning heat exchange conduits.

10. The air conditioning system according to claim 1, wherein
    (i) a capacity of said high concentration liquid desiccant reservoir is sufficient to operate said dehumidification system continuously for at least one hour,
    (ii) a capacity of said low concentration liquid desiccant reservoir is sufficient to operate the liquid desiccant regenerator continuously for at least one hour, or
    (iii) both (i) and (ii).

11. The air conditioning system according to claim 10, wherein the air conditioning system consumes high concentration liquid desiccant at the same rate that the liquid desiccant regenerator regenerates the high concentration liquid desiccant from the from the low concentration liquid desiccant.

12. A method of operating an air conditioning system, comprising:
    providing a low concentration liquid desiccant stream;
    providing a liquid desiccant regenerating system comprising:
       a liquid desiccant regenerator comprising an engine that generates energy through electrochemical oxidation of a fuel, wherein heat from said engine is used to convert said low concentration liquid desiccant stream to a high concentration liquid desiccant stream,
    providing an air conditioning system that converts the high concentration liquid desiccant stream to a low concentration liquid desiccant stream while dehumidifying process air that can, optionally, be supplied to an air conditioned space, and
    operating said liquid desiccant regenerating system to produce the high concentration liquid desiccant stream, which has a higher desiccant concentration than the low concentration liquid desiccant stream,
    wherein said operating comprises transporting the high concentration liquid desiccant stream to said air conditioning system, then transporting the low concentration liquid desiccant stream from the air conditioning system to said liquid desiccant regenerating system.

13. The method according to claim 12, wherein said operating comprises:
    operating said liquid desiccant regenerator continuously, and
    operating said air conditioning system intermittently.

14. The method according to claim 12, wherein said operating comprises:
    operating said liquid desiccant regenerator when said air conditioning system is not operating.

15. The method according to claim 12, wherein said operating comprises:
    operating said air conditioning system when said liquid desiccant regenerator is not operating.

16. The method according to claim 12, wherein excess electricity produced when said engine is operated is supplied to an external power grid.

17. The liquid desiccant regeneration system according to claim 1, wherein the heated exit stream is heat exchange fluid, and
    wherein an engine heat exchange fluid outlet is operatively connected to a liquid desiccant regenerator (LDR) heat exchange fluid inlet and a LDR heat exchange fluid outlet is operatively connected to an engine heat exchange fluid inlet.

18. A method of operating a liquid desiccant regenerating system, comprising:
    providing a low concentration liquid desiccant stream;
    providing a liquid desiccant regenerating system comprising:
       a liquid desiccant regenerator comprising an engine that generates energy through electrochemical oxidation of a fuel, wherein heat from said engine is used to convert said low concentration liquid desiccant stream to a high concentration liquid desiccant stream, and
    operating said liquid desiccant regenerating system to produce the high concentration liquid desiccant stream, which has a higher desiccant concentration than the low concentration liquid desiccant stream, wherein said operating comprises operating said engine continuously.

19. The method according to claim 18, further comprising:
providing an air conditioning system that converts the high concentration liquid desiccant stream to a low concentration liquid desiccant stream while dehumidifying process air that can, optionally, be supplied to an air conditioned space.

20. The method according to claim 18, wherein the engine is a fuel cell.

21. An air conditioning system, comprising:
a liquid desiccant regenerator comprising
an engine that generates energy through electrochemical oxidation of a fuel, said engine producing a heated exit stream;
a dehumidification system comprising:
at least one water vapor permeable wall,
wherein a low concentration liquid desiccant stream extends from a dehumidification system (DS) desiccant outlet to a low concentration liquid desiccant reservoir, then feeds into a desiccant regenerator (DR) desiccant inlet;
wherein a high concentration liquid desiccant stream extends from a DR desiccant outlet to a high concentration liquid desiccant reservoir, then feeds into a DS desiccant inlet,
wherein the liquid desiccant regenerator contacts a carrier stream and the low concentration liquid desiccant with each other, wherein the low concentration liquid desiccant is heated by heat from the heated exit stream to drive water from the low concentration liquid desiccant to the carrier stream to form a humidified carrier stream,
wherein process air stream and the high concentration liquid desiccant stream are in contact with opposite sides of the at least one water vapor permeable wall, wherein moisture from said process air stream passes through the at least one water vapor permeable wall to the high concentration liquid desiccant, and
wherein a desiccant concentration in said high concentration liquid desiccant stream is higher than a desiccant concentration in said low concentration liquid desiccant stream.

22. The air conditioning system according to claim 21, wherein
(i) a capacity of said high concentration liquid desiccant reservoir is sufficient to operate said dehumidification system continuously for at least one hour,
(ii) a capacity of said low concentration liquid desiccant reservoir is sufficient to operate the liquid desiccant regenerator continuously for at least one hour, or
(iii) both (i) and (ii).

* * * * *